US012290980B2

(12) United States Patent
Levy et al.

(10) Patent No.: US 12,290,980 B2
(45) Date of Patent: May 6, 2025

(54) ADDITIVE MANUFACTURING OF THREE-DIMENSIONAL OBJECTS CONTAINING A TRANSPARENT MATERIAL

(71) Applicant: Stratasys Ltd., Rehovot (IL)

(72) Inventors: Avraham Levy, Petach-Tikva (IL); Diana Ravich, Natania (IL); Elena Shpayzer, Rehovot (IL); Mariana Pokrass, Rehovot (IL)

(73) Assignee: Stratasys Ltd., Rehovot (IL)

( * ) Notice: Subject to any disclaimer, the term of this patent is extended or adjusted under 35 U.S.C. 154(b) by 532 days.

(21) Appl. No.: 17/578,572

(22) Filed: Jan. 19, 2022

(65) Prior Publication Data

US 2022/0134640 A1    May 5, 2022

Related U.S. Application Data

(63) Continuation of application No. PCT/IL2020/050396, filed on Apr. 1, 2020.

(60) Provisional application No. 62/875,977, filed on Jul. 19, 2019.

(51) Int. Cl.
| | | |
|---|---|---|
| *B29C 64/124* | (2017.01) | |
| *B29C 64/112* | (2017.01) | |
| *B33Y 40/20* | (2020.01) | |
| *B33Y 50/02* | (2015.01) | |
| *B33Y 70/00* | (2020.01) | |
| *C08F 2/50* | (2006.01) | |
| *C08F 220/18* | (2006.01) | |
| *C08K 5/07* | (2006.01) | |
| *C08K 5/5397* | (2006.01) | |
| *B33Y 10/00* | (2015.01) | |

(52) U.S. Cl.
CPC .......... *B29C 64/124* (2017.08); *B29C 64/112* (2017.08); *B33Y 40/20* (2020.01); *B33Y 50/02* (2014.12); *B33Y 70/00* (2014.12); *C08F 2/50* (2013.01); *C08F 220/18* (2013.01); *C08K 5/07* (2013.01); *C08K 5/5397* (2013.01); *B29K 2995/0026* (2013.01); *B33Y 10/00* (2014.12)

(58) Field of Classification Search
None
See application file for complete search history.

(56) References Cited

U.S. PATENT DOCUMENTS

| | | | | |
|---|---|---|---|---|
| 11,899,935 B2 * | 2/2024 | Barabash | ................ | G06F 3/061 |
| 2009/0004579 A1 * | 1/2009 | Sarmah | .................. | G03F 7/038 |
| | | | | 430/286.1 |
| 2009/0124783 A1 * | 5/2009 | Litke | ................... | C08F 283/006 |
| | | | | 264/496 |
| 2009/0292040 A1 * | 11/2009 | Sarmah | .................. | G03F 7/038 |
| | | | | 522/90 |
| 2010/0140850 A1 | 6/2010 | Napadensky et al. | | |
| 2022/0364849 A1 * | 11/2022 | Yosub | .................... | G01B 11/22 |

FOREIGN PATENT DOCUMENTS

| | | | | |
|---|---|---|---|---|
| EP | 0562826 A1 * | 9/2009 | | |
| EP | 2636511 | 9/2013 | | |
| EP | 3309224 | 4/2018 | | |
| JP | H6-65338 | 3/1994 | | |
| JP | 2019-517933 | 6/2019 | | |
| WO | WO-2012060204 A1 * | 5/2012 | ........... | B29C 64/112 |
| WO | WO 2018/143305 | 8/2018 | | |
| WO | WO 2019/104079 | 5/2019 | | |
| WO | WO 2019/130320 | 7/2019 | | |
| WO | WO 2020/065654 | 4/2020 | | |
| WO | WO 2021/014434 | 1/2021 | | |

OTHER PUBLICATIONS

International Preliminary Report on Patentability Dated Feb. 3, 2022 From the International Bureau of WIPO Re. Application No. PCT/IL2020/050396. (13 Pages).
International Search Report and the Written Opinion Dated Jun. 4, 2020 From the International Searching Authority Re. Application No. PCT/IL2020/050396. (16 Pages).
Ahmed et al. "Extremely Soft, Conductive, and Transparent Ionic Gels by 3D Optical Printing", Macromolecular Chemistry and Physics, XP055697654, 219(24): 1800216-1-1800216-10, Published Online Nov. 5, 2018.
English Summary Dated Nov. 16, 2023 of Notification of Office Action Dated Nov. 7, 2023 From the State Intellectual Property Office of the People's Republic of China Re. Application No. 202080066170.3. (4 Pages).
Machine Translation Dated Nov. 11, 2023 of Notification of Office Action Dated Nov. 7, 2023 From the State Intellectual Property Office of the People's Republic of China Re. Application No. 202080066170.3. (8 Pages).
Notification of Office Action Dated Nov. 7, 2023 From the State Intellectual Property Office of the People's Republic of China Re. Application No. 202080066170.3. (7 Pages).
Translation Dated Jan. 10, 2024 of Notification of Office Action Dated Nov. 7, 2023 From the State Intellectual Property Office of the People's Republic of China Re. Application No. 202080066170.3. (14 Pages).
Translation Dated Feb. 29, 2024 of Notice of Reason(s) for Rejection Dated Feb. 6, 2024 From the Japan Patent Office Re. Application No. 2021-577196. (3 pages).
Notification of Office Action and Search Report Dated Mar. 8, 2023 From the State Intellectual Property Office of the People's Republic of China Re. Application No. 202080066170.03. (9 Pages).

(Continued)

*Primary Examiner* — Sanza L. McClendon

(57) ABSTRACT

Formulations usable in additive manufacturing such as 3D inkjet printing which provide a transparent material when hardened, are provided. The formulation are designed so as to provide transparent objects or parts thereof with improved transmittance and color properties such as yellowness index, compared to commercially available formulations. The formulations comprise a photoinitiator at a relatively low amount and designed mixture of curable materials.

15 Claims, 17 Drawing Sheets

(8 of 17 Drawing Sheet(s) Filed in Color)

(56) References Cited

OTHER PUBLICATIONS

Translation Dated Apr. 19, 2023 of Notification of Office Action and Search Report Dated Mar. 8, 2023 From the State Intellectual Property Office of the People's Republic of China Re. Application No. 202080066170.3 (9 pages).

Notice of Reason(s) for Rejection Dated Feb. 6, 2024 From the Japan Patent Office Re. Application No. 2021-577196. (2 pages).

Communication Pursuant to Article 94(3) EPC Dated Apr. 5, 2023 From the European Patent Office Re. Application No. 20720948.7 (11 Pages).

Communication Pursuant to Article 94(3) EPC Dated Feb. 6, 2024 From the European Patent Office Re. Application No. 20720948.7 (8 Pages).

Decision on Rejection Dated Apr. 20, 2024 From the State Intellectual Property Office of the People's Republic of China Re. Application No. 202080066170.3 and Its Translation Into English. (15 Pages).

English Summary Dated May 6, 2024 of Decision on Rejection Dated Apr. 20, 2024 From the State Intellectual Property Office of the People's Republic of China Re. Application No. 202080066170.3. (5 Pages).

Office Action Dated Jul. 10, 2024 From the Israel Patent Office Re. Application No. 289954. (4 Pages).

\* cited by examiner

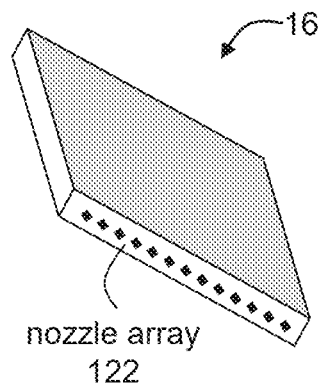 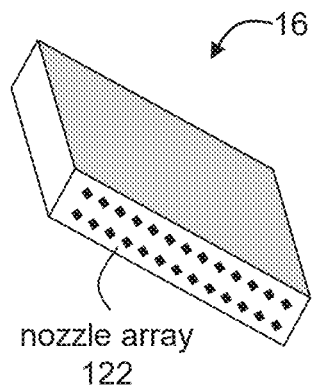
FIG. 2A  FIG. 2B
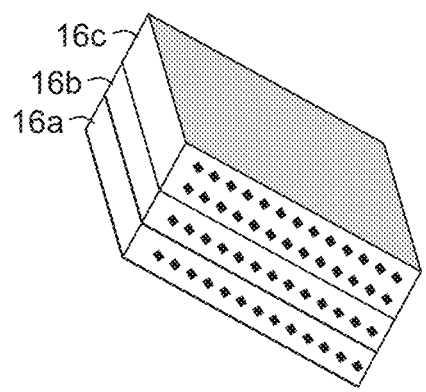
FIG. 2C

FIG. 10

| Straight cube | X | Y | Z |
|---|---|---|---|
| Image | | | |
| % Transmittance | 58.33 ± 7.53 | 65.52 ± 10.07 | 80.46 ± 0.51 |

| Tilt cube | X | Y | Z |
|---|---|---|---|
| Image | | | |
| % Transmittance | 79.62 ± 1.92 | 81.45 ± 1.28 | 81.77 ± 1.77 |

After 24h photobleaching    Before photobleaching

After 24h photobleaching    Before photobleaching

ADDITIVE MANUFACTURING OF THREE-DIMENSIONAL OBJECTS CONTAINING A TRANSPARENT MATERIAL

RELATED APPLICATIONS

This application is a Continuation of PCT Patent Application No. PCT/IL2020/050396, having international filing date of Apr. 1, 2020 which claims the benefit of priority under 35 USC § 119(e) of U.S. Provisional Patent Application No. 62/875,977 filed on Jul. 19, 2019. The contents of the above applications are all incorporated by reference as if fully set forth herein in their entirety.

FIELD AND BACKGROUND OF THE INVENTION

The present invention, in some embodiments thereof, relates to additive manufacturing and, more particularly, but not exclusively, to formulations usable in additive manufacturing of three-dimensional objects containing, in at least a portion thereof, a transparent material, to kits containing such formulations and to additive manufacturing of three-dimensional objects using such formulations.

Additive manufacturing (AM) is a technology enabling fabrication of arbitrarily shaped structures directly from computer data via additive formation steps. The basic operation of any AM system consists of slicing a three-dimensional computer model into thin cross sections, translating the result into two-dimensional position data and feeding the data to control equipment which fabricates a three-dimensional structure in a layerwise manner.

Additive manufacturing entails many different approaches to the method of fabrication, including three-dimensional (3D) printing such as 3D inkjet printing, electron beam melting, stereolithography, selective laser sintering, laminated object manufacturing, fused deposition modeling and others.

Some 3D printing processes, for example, 3D inkjet printing, are being performed by a layer by layer inkjet deposition of building materials. Thus, a building material is dispensed from a dispensing head having a set of nozzles to deposit layers on a supporting structure. Depending on the building material, the layers may then be cured or solidified. Curing may be by exposure to a suitable condition, and optionally by using a suitable device.

The building material includes an uncured model material (also referred to as "uncured modeling material" or "modeling material formulation"), which is selectively dispensed to produce the desired object, and may also include an uncured support material (also referred to as "uncured supporting material" or "support material formulation") which provides temporary support to specific regions of the object during building and assures adequate vertical placement of subsequent object layers. The supporting structure is configured to be removed after the object is completed.

In some known inkjet printing systems, the uncured model material is a photopolymerizable or photocurable material that is cured, hardened or solidified upon exposure to ultraviolet (UV) light after it is jetted. The uncured model material may be a photopolymerizable material formulation that has a composition which, after curing, gives a solid material with mechanical properties that permit the building and handling of the three-dimensional object being built. The material formulation may include a reactive (curable) component and a photo-initiator. The photo-initiator may enable at least partial solidification (hardening) of the uncured support material by curing with the same UV light applied to form the model material. The solidified material may be rigid, or may have elastic properties.

The support material is formulated to permit fast and easy cleaning of the object from its support. The support material may be a polymer, which is water-soluble and/or capable of swelling and/or breaking down upon exposure to a liquid solution, e.g. water, alkaline or acidic water solution. The support material formulation may also include a reactive (curable) component and a photo-initiator similar to that used for the model material formulation.

In order to be compatible with most of the commercially-available print heads utilized in a 3D inkjet printing system, the uncured building materials are known to feature the following characteristics: a relatively low viscosity (e.g., Brookfield Viscosity of up to 50 cps, or up to 35 cps, preferably from 8 to 25 cps) at the working (e.g., jetting) temperature; Surface tension of from about 25 to about 55 Dyne/cm, preferably from about 25 to about 40 Dyne/cm; and a Newtonian liquid behavior and high reactivity to a selected curing condition, to enable fast solidification of the jetted layer upon exposure to a curing condition, of no more than 1 minute, preferably no more than 20 seconds.

The hardened modeling material which forms the final object typically exhibits heat deflection temperature (HDT) which is higher than room temperature, in order to assure its usability. Desirably, the hardened modeling material exhibits HDT of at least 35° C. For an object to be stable at variable conditions, a higher HDT is known to be desirable. In most cases, it is also desirable that the object exhibits relatively high Izod Notched impact, e.g., higher than 50 or higher than 60 J/m.

Various three-dimensional printing techniques exist and are disclosed in, e.g., U.S. Pat. Nos. 6,259,962, 6,569,373, 6,658,314, 6,850,334, 6,863,859, 7,183,335, 7,209,797, 7,225,045, 7,300,619, 7,500,846, 7,991,498 and 9,031,680 and U.S. Published Application No. 20160339643, all by the same Assignee, and being hereby incorporated by reference in their entirety.

Several additive manufacturing processes, including three-dimensional inkjet printing, allow additive formation of objects using more than one modeling material, also referred to as "multi-material" AM processes. For example, U.S. Patent Application having Publication No. 2010/0191360, of the present Assignee, discloses a system which comprises a solid freeform fabrication apparatus having a plurality of print heads, a building material supply apparatus configured to supply a plurality of building materials to the fabrication apparatus, and a control unit configured for controlling the fabrication and supply apparatus. The system has several operation modes. In one mode, all print heads operate during a single building scan cycle of the fabrication apparatus. In another mode, one or more of the print heads is not operative during a single building scan cycle or part thereof.

In a 3D inkjet printing process such as Polyjet™ (Stratasys® Ltd., Israel), the building material is selectively jetted from one or more inkjet print heads and/or nozzles and deposited onto a fabrication tray in consecutive layers according to a pre-determined configuration as defined by a software file.

U.S. Pat. No. 9,227,365, by the present assignee, discloses methods and systems for solid freeform fabrication of shelled objects, constructed from a plurality of layers and a layered core constituting core regions and a layered shell constituting envelope regions. This is also referred to as digital ABS™, or D-ABS™.

The Polyjet™ technology allows control over the position and composition of each voxel (volume pixel), which affords enormous design versatility and digital programming of multi-material structures. Other advantages of the Polyjet™ technology is the very high printing resolution, up to 14 µm layer height, and the ability to print multiple materials simultaneously, in a single object. This multi-material 3D printing process often serves for fabrication of complex parts and structures that are comprised of elements having different stiffness, performance, color or transparency. New range of materials, programmed at the voxel level, can be created by the PolyJet™ printing process, using only few starting materials.

International Patent Application Publication No. WO 2013/128452, by the present Assignee, discloses a multi-material approach which involves separate jetting of two components of a cationic polymerizable system and/or a radical polymerizable system, which intermix on the printing tray, leading to a polymerization reaction similar to pre-mixing of the two components before jetting, while preventing their early polymerization on the inkjet head nozzle plate.

Current PolyJet™ technology offers the capability to use a range of curable (e.g., polymerizable) materials that provide polymeric materials featuring a variety of properties, ranging, for example, from stiff and hard materials (e.g., curable formulations marketed as the Vero™ Family materials) to soft and flexible materials (e.g., curable formulations marketed as the Tango™ and Agilus™ families), and including also objects made using Digital ABS, which contain a multi-material made of two starting materials (e.g., RGD515™ & RGD535/531™), and simulate properties of engineering plastic. Most of the currently practiced PolyJet™ materials are curable materials which harden or solidify upon exposure to radiation, mostly UV radiation and/or heat, with the most practiced materials being acrylic-based materials.

Some photocurable (photopolymerizable) modeling material formulations known as usable in 3D inkjet printing are designed so as to provide, when hardened, a transparent material.

U.S. Pat. No. 6,242,149 describes a fast-curing photosensitive composition that is used in recording inks, materials encapsulated inside photocuring microcapsules for image recording, photosensitive coating compositions, and the like. The composition comprises a radical-polymerizable unsaturated compound, a photopolymerization initiator, and a thiol-containing compound, whereby the fast-curing photosensitive composition can be adequately cured with low exposure energy.

U.S. Patent Application having Publication No. 2010/0140850 teaches formulations usable in AM, which are colorless before curing or solidification, and which, when hardened, provide a material with a reduced yellow hue. This patent application teaches that UV curable acrylic-based compositions typically have a characteristic yellow hue, and that although the source of the yellow hue is not completely understood, it has been found that the photoinitiator type and concentration influence the resulting material color. This patent application suggests using a formulation that comprises, in addition to one or more (meth)acrylic materials and a photoinitiator, a sulfur-containing additive such as beta-mercaptopropionate, mercaptoacetate, and/or alkane thiols.

U.S. Provisional Patent Application No. 62/738,041, filed Sep. 28, 2018, by the present assignee, describes a system and method for fabricating objects with at least one model material that is maintained in a partially solidified or not solidified state throughout the additive manufacturing process. The system and method are such that the object solidifies in a dual stage hardening process, which may include partial solidification during the AM process to produce a green body object, followed by post (e.g., thermal) treatment at the end of the AM process to complete the solidifying process. This provisional patent application describes embodiments in which this process was utilized for providing transparent material, using a formulation for forming an outer layer, and a similar formulation which comprises reduced amount of photoinitiator(s) for forming an inner core.

Additional background art includes WO2009/013751; WO 2016/063282; WO 2016/125170; WO 2017/134672; WO2017/134673; WO 2017/134674; WO 2017/134676; WO 2017/068590; WO2017/187434; WO2018/055521; and WO2018/055522, all by the present assignee.

SUMMARY OF THE INVENTION

The present inventors have designed and successfully practiced modeling material formulations that are usable in additive manufacturing such as 3D inkjet printing and which provide, when hardened, a transparent, colorless material, as defined herein, with a reduced or nullified yellow hue and improved transmittance, as compared with currently available transparent formulations. The present inventors have uncovered that such formulations should be devoid of mono-functional aromatic curable materials, and of multi-functional materials that feature Tg higher than the working temperatures of the AM process, e.g., higher than 80° C.

According to as aspect of some embodiments of the present invention there is provided a curable formulation, e.g., a photocurable formulation, comprising:

- at least one photoinitiator in a total amount of no more than 1% by weight of the total weight of the formulation;
- at least one mono-functional (meth)acrylate material featuring a molecular weight lower than 500 grams/mol, in a total amount of from 40 to 60% by weight of the total weight of the formulation, the at least one mono-functional (meth)acrylate material being selected from non-aromatic and aromatic mono-functional (meth)acrylate material, wherein an amount of an aromatic mono-functional (meth)acrylate material is no more than 5% or no more than 3% or no more than 1%, by weight, of a total amount of the at least one mono-functional (meth)acrylate material; and
- at least one multi-functional (meth)acrylate material, in a total amount of from 40 to 60% by weight of the total weight of the formulation, wherein each of the at least one multi-functional (meth)acrylate material features, when hardened, a Tg lower than 100° C. or lower than 80° C.

According to some of any of the embodiments described herein, an average Tg of the at least one multi-functional (meth)acrylate material, when hardened, is at least 24, or at least 25, ° C. In some embodiments, the average Tg ranges from 24 to 70, or from 25 to 70, or from 30 to 70, or from 30 to 60, or from 40 to 60, ° C. In some embodiments, the average Tg ranges from 25 to 40, or from 25 to 30, or from 24 to 30, ° C.

According to some of any of the embodiments described herein, the at least one mono-functional (meth)acrylate material comprises a non-aromatic mono-functional (meth)acrylate material in an amount of at least 90%, or at least 95%, or 100%, by weight, of a total weight of the at least one mono-functional (meth)acrylate material.

According to some of any of the embodiments described herein, the formulation comprises at least one non-aromatic (e.g., alicylic) mono-functional (meth)acrylate material, in an amount of from 40 to 60% by weight of the total weight of the formulation.

According to some of any of the embodiments described herein, each of the at least one mono-functional (meth) acrylate materials features Tg of from 20 to 100, or from 50 to 100, ° C.

According to some of any of the embodiments described herein, the at least one mono-functional (meth)acrylate material features an average Tg of from 75 to 95° C., preferably from 85 to 95° C.

According to some of any of the embodiments described herein, the at least one multi-functional (meth)acrylate material comprises at least one multi-functional urethane acrylate that features a molecular weight higher than 1000 grams/mol.

According to some of any of the embodiments described herein, the at least one multi-functional urethane acrylate that features a molecular weight higher than 1000 grams/mol comprises at least one multi-functional urethane acrylate that features, when hardened, Tg lower than 20° C., and at least one multi-functional urethane acrylate that features, when hardened, Tg higher than 20 (e.g., Tg of from 20 to 70° C.).

According to some of any of the embodiments described herein, the at least one multi-functional urethane acrylate that features a molecular weight higher than 1000 grams/mol features an average Tg of from 30 to 60, of from 35 to 60, or from 35 to 55, or from 40 to 50, ° C.

According to some of any of the embodiments described herein, a total amount of the at least one multi-functional urethane acrylate that features a molecular weight higher than 1000 grams/mol ranges from 15 to 40, or from 15 to 30, or from 15 to 25, % by weight of the total weight of the formulation.

According to some of any of the embodiments described herein, the at least one multi-functional (meth)acrylate material comprises at least one multi-functional ethoxylated (meth)acrylate material that features, when hardened, Tg of from 50 to 80, or from 50 to 70, ° C.

According to some of any of the embodiments described herein, the at least one multi-functional ethoxylated (meth) acrylate material that features, when hardened, Tg of from 50 to 80, or from 50 to 70, ° C., comprises at least one multi-functional ethoxylated (meth)acrylate material that features a viscosity of at least 500 centipoises, and at least one multi-functional ethoxylated (meth)acrylate material that features a viscosity lower than 50 or lower than 20 centipoises.

According to some of any of the embodiments described herein, a total amount of the at least one multi-functional ethoxylated (meth)acrylate material that features, when hardened, Tg of from 50 to 80, or from 50 to 70, ° C., ranges from 15 to 30, or from 20 to 30, of the total amount of the formulation.

According to some of any of the embodiments described herein, an average Tg of the at least one multi-functional (meth)acrylate material, when hardened, ranges from 24 to 30, or from 25 to 30, ° C.

According to some of any of the embodiments described herein, an average Tg of the at least one multi-functional (meth)acrylate material, when hardened, ranges from 30 to 60, or from 40 to 60, ° C.

According to some of any of the embodiments described herein, a total amount of the at least one photoinitiator ranges from 0.5 to 1% by weight of the total weight of the formulation.

According to some of any of the embodiments described herein, the at least one photoinitiator is devoid of an alpha-substituted ketone-type photoinitiator.

According to some of any of the embodiments described herein, the at least one photoinitiator comprises, or consists of, a phosphine oxide-type (e.g., mono-acylated phosphine oxide-type) photoinitiator.

According to some of any of the embodiments described herein, the formulation further comprises a surface active agent.

According to some of any of the embodiments described herein, an amount of the surface active agent is lower than 0.05% by weight of the total weight of the formulation.

According to some of any of the embodiments described herein, the formulation further comprises a blue dye or pigment.

According to some of any of the embodiments described herein, an amount of the blue dye or pigment is lower than $1 \cdot 10^{-4}$%, by weight, of the total weight of the formulation.

According to some of any of the embodiments described herein, the formulation further comprises a sulfur-containing compound.

According to some of any of the embodiments described herein, the formulation is devoid of a sulfur-containing compound.

According to some of any of the embodiments described herein, the sulfur-containing compound is selected from a beta-mercaptopropionate, a mercaptoacetate, and an alkane thiol.

According to some of any of the embodiments described herein, the formulation is usable in additive manufacturing of a three-dimensional object comprising, in at least a portion thereof, a transparent material.

According to some of any of the embodiments described herein, the additive manufacturing is three-dimensional ink-jet printing.

According to some of any of the embodiments described herein, the transparent material is characterized by at least one of: Transmittance of at least 80%; Yellowness Index lower than 3, or lower than 2.5; a CIE-LAB Lightness value L* of at least 90; a CIE-LAB a* value of at least −0.35; and a CIE-LAB b* value of less than 2, or less than 1.5, when measured as described in the Examples section that follows.

According to as aspect of some embodiments of the present invention there is provided a method of additive manufacturing a three-dimension object that comprises in at least a portion thereof a transparent material, the method comprising sequentially forming a plurality of layers in a configured pattern corresponding to the shape of the object, thereby forming the object, wherein the formation of each of at least a few of the layers comprises dispensing at least one formulation, and exposing the dispensed formulation to a curing condition to thereby form a cured modeling material, wherein the at least one formulation is the curable transparent formulation as defined in any of the respective embodiments and any combination thereof.

According to some of any of the embodiments described herein, the formation of each of at least a few of the layers comprises dispensing at least two formulations, and exposing the dispensed formulations to a curing condition to thereby form a cured material, wherein at least one of the formulations is a first formulation which is the formulation as defined in any of the respective embodiments and any combination thereof and at least one another of the formulations is a second modeling material formulation which provides, when hardened, a transparent material, and which upon exposure to the curing condition exhibits a hardening degree that is higher than a hardening degree of the first formulation.

According to some of any of the embodiments described herein, the formation of each of at least a few of the layers comprises dispensing at least the first and the second formulations to form a core region using the first formulation and at least one envelope region at least partially surrounding the core region using the second formulation.

According to some of any of the embodiments described herein, a thickness of the envelope region ranges from 0.05 to 2, or from 0.1 to 2, mm.

According to some of any of the embodiments described herein, the method further comprises, prior to the formation of the layers, applying a rotational transformation of coordinates to slice data describing to the shape of the object, so as to ensure that at least one face of the object is not perpendicular to the layers.

According to some of any of the embodiments described herein, the method further comprises, subsequent to exposing to the curing condition, exposing the object to a condition that promotes decomposition of a residual amount of the photoinitiator (photobleaching).

According to some of any of the embodiments described herein, exposing to the condition comprises exposing the object to light having a color temperature of at least 5000K, or at least 6500K.

According to some of any of the embodiments described herein, exposing to the light is by a light source operating at a power of at least 25 W.

According to an aspect of some embodiments of the present invention there is provided an object comprising in at least a portion thereof a transparent material, obtainable by the method as described herein in any of the respective embodiments and any combination thereof.

According to some of any of the embodiments described herein, the transparent material is characterized by at least one of: Transmittance of at least 80%; Yellowness Index lower than 3, or lower than 2.5; a CIE-LAB Lightness value $L^*$, as defined in X-rite measurements, of at least 90; a CIE-LAB $a^*$ value as defined in X-rite measurements, of at least −0.35; and a CIE-LAB $b^*$ value as defined in X-rite measurements, of less than 2, or less than 1.5, when measured as described in the Examples section that follows.

According to some of any of the embodiments described herein, the transparent material is characterized by at least one of: Tensile strength higher than 30 MPa; Flexural strength higher than 30 MPa; Flexural Modulus higher than 1500 MPa; Izod Impact higher than 15 J/mol; HDT higher than 40° C.; and Elongation to break of at least 7% (e.g., 7-30%).

According to as aspect of some embodiments of the present invention there is provided a kit comprising a first formulation being the formulation as described herein in any of the respective embodiments and any combination thereof and a second formulation that provides, when hardened, a transparent material, the second formulation featuring, when exposed to irradiation, a hardening rate higher than a hardening rate of the first formulation.

According to some of any of the embodiments described herein, the first and second formulations are packaged individually within the kit.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE SEVERAL VIEWS OF THE DRAWING(S)

The patent or application file contains at least one drawing executed in color. Copies of this patent or patent application publication with color drawing(s) will be provided by the Office upon request and payment of the necessary fee.

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings:

FIGS. 1A-D are schematic illustrations of an additive manufacturing system according to some embodiments of the invention;

FIGS. 2A-2C are schematic illustrations of printing heads according to some embodiments of the present invention;

Figure 5A:
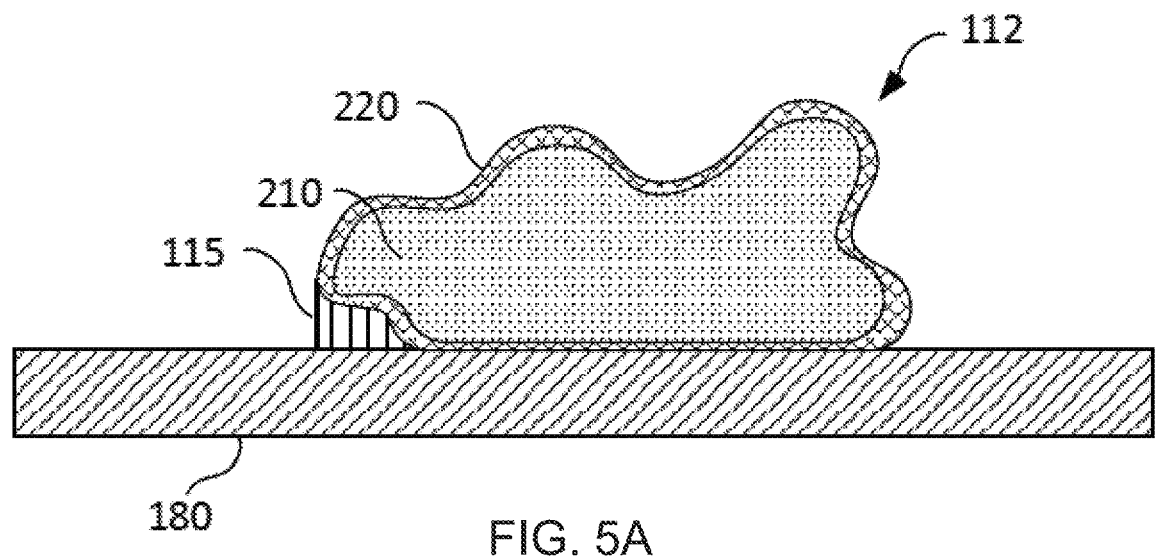
Figure 5B:
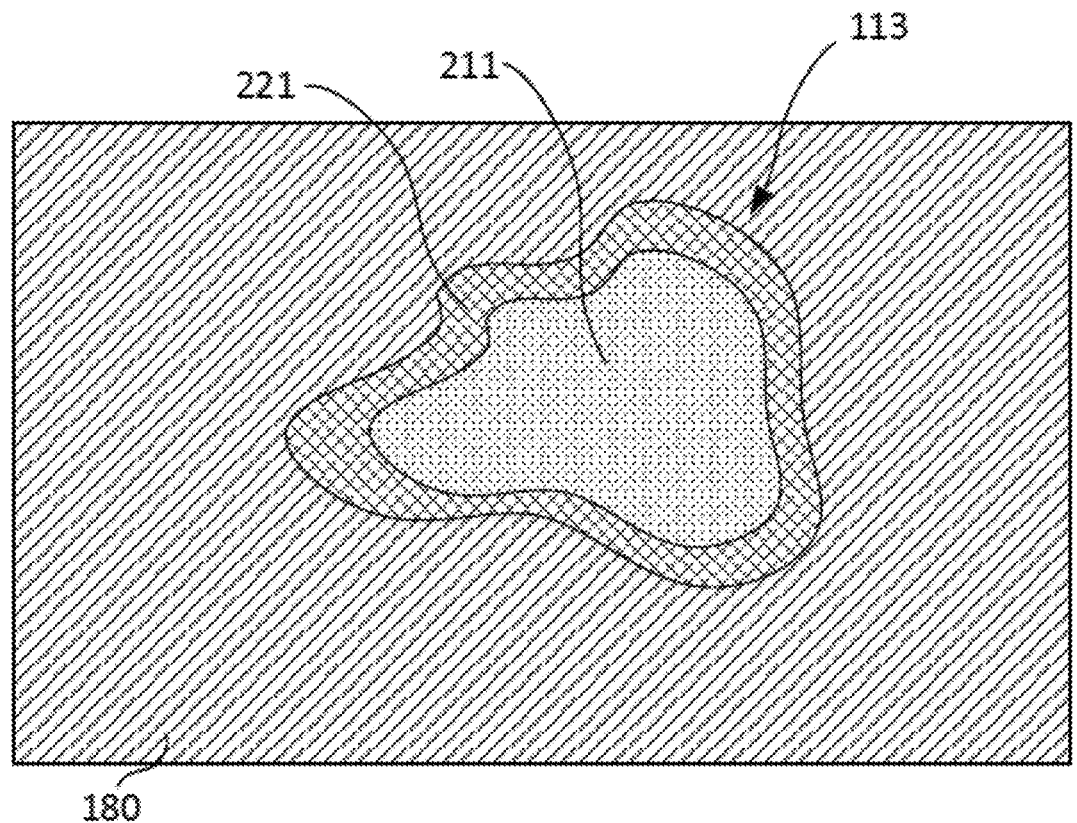

FIGS. 5A-B are simplified schematic drawings of a cross sectional view (FIG. 5A) of an object fabricated with a core filled with a first formulation according to embodiments of the present invention enveloped by a shell formed with a second formulation according to some embodiments of the present invention and a top view (FIG. 5B) of single layer of the object respectively, both in accordance with some exemplary embodiments of the present invention.

Figure 6:

FIG. 6 presents objects formed in 3D inkjet printing using J-750 system, and SUP 705 as a support material formulation, and exemplary reference formulations I (left object) and II (right object), as modeling material formulations.

Figure 7A:
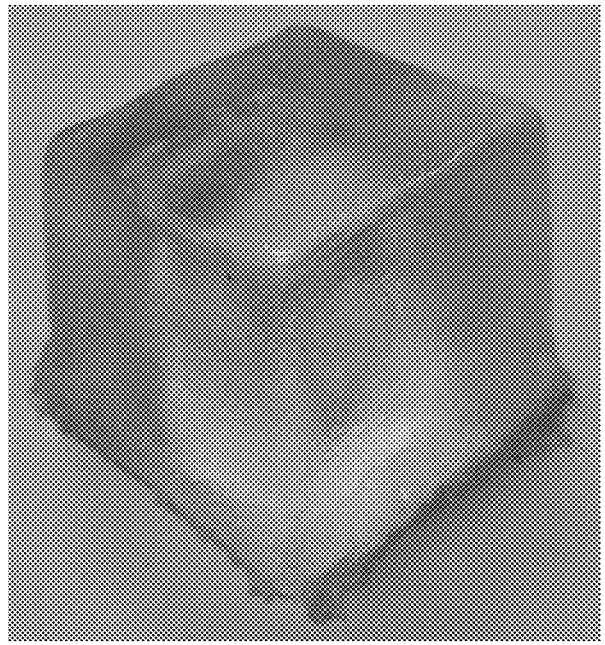
Figure 7B:
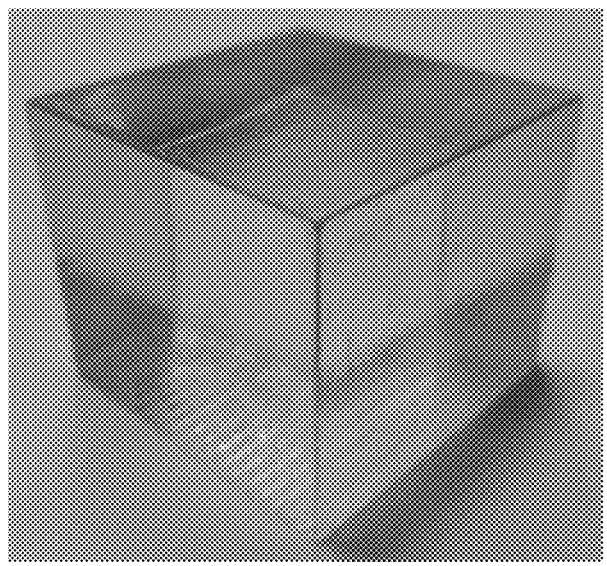

FIGS. 7A and 7B present photographs of a cube object made of an exemplary partially reactive formulation according to the present embodiments, Ex. Formulation I, per se (FIG. 7A) and of a core made of an exemplary partially reactive formulation according to the present embodiments, Ex. Formulation I, enveloped by an outer layer, 0.5 mm-thick, made of a full PI-content, reactive transparent formulation such as, for example, Ref. Formulation I (FIG. 7B).

Figure 7C:
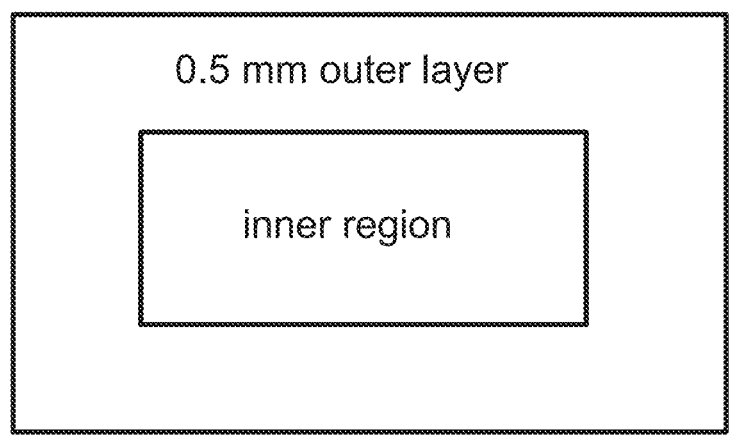

FIG. 7C is a schematic presentation of the printing mode used for forming the cube object shown in FIG. 7B.

Figure 8:
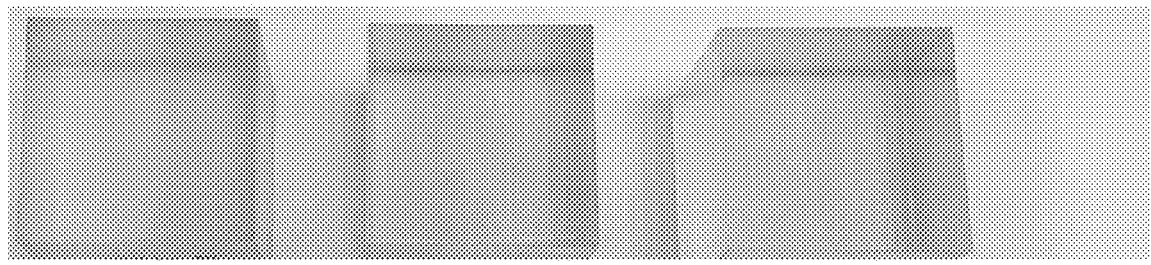

FIG. 8 presents photographs of cube objects made of an inner core enveloped by a 0.5 mm-thick Ref. Formulation I outer layer, in which the inner core is made using an exemplary reactive formulation Ref. Formulation II, (left object), using the same Ref. Formulation II to which a coloring agent which provides a blue tint is added (middle object), and using Ex. formulation II according to some of the present embodiments (right object).

Figure 9:
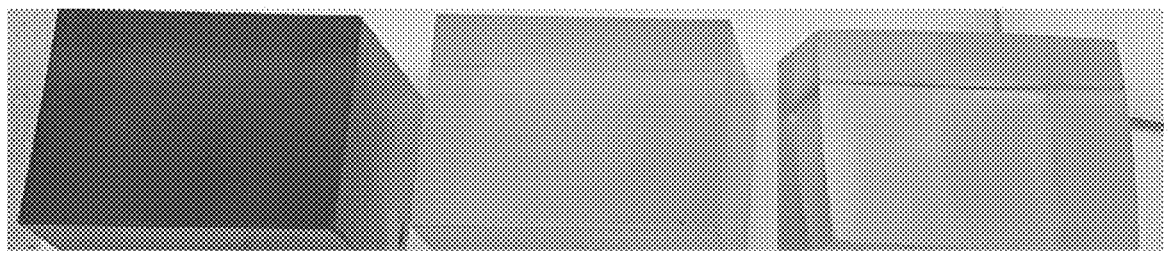

FIG. 9 presents photographs of a cube object made of an exemplary reactive formulation as presented herein, in Table 2A, Ref. Formulation I (left object), a cube object made of the same formulation without a coloring agent which provides a blue tint (middle object), and a cube object made of an exemplary formulation I according to some of the present embodiments as the inner core, enveloped by Ref. Formulation I (right object).

FIG. 10 presents the transmittance, as measured using Ci7860 from X-rite, through each of the faces of an object fabricated in a manner that each of its faces was parallel to one of the x-y, x-z, and y-z planes (upper panel) and of an object fabricated, so that each of the faces formed an angle of about 45° with each of the x-y, x-z, and y-z planes (lower panel), following a post-fabrication photo-bleaching and polishing treatment.

Figure 11A:
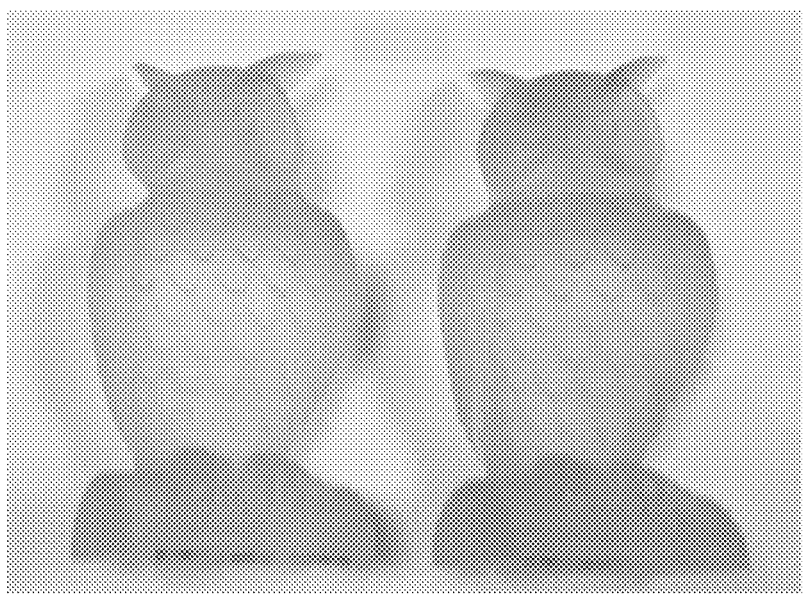
Figure 11B:
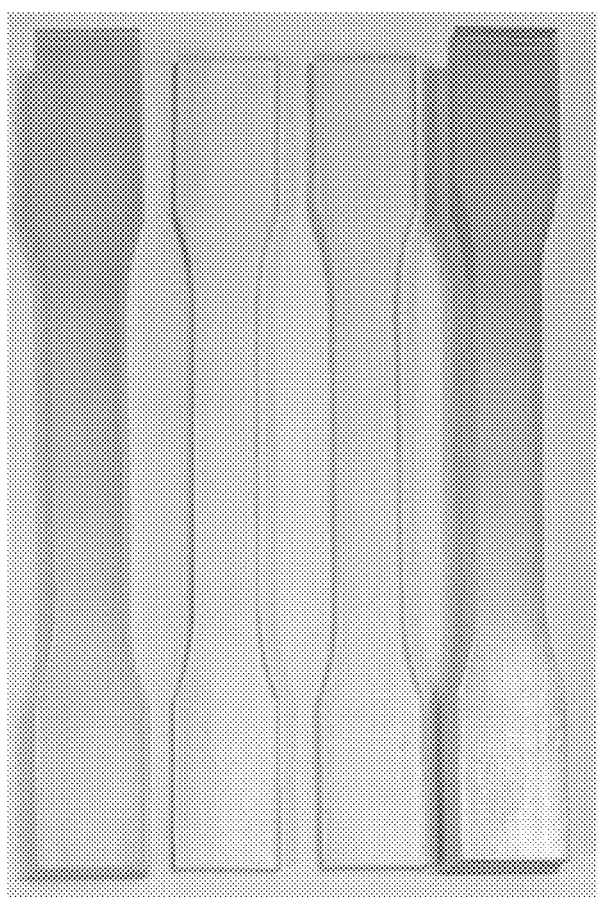
Figure 12A:
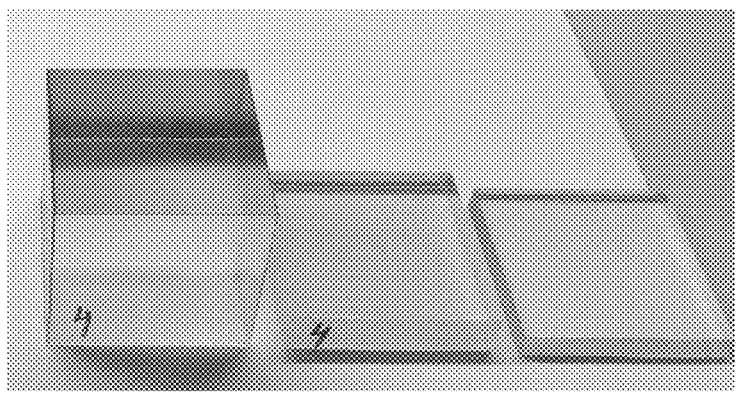
Figure 12B:
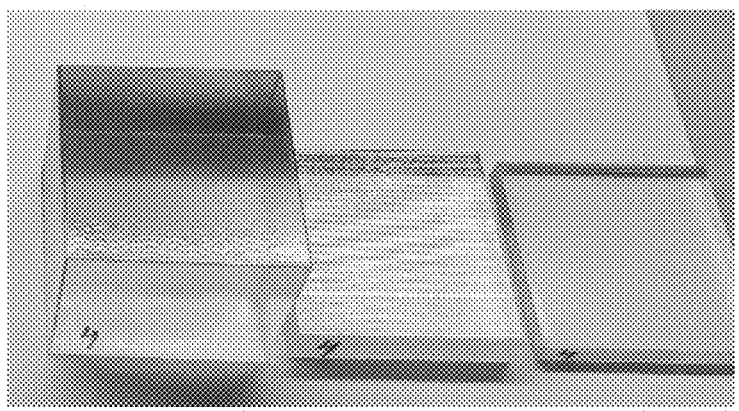
Figure 12C:
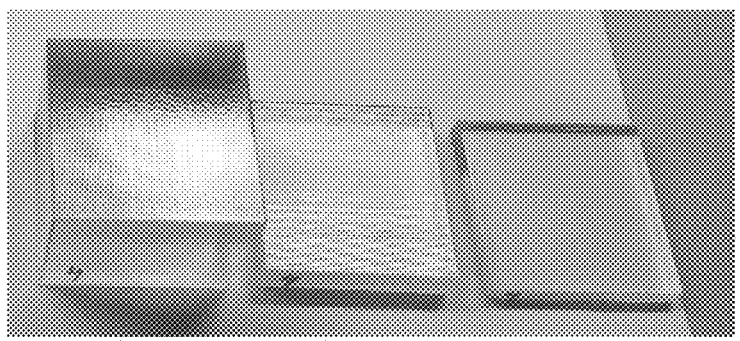
Figure 12D:
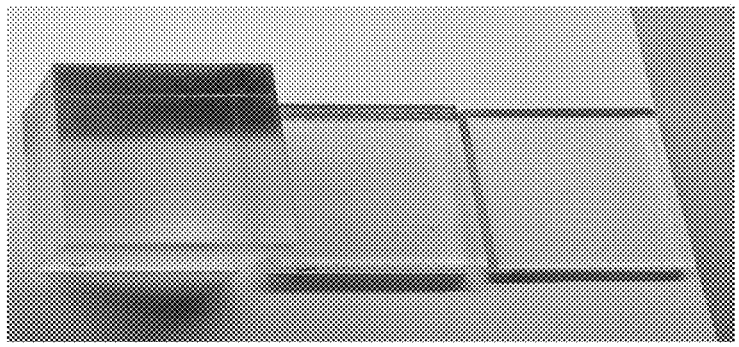

FIGS. 11A-B present photographs of exemplary objects made using an exemplary transparent formulation, Ex. Formulation I, according to some of the present embodiments, before and after exposure to 24-hours photobleaching as described in Example 5.

FIGS. 12A-D present images of cube objects of various depths, made of Ex. Formulation I according to some of the present embodiments as an inner core, enveloped by Ref. Formulation I, before photobleaching (PB) (FIG. 12A) and after 2 hours (FIG. 12B), 10 hours (FIG. 12C) and 24 hours (FIG. 12D) of photobleaching.

Figure 13:
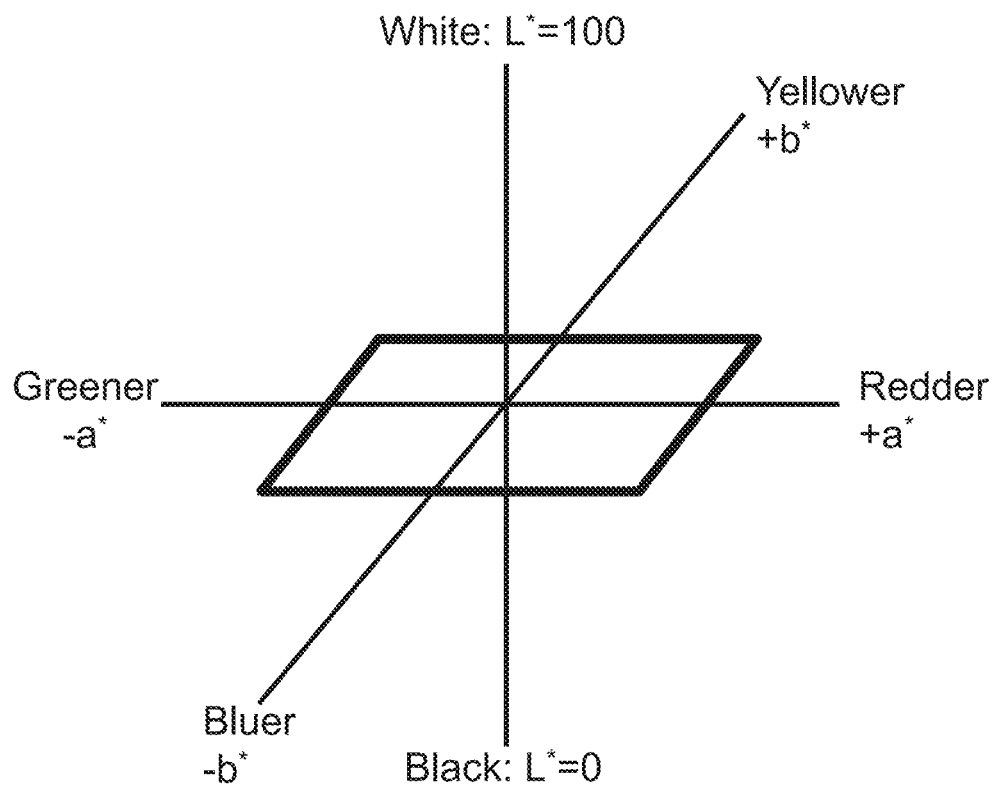

FIG. 13 (Background Art) presents scales usable in X-Rite color quantitative measurements.

Figure 14:
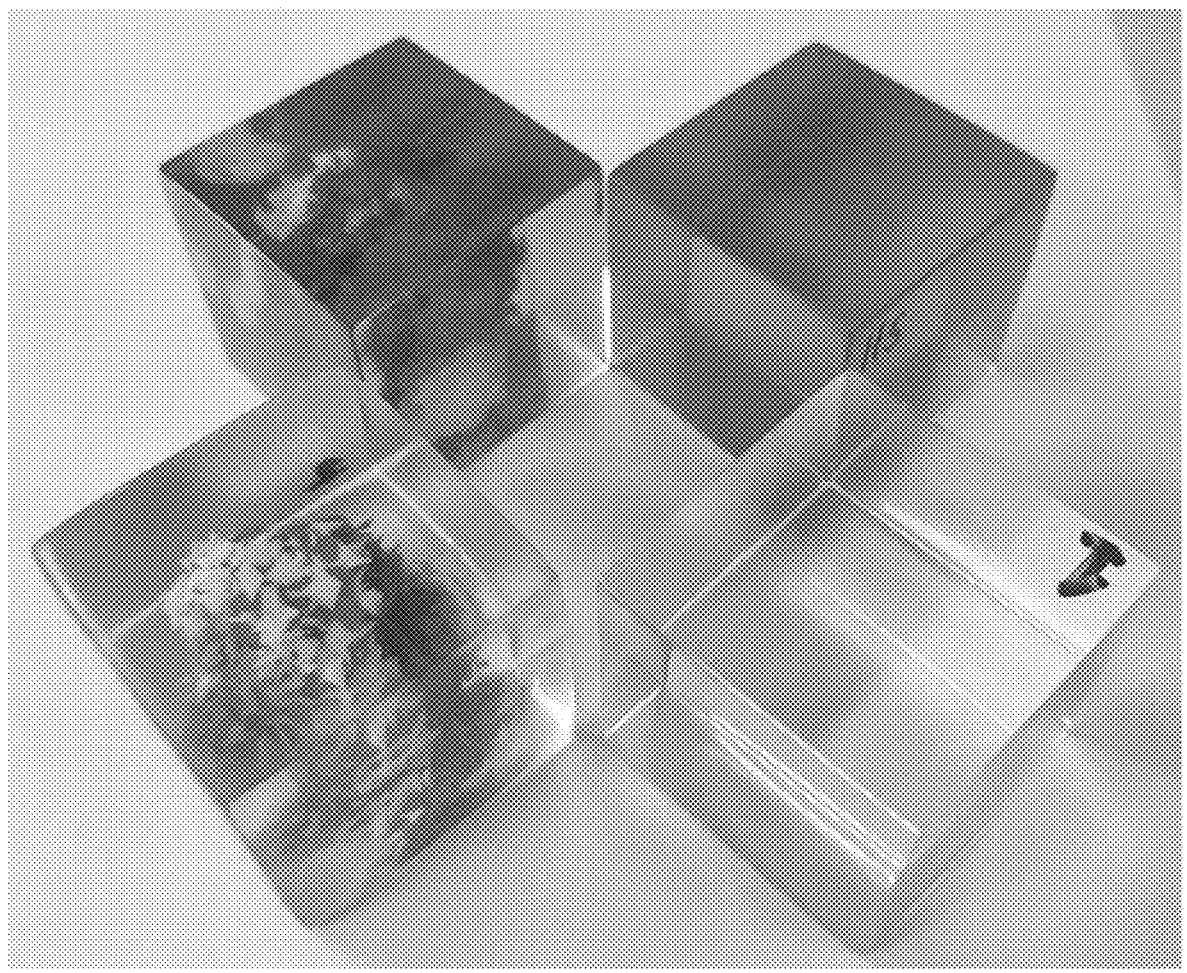

FIG. 14 presents photographs of exemplary objects made using Ref. Formulation I (upper objects) and the same exemplary objects made using Ex. Formulation I according to some of the present embodiments (lower objects).

Figure 15:
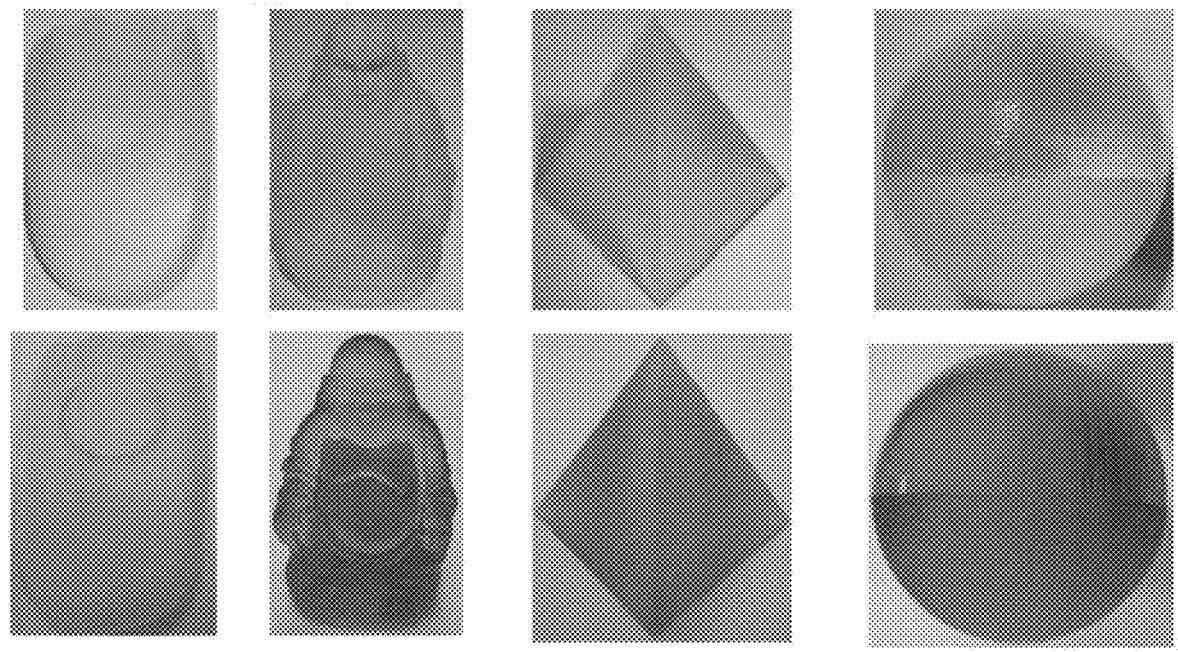

FIG. 15 presents photographs of objects made of Ref. Formulation I (lower panel) and of the same objects made of Ex. Formulation I, according to some of the present embodiments (upper panel).

DESCRIPTION OF SPECIFIC EMBODIMENTS OF THE INVENTION

The present invention, in some embodiments thereof, relates to additive manufacturing and, more particularly, but not exclusively, to formulations usable in additive manufacturing of three-dimensional objects containing, in at least a portion thereof, a transparent material, to kits containing such formulations and to additive manufacturing of three-dimensional objects using such formulations.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

The present inventors have designed and successfully practiced a method of additive manufacturing a three-dimensional object, which provides objects featuring improved properties while overcoming limitations associated with various model materials, as is discussed in further detail hereinafter. More specifically, the present inventors have designed and successfully practiced modeling material formulations and additive manufacturing methods using same, which are usable in manufacturing objects having in at least a portion thereof a transparent material, while reducing or nullifying the yellow hue of the transparent material that is typically associated with currently available formulations, and/or while improving the transmittance of the transparent material.

Embodiments of the present invention therefore relate to novel formulations and to additive manufacturing methods using same, which are usable for manufacturing three-dimensional objects having a transparent material as defined herein in at least a portion thereof.

Herein throughout, the term "object" describes a final product of the additive manufacturing. This term refers to the product obtained by a method as described herein, after removal of the support material, if such has been used as part of the uncured building material, and after post treatment (e.g., exposure to second curing condition as described herein). The "object" therefore typically essentially consists of (at least 95 weight percent) of a cured (hardened, solidified) modeling material or a combination of two or more modeling materials. In some applications, the final object includes, in at least a portion thereof, partially cured and/or uncured modeling material(s).

The term "object" as used herein throughout refers to a whole object or a part thereof.

Herein throughout, the phrase "cured modeling material" which is also referred to herein as "hardened" or "solidified" modeling material describes the part of the building material that forms the object, as defined herein, upon exposing the dispensed building material to a curing condition (and optionally post-treatment), and, optionally, if a support material has been dispensed, removal of the cured support material, as described herein. The hardened modeling material can be a single hardened material or a mixture of two or more hardened materials, depending on the modeling material formulations used in the method, as described herein.

The phrases "cured modeling material", "hardened modeling material", "solidified modeling material" or "cured/hardened/solidified modeling material formulation" can be regarded as a cured building material wherein the building material consists only of a modeling material formulation (and not of a support material formulation). That is, this phrase refers to the portion of the building material, which is used to provide the final object.

Herein throughout, the phrase "modeling material formulation", which is also referred to herein interchangeably as "modeling formulation", "modeling material" "model material" or simply as "formulation", describes a part or all of the uncured building material which is dispensed so as to form the object, as described herein. The modeling material formulation is an uncured modeling formulation (unless specifically indicated otherwise), which, upon exposure to a condition that effects curing, may form the object or a part thereof.

In some embodiments of the present invention, a modeling material formulation is formulated for use in three-dimensional inkjet printing and is able to form a three-dimensional object on its own, i.e., without having to be mixed or combined with any other substance.

An uncured building material can comprise one or more modeling material formulations, and can be dispensed such that different parts of the object are made, upon being hardened, of different cured modeling formulations, and hence are made of different hardened (e.g., cured) modeling materials or different mixtures of hardened (e.g., cured) modeling materials.

The final three-dimensional object is made of the modeling material or a combination of modeling materials or a combination of modeling material/s and support material/s or modification thereof (e.g., following curing). All these operations are well-known to those skilled in the art of solid freeform fabrication.

In some exemplary embodiments of the invention, an object is manufactured by dispensing a building material that comprises two or more different modeling material formulations, each modeling material formulation from a different dispensing head and/or nozzle of the inkjet printing apparatus. The modeling material formulations are optionally and preferably deposited in layers during the same pass of the printing heads. The modeling material formulations and/or combination of formulations within the layer are selected according to the desired properties of the object and according to the method parameters described herein.

An uncured building material can comprise one or more modeling formulations, and can be dispensed such that different parts of the model object are made upon curing different modeling formulations, and hence are made of different cured modeling materials or different mixtures of cured modeling materials.

Herein throughout, the phrase "hardened support material" is also referred to herein interchangeably as "cured support material" or simply as "support material" and describes the part of the building material that is intended to support the fabricated final object during the fabrication process, and which is removed once the process is completed and a hardened modeling material is obtained.

Herein throughout, the phrase "support material formulation", which is also referred to herein interchangeably as "support formulation" or simply as "formulation", describes a part of the uncured building material which is dispensed so as to form the support material, as described herein. The support material formulation is an uncured formulation. When a support material formulation is a curable formulation, it forms, upon exposure to a curing condition, a hardened support material.

Support materials, which can be either liquid materials or hardened, typically gel materials, are also referred to herein as sacrificial materials, which are removable after layers are dispensed and exposed to a curing energy, to thereby expose the shape of the final object.

Herein and in the art, the term "gel" describes a material, often referred to as a semi-solid material, which comprises a three-dimensional solid network, typically made of fibrous structures chemically or physically linked therebetween, and a liquid phase encaged within this network. Gels are typically characterized by a consistency of a solid (e.g., are non-fluidic), and feature relatively low Tensile strength, relatively low Shear Modulus, e.g., lower than 100 kPa, and a Shear Loss Modulus to Shear Storage modulus (tan delta, $G''/G'$) value lower than 1. Gels can be characterized as flowable when subjected to a positive pressure of at least 0.5 bar, preferably at least 1 bar, or higher, or, alternatively, as non-flowable when subject to a pressure lower than 1 bar or lower than 0.5 bar or of 0.3 bar or lower.

Currently practiced support materials typically comprise a mixture of curable and non-curable materials, and are also referred to herein as gel support material.

Currently practiced support materials are typically water miscible, or water-dispersible or water-soluble.

Herein throughout, the term "water-miscible" describes a material which is at least partially dissolvable or dispersible in water, that is, at least 50% of the molecules move into the water upon mixing at room temperature, e.g., when mixed with water in equal volumes or weights, at room temperature. This term encompasses the terms "water-soluble" and "water dispersible".

Herein throughout, the term "water-soluble" describes a material that when mixed with water in equal volumes or weights, at room temperature, a homogeneous solution is formed.

Herein throughout, the term "water-dispersible" describes a material that forms a homogeneous dispersion when mixed with water in equal volumes or weights, at room temperature.

Herein throughout, the phrase "dissolution rate" describes a rate at which a substance is dissolved in a liquid medium. Dissolution rate can be determined, in the context of the present embodiments, by the time needed to dissolve a certain amount of a support material. The measured time is referred to herein as "dissolution time". Unless otherwise indicated, "dissolution time" is at room temperature.

The method and system of the present embodiments manufacture three-dimensional objects based on computer object data in a layerwise manner by forming a plurality of layers in a configured pattern corresponding to the shape of the objects. The computer object data can be in any known format, including, without limitation, a Standard Tessellation Language (STL) or a StereoLithography Contour (SLC) format, Virtual Reality Modeling Language (VRML), Additive Manufacturing File (AMF) format, Drawing Exchange Format (DXF), Polygon File Format (PLY) or any other format suitable for Computer-Aided Design (CAD).

Each layer is formed by additive manufacturing apparatus which scans a two-dimensional surface and patterns it. While scanning, the apparatus visits a plurality of target locations on the two-dimensional layer or surface, and decides, for each target location or a group of target locations, whether or not the target location or group of target locations is to be occupied by building material formulation, and which type of building material formulation is to be delivered thereto. The decision is made according to a computer image of the surface.

In preferred embodiments of the present invention the AM comprises three-dimensional printing, more preferably three-dimensional inkjet printing. In these embodiments a building material formulation is dispensed from a dispensing head having a set of nozzles to deposit building material formulation in layers on a supporting structure. The AM apparatus thus dispenses building material formulation in target locations which are to be occupied and leaves other target locations void. The apparatus typically includes a plurality of dispensing heads, each of which can be configured to dispense a different building material formulation. Thus, different target locations can be occupied by different building material formulations. The types of building material formulations can be categorized into two major categories: modeling material formulation and support material formulation. The support material formulation serves as a supporting matrix or construction for supporting the object or object parts during the fabrication process and/or other purposes, e.g., providing hollow or porous objects. Support constructions may additionally include modeling material formulation elements, e.g. for further support strength.

The final three-dimensional object is made of the modeling material or a combination of modeling materials or of modeling and support materials or modification thereof (e.g., following curing). All these operations are well-known to those skilled in the art of solid freeform fabrication.

In some exemplary embodiments of the invention an object is manufactured by dispensing one or more different modeling material formulations. When more than one modeling material formulation is used, each modeling material formulation is optionally and preferably dispensed from a different array of nozzles (belonging to the same or distinct dispensing heads) of the AM apparatus.

In some embodiments, the dispensing head of the AM apparatus is a multi-channels dispensing head, in which case different modeling material formulations can be dispensed from two or more arrays of nozzles that are located in the same multi-channels dispensing head. In some embodiments, arrays of nozzles that dispense different modeling material formulations are located in separate dispensing heads, for example, a first array of nozzles dispensing a first modeling material formulation is located in a first dispensing head, and a second array of nozzles dispensing a second modeling material formulation is located in a second dispensing head.

In some embodiments, an array of nozzles that dispense a modeling material formulation and an array of nozzles that dispense a support material formulation are both located in the same multi-channels dispensing head. In some embodiments, an array of nozzles that dispense a modeling material formulation and an array of nozzles that dispense a support material formulation are located in separate dispensing head heads.

The material formulations are optionally and preferably deposited in layers during the same pass of the printing heads. The material formulations and combination of material formulations within the layer are selected according to the desired properties of the object.

Figure 1A:
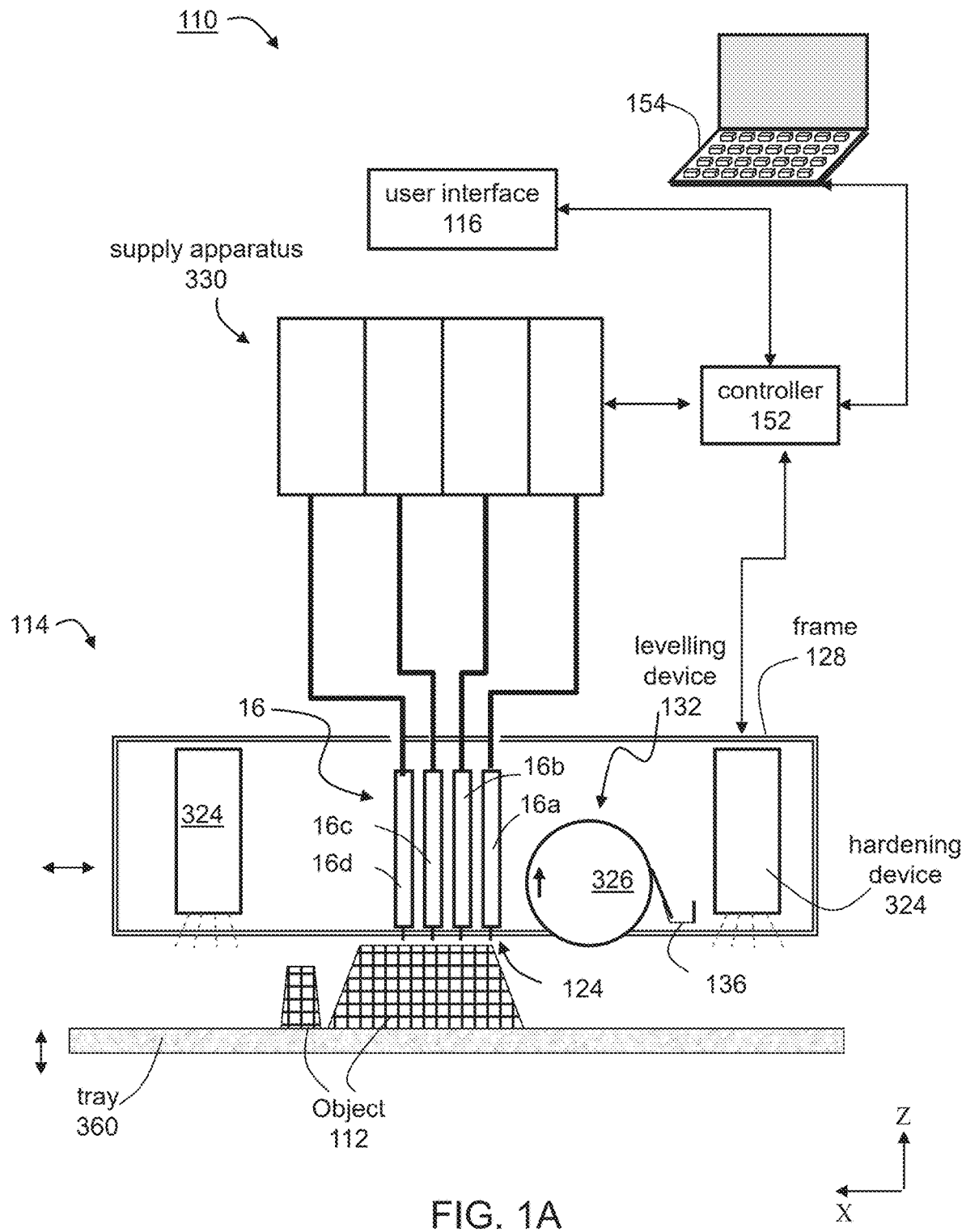

System:

A representative and non-limiting example of a system 110 suitable for AM of an object 112 according to some embodiments of the present invention is illustrated in FIG. 1A. System 110 comprises an additive manufacturing apparatus 114 having a dispensing unit 16 which comprises a plurality of dispensing heads. Each head preferably comprises an array of one or more nozzles 122, as illustrated in FIGS. 2A-C described below, through which a liquid building material formulation 124 is dispensed.

Preferably, but not obligatorily, apparatus 114 is a three-dimensional printing apparatus, in which case the dispensing heads are printing heads, and the building material formulation is dispensed via inkjet technology. This need not necessarily be the case, since, for some applications, it may not be necessary for the additive manufacturing apparatus to employ three-dimensional printing techniques. Representative examples of additive manufacturing apparatus contemplated according to various exemplary embodiments of the present invention include, without limitation, fused deposition modeling apparatus and fused material formulation deposition apparatus.

Each dispensing head is optionally and preferably fed via a building material formulation reservoir which may optionally include a temperature control unit (e.g., a temperature sensor and/or a heating device), and a material formulation level sensor. Optionally, more than one dispensing head is fed via the same material formulation reservoir, e.g. two dispensing heads may share the same material formulation reservoir to dispense the same material, or two different materials via a single, but internally separated reservoir. To dispense the building material formulation, a voltage signal is applied to the dispensing heads to selectively dispense droplets of material formulation via the dispensing head nozzles, for example, as in piezoelectric inkjet printing technology. The dispensing rate of each head depends on the number of nozzles, the type of nozzles and the applied voltage signal rate (frequency). Such dispensing heads are known to those skilled in the art of solid freeform fabrication. Another example includes thermal inkjet printing heads. In these types of heads, there are heater elements in thermal contact with the building material, for heating the building material to form gas bubbles therein, upon activation of the heater elements by a voltage signal. The gas bubbles generate pressures in the building material, causing droplets of building material to be ejected through the nozzles. Piezoelectric and thermal printing heads are known to those skilled in the art of solid freeform fabrication.

Preferably, but not obligatorily, the overall number of dispensing nozzles or nozzle arrays is selected such that half of the dispensing nozzles are designated to dispense support material formulation and half of the dispensing nozzles are designated to dispense modeling material formulation, i.e. the number of nozzles jetting modeling material formulations is the same as the number of nozzles jetting support material formulation. In the representative example of FIG. 1A, four dispensing heads 16a, 16b, 16c and 16d are illustrated. Each of heads 16a, 16b, 16c and 16d has a nozzle array. In this Example, heads 16a and 16b can be designated for modeling material formulation/s and heads 16c and 16d can be designated for support material formulation. Thus, head 16a can dispense a first modeling material formulation, head 16b can dispense a second modeling material formulation and heads 16c and 16d can both dispense support material formulation. In an alternative embodiment, heads 16c and 16d, for example, may be combined in a single head having two nozzle arrays for depositing support material formulation. In a further alternative embodiment any one or more of the dispensing heads may have more than one nozzle arrays for dispensing more than one material formulation, e.g. two nozzle arrays for dispensing two different modeling material formulations or a modeling material formulation and a support material formulation, each formulation via a different array or number of nozzles.

Yet it is to be understood that it is not intended to limit the scope of the present invention and that the number of modeling material formulation depositing heads (modeling heads) and the number of support material formulation depositing heads (support heads) may differ. Generally, the number of modeling heads, the number of support heads and the number of nozzles in each respective head or head array are selected such as to provide a predetermined ratio, a, between the maximal dispensing rate of the support material formulation and the maximal dispensing rate of modeling material formulation. The value of the predetermined ratio, a, is preferably selected to ensure that in each formed layer, the height of modeling material formulation equals the height of support material formulation. Typical values for a are from about 0.6 to about 1.5.

For example, for a=1, the overall dispensing rate of support material formulation is generally the same as the overall dispensing rate of the modeling material formulation when all modeling heads and support heads operate.

In a preferred embodiment, there are M modeling heads each having m arrays of p nozzles, and S support heads each having s arrays of q nozzles such that M×m×p=S×s×q. Each of the M×m modeling arrays and S×s support arrays can be manufactured as a separate physical unit, which can be assembled and disassembled from the group of arrays. In this embodiment, each such array optionally and preferably comprises a temperature control unit and a material formulation level sensor of its own, and receives an individually controlled voltage for its operation.

Apparatus 114 can further comprise a solidifying device 324 which can include any device configured to emit light, heat or the like that may cause the deposited material formulation to hardened. For example, solidifying device 324 can comprise one or more radiation sources, which can be, for example, an ultraviolet or visible or infrared lamp, or other sources of electromagnetic radiation, or electron beam source, depending on the modeling material formulation being used. In some embodiments of the present invention, solidifying device 324 serves for curing or solidifying the modeling material formulation.

The dispensing head and radiation source are preferably mounted in a frame or block 128 which is preferably operative to reciprocally move over a tray 360, which serves as the working surface. In some embodiments of the present invention the radiation sources are mounted in the block such that they follow in the wake of the dispensing heads to at least partially cure or solidify the material formulations just dispensed by the dispensing heads. Tray 360 is positioned horizontally. According to the common conventions an X—Y—Z Cartesian coordinate system is selected such that the X-Y plane is parallel to tray 360. Tray 360 is preferably configured to move vertically (along the Z direction), typically downward. In various exemplary embodiments of the invention, apparatus 114 further comprises one or more leveling devices 132, e.g. a roller 326. Leveling device 326 serves to straighten, level and/or establish a thickness of the newly formed layer prior to the formation of the successive layer thereon. Leveling device 326 preferably comprises a waste collection device 136 for collecting the excess material formulation generated during leveling. Waste collection device 136 may comprise any mechanism that delivers the material formulation to a waste tank or waste cartridge.

In use, the dispensing heads of unit 16 move in a scanning direction, which is referred to herein as the X direction, and selectively dispense building material formulation in a predetermined configuration in the course of their passage over tray 360. The building material formulation typically comprises one or more types of support material formulation and one or more types of modeling material formulation. The passage of the dispensing heads of unit 16 is followed by the curing of the modeling material formulation(s) by radiation source 126. In the reverse passage of the heads, back to their starting point for the layer just deposited, an additional dispensing of building material formulation may be carried out, according to predetermined configuration. In the forward and/or reverse passages of the dispensing heads, the layer thus formed may be straightened by leveling device 326, which preferably follows the path of the dispensing heads in their forward and/or reverse movement. Once the dispensing heads return to their starting point along the X direction, they may move to another position along an indexing direction, referred to herein as the Y direction, and continue to build the same layer by reciprocal movement along the X direction. Alternately, the dispensing heads may move in the Y direction between forward and reverse movements or after more than one forward-reverse movement. The series of scans performed by the dispensing heads to complete a single layer is referred to herein as a single scan cycle.

Once the layer is completed, tray 360 is lowered in the Z direction to a predetermined Z level, according to the desired thickness of the layer subsequently to be printed. The procedure is repeated to form three-dimensional object 112 in a layerwise manner.

In another embodiment, tray 360 may be displaced in the Z direction between forward and reverse passages of the dispensing head of unit 16, within the layer. Such Z displacement is carried out in order to cause contact of the leveling device with the surface in one direction and prevent contact in the other direction.

System 110 optionally and preferably comprises a building material formulation supply system 330 which comprises the building material formulation containers or cartridges and supplies a plurality of building material formulations to fabrication apparatus 114.

A controller 152 controls fabrication apparatus 114 and optionally and preferably also supply system 330. Controller 152 can be a computerized controller having an electronic circuit and a non-volatile memory medium readable by the circuit, wherein the memory medium stores program instructions which, when read by the circuit, cause the circuit to perform control operations as further detailed below. In some embodiments of the present invention the electronic circuit of controller 152 is also configured for performing data processing operations. Controller 152 preferably communicates with a data processor 154 which transmits digital data pertaining to fabrication instructions based on computer object data, e.g., a CAD configuration represented on a computer readable medium in a form of a Standard Tessellation Language (STL) format or the like. Typically, controller 152 controls the voltage applied to each dispensing head or nozzle array and the temperature of the building material formulation in the respective printing head.

Once the manufacturing data is loaded to controller 152 it can operate without user intervention. In some embodiments, controller 152 receives additional input from the operator, e.g., using data processor 154 or using a user interface 116 communicating with unit 152. User interface 116 can be of any type known in the art, such as, but not limited to, a keyboard, a touch screen and the like. For example, controller 152 can receive, as additional input, one or more building material formulation types and/or attributes, such as, but not limited to, color, characteristic distortion and/or transition temperature, viscosity, electrical property, magnetic property. Other attributes and groups of attributes are also contemplated.

Figure 1B:
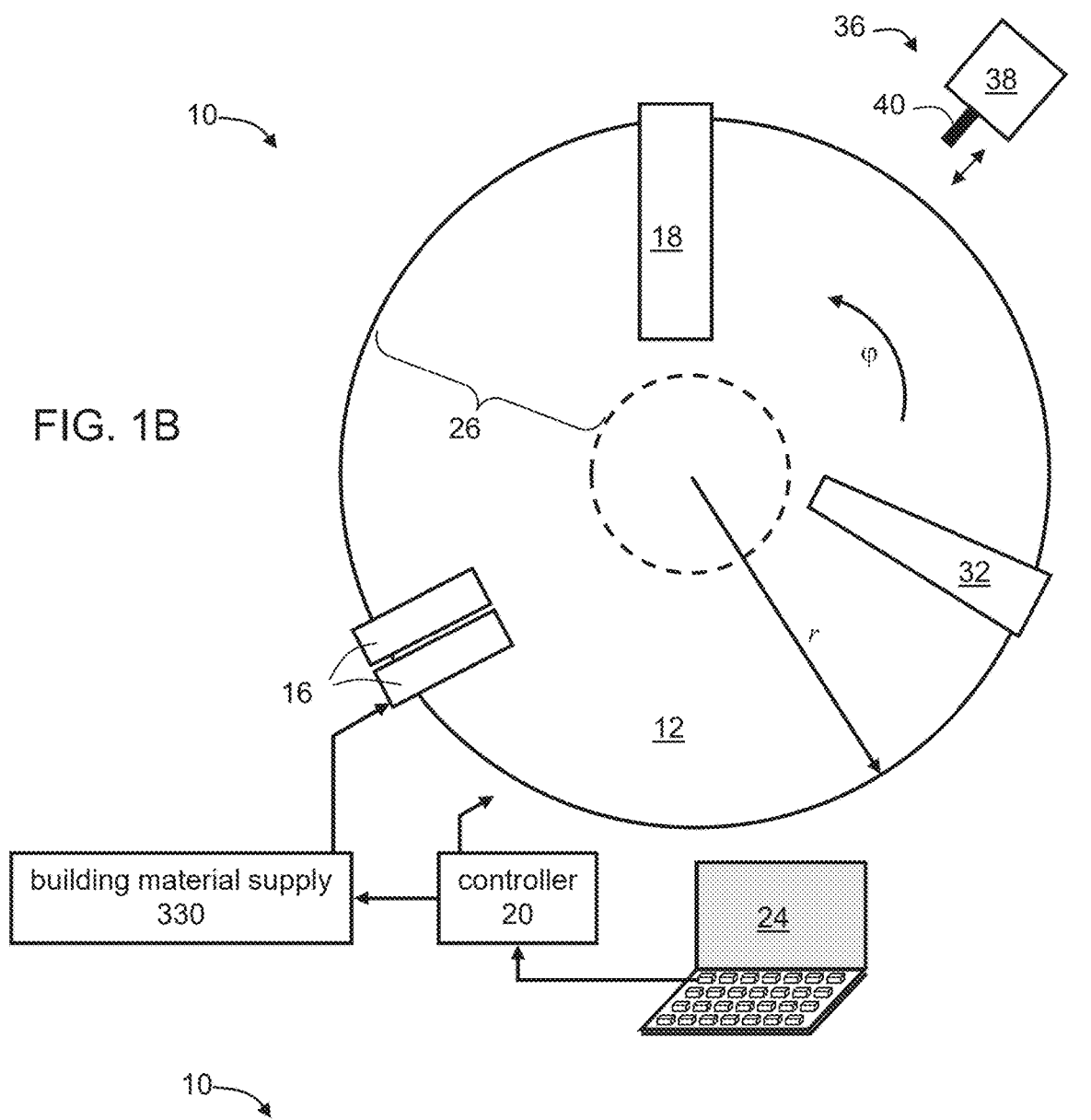
Figure 1C:
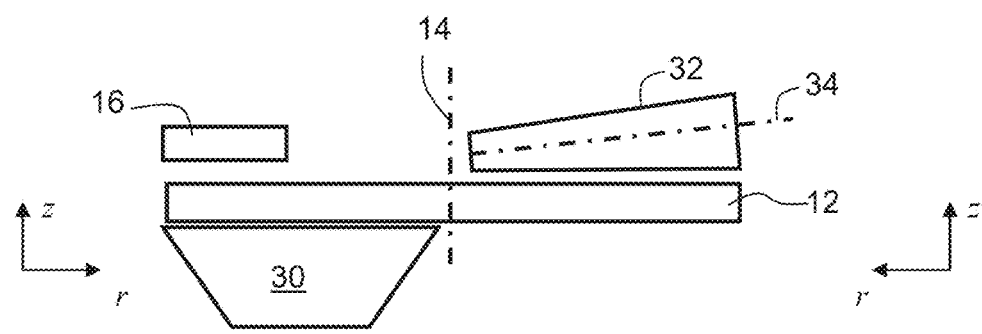
Figure 1D:
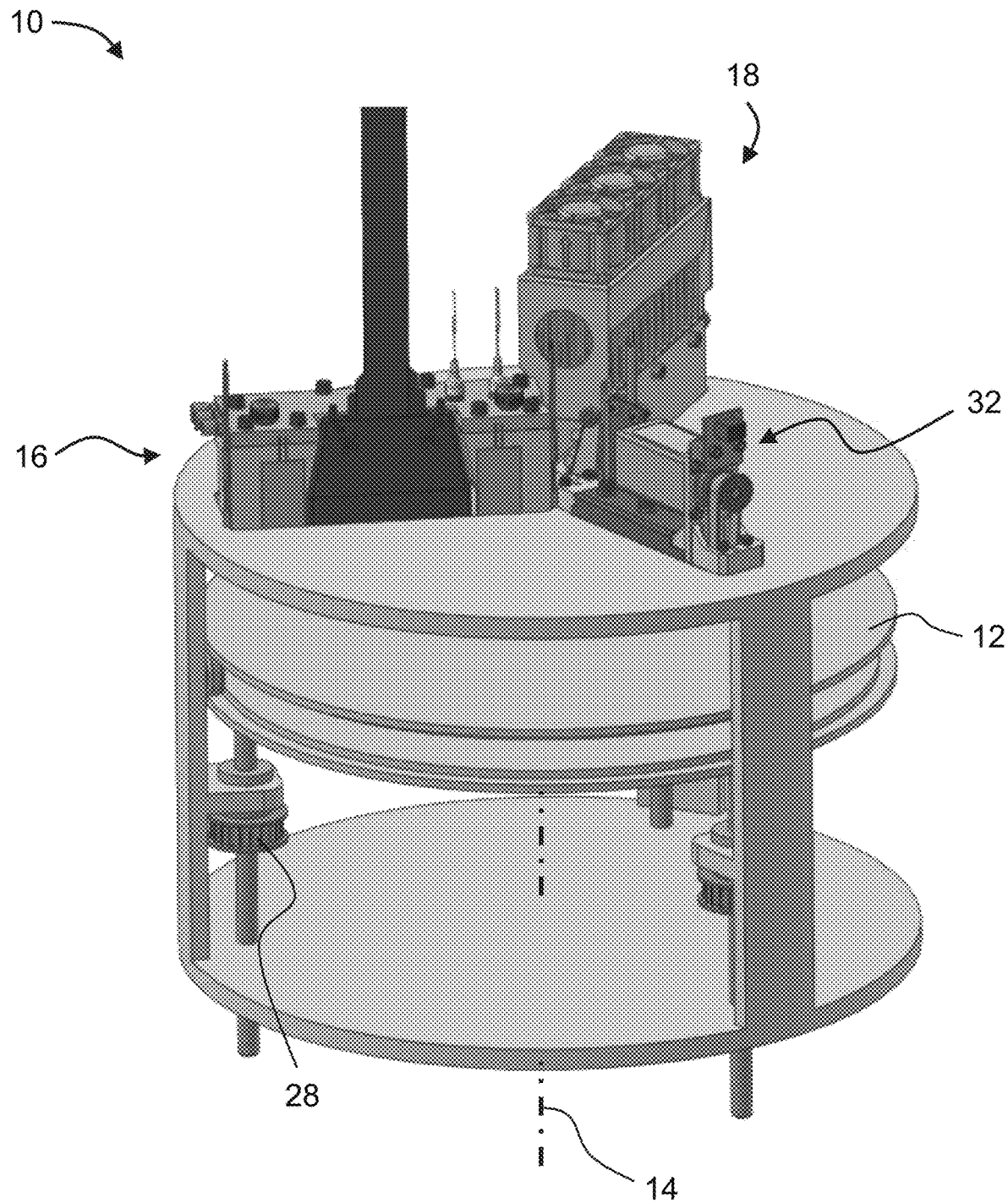

Another representative and non-limiting example of a system 10 suitable for AM of an object according to some embodiments of the present invention is illustrated in FIGS. 1B-D. FIGS. 1B-D illustrate a top view (FIG. 1B), a side view (FIG. 1C) and an isometric view (FIG. 1D) of system 10.

In the present embodiments, system 10 comprises a tray 12 and a plurality of inkjet printing heads 16, each having a plurality of separated nozzles, and arranged to receive building material formulation from supply system 330. Tray 12 can have a shape of a disk or it can be annular. Non-round shapes are also contemplated, provided they can be rotated about a vertical axis.

Tray 12 and heads 16 are optionally and preferably mounted such as to allow a relative rotary motion between tray 12 and heads 16. This can be achieved by (i) configuring tray 12 to rotate about a vertical axis 14 relative to heads 16, (ii) configuring heads 16 to rotate about vertical axis 14 relative to tray 12, or (iii) configuring both tray 12 and heads 16 to rotate about vertical axis 14 but at different rotation velocities (e.g., rotation at opposite direction). While the embodiments below are described with a particular emphasis to configuration (i) wherein the tray is a rotary tray that is configured to rotate about vertical axis 14 relative to heads 16, it is to be understood that the present application contemplates also configurations (ii) and (iii). Any one of the embodiments described herein can be adjusted to be applicable to any of configurations (ii) and (iii), and one of ordinary skills in the art, provided with the details described herein, would know how to make such adjustment.

In the following description, a direction parallel to tray 12 and pointing outwardly from axis 14 is referred to as the radial direction r, a direction parallel to tray 12 and perpendicular to the radial direction r is referred to herein as the azimuthal direction $\varphi$, and a direction perpendicular to tray 12 is referred to herein is the vertical direction z.

The term "radial position," as used herein, refers to a position on or above tray 12 at a specific distance from axis 14. When the term is used in connection to a printing head, the term refers to a position of the head which is at specific distance from axis 14. When the term is used in connection to a point on tray 12, the term corresponds to any point that belongs to a locus of points that is a circle whose radius is the specific distance from axis 14 and whose center is at axis 14.

The term "azimuthal position," as used herein, refers to a position on or above tray 12 at a specific azimuthal angle relative to a predetermined reference point. Thus, radial position refers to any point that belongs to a locus of points that is a straight line forming the specific azimuthal angle relative to the reference point.

The term "vertical position," as used herein, refers to a position over a plane that intersect the vertical axis 14 at a specific point.

Tray 12 serves as a supporting structure for three-dimensional printing. The working area on which one or objects are printed is typically, but not necessarily, smaller than the total area of tray 12. In some embodiments of the present invention the working area is annular. The working area is shown at 26. In some embodiments of the present invention tray 12 rotates continuously in the same direction throughout the formation of object, and in some embodiments of the present invention tray reverses the direction of rotation at least once (e.g., in an oscillatory manner) during the formation of the object. Tray 12 is optionally and preferably removable. Removing tray 12 can be for maintenance of system 10, or, if desired, for replacing the tray before printing a new object. In some embodiments of the present invention system 10 is provided with one or more different replacement trays (e.g., a kit of replacement trays), wherein two or more trays are designated for different types of objects (e.g., different weights) different operation modes (e.g., different rotation speeds), etc. The replacement of tray 12 can be manual or automatic, as desired. When automatic replacement is employed, system 10 comprises a tray replacement device 36 configured for removing tray 12 from its position below heads 16 and replacing it by a replacement tray (not shown). In the representative illustration of FIG. 1B tray replacement device 36 is illustrated as a drive 38 with a movable arm 40 configured to pull tray 12, but other types of tray replacement devices are also contemplated.

Exemplified embodiments for the printing head 16 are illustrated in FIGS. 2A-2C. These embodiments can be employed for any of the AM systems described above, including, without limitation, system 110 and system 10.

FIGS. 2A-B illustrate a printing head 16 with one (FIG. 2A) and two (FIG. 2B) nozzle arrays 22. The nozzles in the array are preferably aligned linearly, along a straight line. In embodiments in which a particular printing head has two or more linear nozzle arrays, the nozzle arrays are optionally and preferably can be parallel to each other.

When a system similar to system 110 is employed, all printing heads 16 are optionally and preferably oriented along the indexing direction with their positions along the scanning direction being offset to one another.

When a system similar to system 10 is employed, all printing heads 16 are optionally and preferably oriented radially (parallel to the radial direction) with their azimuthal positions being offset to one another. Thus, in these embodiments, the nozzle arrays of different printing heads are not parallel to each other but are rather at an angle to each other, which angle being approximately equal to the azimuthal offset between the respective heads. For example, one head can be oriented radially and positioned at azimuthal position $\varphi_1$, and another head can be oriented radially and positioned at azimuthal position $\varphi_2$. In this example, the azimuthal offset between the two heads is $\varphi_1 - \varphi_2$, and the angle between the linear nozzle arrays of the two heads is also $\varphi_1 - \varphi_2$.

In some embodiments, two or more printing heads can be assembled to a block of printing heads, in which case the printing heads of the block are typically parallel to each other. A block including several inkjet printing heads 16a, 16b, 16c is illustrated in FIG. 2C.

In some embodiments, system 10 comprises a support structure 30 positioned below heads 16 such that tray 12 is between support structure 30 and heads 16. Support structure 30 may serve for preventing or reducing vibrations of tray 12 that may occur while inkjet printing heads 16 operate. In configurations in which printing heads 16 rotate about axis 14, support structure 30 preferably also rotates such that support structure 30 is always directly below heads 16 (with tray 12 between heads 16 and tray 12).

Tray 12 and/or printing heads 16 is optionally and preferably configured to move along the vertical direction z, parallel to vertical axis 14 so as to vary the vertical distance between tray 12 and printing heads 16. In configurations in which the vertical distance is varied by moving tray 12 along the vertical direction, support structure 30 preferably also moves vertically together with tray 12. In configurations in which the vertical distance is varied by heads 16 along the vertical direction, while maintaining the vertical position of tray 12 fixed, support structure 30 is also maintained at a fixed vertical position.

The vertical motion can be established by a vertical drive 28. Once a layer is completed, the vertical distance between tray 12 and heads 16 can be increased (e.g., tray 12 is lowered relative to heads 16) by a predetermined vertical step, according to the desired thickness of the layer subsequently to be printed. The procedure is repeated to form a three-dimensional object in a layerwise manner.

The operation of inkjet printing heads 16 and optionally and preferably also of one or more other components of system 10, e.g., the motion of tray 12, are controlled by a controller 20. The controller can have an electronic circuit and a non-volatile memory medium readable by the circuit, wherein the memory medium stores program instructions which, when read by the circuit, cause the circuit to perform control operations as further detailed below. In some embodiments of the present invention the electronic circuit of controller 20 is also configured for performing data processing operations.

Controller 20 can also communicate with a host computer 24 which transmits digital data pertaining to fabrication instructions based on computer object data, e.g., in a form of a Standard Tessellation Language (STL) or a StereoLithography Contour (SLC) format, Virtual Reality Modeling Language (VRML), Additive Manufacturing File (AMF) format, Drawing Exchange Format (DXF), Polygon File Format (PLY) or any other format suitable for Computer-Aided Design (CAD). The object data formats are typically structured according to a Cartesian system of coordinates. In these cases, computer 24 preferably executes a procedure for transforming the coordinates of each slice in the computer object data from a Cartesian system of coordinates into a polar system of coordinates. Computer 24 optionally and preferably transmits the fabrication instructions in terms of the transformed system of coordinates. Alternatively, computer 24 can transmit the fabrication instructions in terms of the original system of coordinates as provided by the computer object data, in which case the transformation of coordinates is executed by the circuit of controller 20.

Figure 3A:
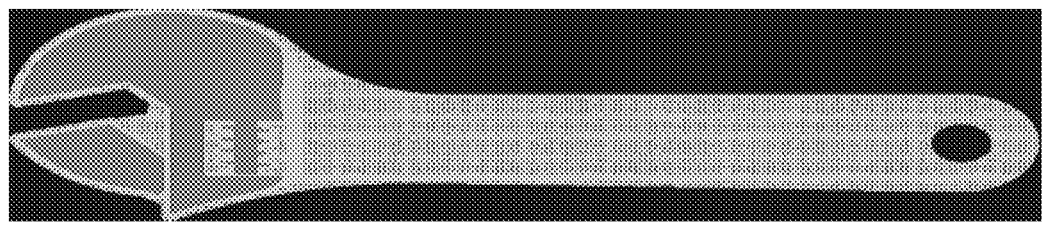
FIGS. 3A-3B are schematic illustrations demonstrating coordinate transformations according to some embodiments of the present invention.
Figure 3B:
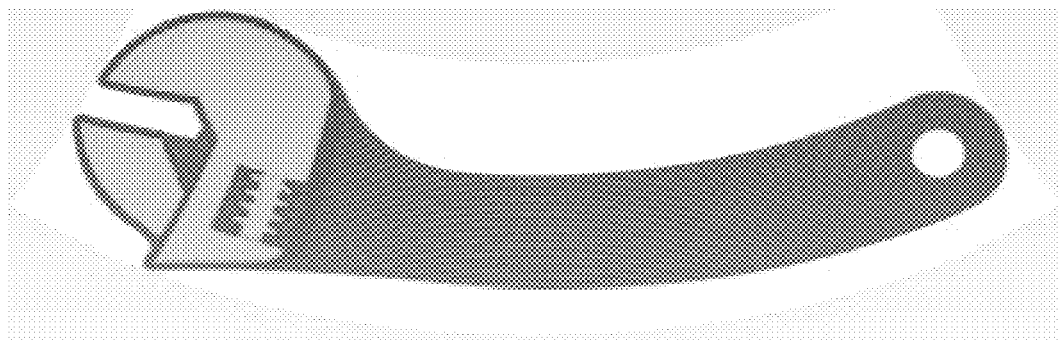

The transformation of coordinates allows three-dimensional printing over a rotating tray. In conventional three-dimensional printing, the printing heads reciprocally move above a stationary tray along straight lines. In such conventional systems, the printing resolution is the same at any point over the tray, provided the dispensing rates of the heads are uniform. Unlike conventional three-dimensional printing, not all the nozzles of the head points cover the same distance over tray 12 during at the same time. The transformation of coordinates is optionally and preferably executed so as to ensure equal amounts of excess material formulation at different radial positions. Representative examples of coordinate transformations according to some embodiments of the present invention are provided in FIGS. 3A-B, showing a slice of an object (each slice corresponds to fabrication instructions of a different layer of the objects), where FIG. 3A illustrates the slice in a Cartesian system of coordinates and FIG. 3B illustrates the same slice following an application of a transformation of coordinates procedure to the respective slice.

Typically, controller 20 controls the voltage applied to the respective component of the system 10 based on the fabrication instructions and based on the stored program instructions as described below.

Generally, controller 20 controls printing heads 16 to dispense, during the rotation of tray 12, droplets of building material formulation in layers, such as to print a three-dimensional object on tray 12.

System 10 optionally and preferably comprises one or more radiation sources 18, which can be, for example, an ultraviolet or visible or infrared lamp, or other sources of electromagnetic radiation, or electron beam source, depending on the modeling material formulation being used. Radiation source can include any type of radiation emitting device, including, without limitation, light emitting diode (LED), digital light processing (DLP) system, resistive lamp and the like. Radiation source 18 serves for curing or solidifying the modeling material formulation. In various exemplary embodiments of the invention the operation of radiation source 18 is controlled by controller 20 which may activate and deactivate radiation source 18 and may optionally also control the amount of radiation generated by radiation source 18.

In some embodiments of the invention, system 10 further comprises one or more leveling devices 32 which can be manufactured as a roller or a blade. Leveling device 32 serves to straighten the newly formed layer prior to the formation of the successive layer thereon. In some embodiments, leveling device 32 has the shape of a conical roller positioned such that its symmetry axis 34 is tilted relative to the surface of tray 12 and its surface is parallel to the surface of the tray. This embodiment is illustrated in the side view of system 10 (FIG. 1C).

The conical roller can have the shape of a cone or a conical frustum.

The opening angle of the conical roller is preferably selected such that is a constant ratio between the radius of the cone at any location along its axis 34 and the distance between that location and axis 14. This embodiment allows roller 32 to efficiently level the layers, since while the roller rotates, any point p on the surface of the roller has a linear velocity which is proportional (e.g., the same) to the linear velocity of the tray at a point vertically beneath point p. In some embodiments, the roller has a shape of a conical frustum having a height h, a radius $R_1$ at its closest distance from axis 14, and a radius $R_2$ at its farthest distance from axis 14, wherein the parameters h, $R_1$ and $R_2$ satisfy the relation $R_1/R_2=(R-h)/h$ and wherein R is the farthest distance of the roller from axis 14 (for example, R can be the radius of tray 12).

The operation of leveling device 32 is optionally and preferably controlled by controller 20 which may activate and deactivate leveling device 32 and may optionally also control its position along a vertical direction (parallel to axis 14) and/or a radial direction (parallel to tray 12 and pointing toward or away from axis 14.

In some embodiments of the present invention printing heads 16 are configured to reciprocally move relative to tray along the radial direction r. These embodiments are useful when the lengths of the nozzle arrays 22 of heads 16 are shorter than the width along the radial direction of the working area 26 on tray 12. The motion of heads 16 along the radial direction is optionally and preferably controlled by controller 20.

Some embodiments contemplate the fabrication of an object by dispensing different material formulations from different dispensing heads. These embodiments provide, inter alia, the ability to select material formulations from a given number of material formulations and define desired combinations of the selected material formulations and their properties. According to the present embodiments, the spatial locations of the deposition of each material formulation with the layer is defined, either to effect occupation of different three-dimensional spatial locations by different material formulations, or to effect occupation of substantially the same three-dimensional location or adjacent three-dimensional locations by two or more different material formulations so as to allow post deposition spatial combination of the material formulations within the layer, thereby to form a composite material formulation at the respective location or locations.

Any post deposition combination or mix of modeling material formulations is contemplated. For example, once a certain material formulation is dispensed it may preserve its original properties. However, when it is dispensed simultaneously with another modeling material formulation or other dispensed material formulations which are dispensed at the same or nearby locations, a composite material formulation having a different property or properties to the dispensed material formulations is formed.

The present embodiments thus enable the deposition of a broad range of material formulation combinations, and the fabrication of an object which may consist of multiple different combinations of material formulations, in different parts of the object, according to the properties desired to characterize each part of the object.

Further details on the principles and operations of an AM system suitable for the present embodiments are found in U.S. Pat. No. 9,031,680, the contents of which are hereby incorporated by reference.

Method:

According to an aspect of some embodiments of the present invention there is provided a method of additive manufacturing of a three-dimensional object, as described herein. The method of the present embodiments is usable for manufacturing an object having, in at least a portion thereof, a transparent material, as defined herein.

The method is generally effected by sequentially forming a plurality of layers in a configured pattern corresponding to the shape of the object, such that formation of each of at least a few of said layers, or of each of said layers, comprises dispensing a building material (uncured) which comprises one or more modeling material formulation(s), and exposing the dispensed modeling material to a curing condition, preferably a curing energy (e.g., irradiation) to thereby form a cured modeling material, as described in further detail hereinafter.

In some exemplary embodiments of the invention an object is manufactured by dispensing a building material (uncured) that comprises two or more different modeling material formulations, for example, as described hereinbelow. In some of these embodiments, each modeling material formulation is dispensed from a different array of nozzles belonging to the same or distinct dispensing heads of the inkjet printing apparatus, as described herein.

In some embodiments, two or more such arrays of nozzles that dispense different modeling material formulations are both located in the same printing head of the AM apparatus (i.e. multi-channels printing head). In some embodiments, arrays of nozzles that dispense different modeling material formulations are located in separate printing heads, for example, a first array of nozzles dispensing a first modeling material formulation is located in a first printing head, and a second array of nozzles dispensing a second modeling material formulation is located in a second printing head.

In some embodiments, an array of nozzles that dispense a modeling material formulation and an array of nozzles that dispense a support material formulation are both located in the same printing head. In some embodiments, an array of nozzles that dispense a modeling material formulation and an array of nozzles that dispense a support material formulation are located in separate printing heads.

The modeling material formulations are optionally and preferably deposited in layers during the same pass of the printing heads. The modeling material formulations and/or combination of formulations within the layer are selected according to the desired properties of the object, and as further described in detail hereinbelow. Such a mode of operation is also referred to herein as "multi-material"

The phrase "digital materials", as used herein and in the art, describes a combination of two or more materials on a microscopic scale or voxel level such that the printed zones of a specific material are at the level of few voxels, or at a level of a voxel block. Such digital materials may exhibit new properties that are affected by the selection of types of materials and/or the ratio and relative spatial distribution of two or more materials.

In exemplary digital materials, the modeling material of each voxel or voxel block, obtained upon curing, is independent of the modeling material of a neighboring voxel or voxel block, obtained upon curing, such that each voxel or voxel block may result in a different model material and the new properties of the whole part are a result of a spatial combination, on the voxel level, of several different model materials.

The phrase "digital material formulations", as used herein and in the art, describes a combination of two or more material formulations on a pixel level or voxel level such that pixels or voxels of different material formulations are interlaced with one another over a region. Such digital material formulations may exhibit new properties that are affected by the selection of types of material formulations and/or the ratio and relative spatial distribution of two or more material formulations.

As used herein, a "voxel" of a layer refers to a physical three-dimensional elementary volume within the layer that corresponds to a single pixel of a bitmap describing the layer. The size of a voxel is approximately the size of a region that is formed by a building material, once the building material is dispensed at a location corresponding to the respective pixel, leveled, and solidified.

Herein throughout, whenever the expression "at the voxel level" is used in the context of a different material and/or properties, it is meant to include differences between voxel blocks, as well as differences between voxels or groups of few voxels. In preferred embodiments, the properties of the whole part are a result of a spatial combination, on the voxel block level, of several different model materials.

Figure 4:
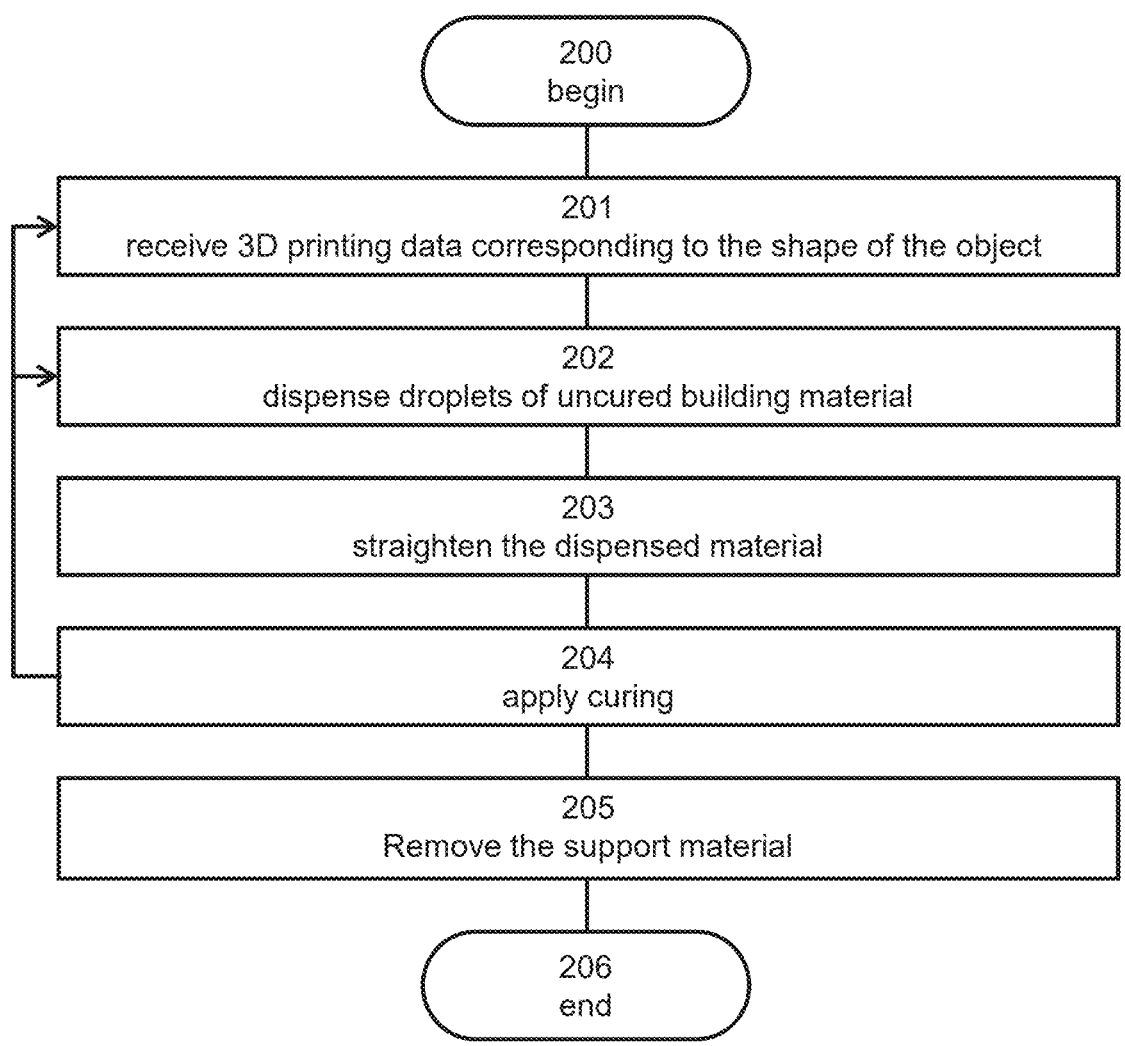
FIG. 4 is a simplified flow chart presenting an exemplary method of 3D inkjet printing of an object according to some embodiments of the present invention.

FIG. 4 is a flowchart diagram of a method suitable for AM of a three-dimensional object according to various exemplary embodiments of the present invention. It is to be understood that, unless otherwise defined, the operations described hereinbelow can be executed either contemporaneously or sequentially in many combinations or orders of execution. Specifically, the ordering of the flowchart diagrams is not to be considered as limiting. For example, two or more operations, appearing in the following description or in the flowchart diagrams in a particular order, can be executed in a different order (e.g., a reverse order) or substantially contemporaneously. Additionally, several operations described below are optional and may not be executed.

The method can be executed by an AM system (e.g., system 110 or system 10), preferably a 3D inkjet printing system, operated by a controller (e.g., controller 152 or 20). The method begins at 200 and optionally and preferably proceeds to 201 at which computer object data that collectively pertain to a three-dimensional shape of the object are received. The data can be received by a data processor (e.g., processor 154 or 24) operatively associated with the AM system. For example, the data processor can access a computer-readable storage medium (not shown) and retrieve the data from the medium. The data processor can also generate the data, or a portion thereof, instead of, or in addition to, retrieving data from the storage medium, for example, by means of a computer aided design (CAD) or computer aided manufacturing (CAM) software. The computer object data typically include a plurality of slice data each defining a layer of the object to be manufactured. The data processor can transfer the data, or a portion thereof, to the controller of the AM system. Typically, but not necessarily, the controller receives the data on a slice-by-slice basis.

The data can be in any data format known in the art, including, any of the aforementioned computer object data formats.

The method proceeds to 202 at which droplets of one or more modeling material formulation(s) are dispensed to form a layer in a configured pattern corresponding to a shape of a slice of the object. The modeling material formulation(s) and the dispensing thereof are as described herein in any of the respective embodiments and any combination thereof.

The dispensing 202 is optionally and preferably executed while heating the dispensing heads, the fabrication chamber and the dispensed formulation. In various exemplary embodiments of the invention the dispensing 202 is executed at a temperature that ranges from about 50 to about 90° C., or from about 50 to about 80° C. or from about 70 to about 80° C., or from about 65 to about 75° C. The dispensing head can include a heating device or is fed via a building material reservoir which includes a heating device.

At 203 curing radiation is applied to the newly formed layer, preferably using a radiation source (e.g., device 324 or 18).

From operation 203 the method optionally and preferably loops back to 201 to receive data for another slice. When the data for the next slice is already stored within the controller, the method can loop back to 202 for forming the next layer. Once an object formed of a plurality of layers is fabricated, the method ends at 204.

As demonstrated in the Examples section that follows (see Example 3), the Inventors unexpectedly found that the transmittance property of the final object significantly depends on the orientation of the fabricated layers. In particular, it was found that the transmittance of light through a given planar face of the object increases when the fabricated layers are not perpendicular to the given face. For example, it was found that the transmittance of light through a given planar face of the object increases when the fabricated layers are either parallel to the given face or have a tilt (of e.g., 45° C.) relative to the given face.

Thus, when it is desired to provide improved transmittance through a particular face of the object, the slice data defining the layers of the object to be manufactured are subjected to a rotational transformation of coordinates selected to ensure that the slices are not perpendicular to the particular face.

Rotation of coordinates at an angle $\alpha$ about the x axis can be performed using a rotation matrix $R_x(\alpha)$, which can be written as:

$$R_x(\alpha) = \begin{pmatrix} 1 & 0 & 0 \\ 0 & \cos\alpha & -\sin\alpha \\ 0 & \sin\alpha & \cos\alpha \end{pmatrix}$$

Rotation of coordinates at an angle $\beta$ about the y axis can be performed using a rotation matrix $R_y(\beta)$, which can be written as:

$$R_y(\beta) = \begin{pmatrix} \cos\beta & 0 & -\sin\beta \\ 0 & 1 & 0 \\ \sin\beta & 0 & \cos\beta \end{pmatrix}$$

Rotation of coordinates at an angle $\gamma$ about the z axis can be performed using a rotation matrix $R_z(\gamma)$, which can be written as:

$$R_z(\gamma) = \begin{pmatrix} \cos\gamma & -\sin\gamma & 0 \\ \sin\gamma & \cos\gamma & 0 \\ 0 & 0 & 1 \end{pmatrix}$$

Rotation about more than one axis can be performed using a matrix that is a multiplication of two or more of the above matrices. For example, rotation of coordinates at an angle $\alpha$ about the x axis and an angle $\beta$ about the y axis, can be performed using a matrix that is a multiplication of $R_x(\alpha)$ by $R_y(\beta)$. The angles of rotation about the axes can be different from each other, or two or more of the angles can be the same. For example, rotation of coordinates at the same angle $\theta$ about the x, the y, and the z axes can be performed using the matrix $R_x(\theta)R_y(\theta)R_z(\theta)$.

As a representative example, suppose that an object has a planar face through which it is desired to improve the transmittance. In this case, the slice data of the object are subjected to transformation about one, two or three of the axes x, y and z according to the above procedure so as to ensure that the angle between the slices and the planar face is from about 20° to about 70°, more preferably from about 30° to about 60°, e.g., about 45°. In some of any of the embodiments described herein, the dispensing is of two or more modeling material formulations, as described herein.

In some of any of these embodiments, the dispensing is such that a partially reactive transparent formulation according to the present embodiments (a first formulation) forms an inner core region, and a reactive formulation that provides, when hardened, a transparent material (a second formulation), forms an outer region at least partially surrounding the core region.

The second modeling formulation preferably differs from the first formulation, when hardened, by its reactivity (e.g., by a hardening rate and/or degree when exposed to the applied curing condition (e.g., irradiation), as described herein, and/or by an amount of a photoinitiator included therein, as is described in further detail hereinafter.

In some embodiments, the dispensing is such that the second formulation forms an outer portion of the object, e.g. a perimeter of a layer of the object and the first formulation forms an inner portion of the object, e.g. an inner portion of the layer of the object encompassed by the perimeter of the layer. Optionally, the outer portions form a shell of the object being printed and the inner portion forms a core of the object being printed. In some embodiments, the shell envelops the core. In some embodiments, the core is at least partially enveloped by the shell. Optionally, the shell may be thin coating of one printed voxel thickness or may be a coating of from 0.05 mm to about 2 mm thickness, of from about 0.1 to about 2 mm, or from about 0.1 to 1.5 mm, or from about 0.1 to 1 mm, for example, 0.2, 0.3, 0.4, 0.5, or 0.6 mm. The thickness may vary based on the size and shape of the object being printed and may at times be thicker than 2 mm.

Reference is now made to FIGS. 5A and 5B showing simplified schematic drawings of a cross sectional view of an object fabricated with a core formed with a first, partially reactive formulation according to some of the present embodiments, encompassed by a shell formed with a second, reactive formulation, as described herein, and a top view of a single layer of the object respectively, both in accordance with some example embodiments. According to some embodiments, an object 112 may include a core 210 that is formed with a first building (e.g., modeling) material formulation as described herein and a shell 220 formed with a second, reactive, building (e.g., modeling) material formulation as described herein. Optionally, one or more support structures 115 may be formed to support object 112. The support structure may be formed of one or more support materials solidified by curing during the AM process.

Referring now to FIG. 5B, according to some embodiments, during the AM process, a layer 113 may be printed with an outer region 221 formed with the second, reactive building (e.g., modeling) material formulation that may define a perimeter of layer 113 and an inner region 211 formed with the first, partially reactive building (e.g., modeling) material formulation that is at least partially encompassed by outer region 221. According to some embodiments, a plurality of layers that form object 112 are formed in a manner similar to layer 113 including both outer region 221 and inner region 211. The plurality of layers may optionally form shell 220 and core 210. Shell 220 may be defined to encapsulate core 210. In other embodiments, object 112 may not be fully encapsulated by shell 220. A thickness of outer region 221 may be defined to have a thickness of one printed voxel or a thickness of 0.05-2 mm, e.g. 0.3-1 mm or 0.3 mm.

In some of any of the embodiments of the present invention, once a layer is dispensed as described herein, exposure to a curing condition (e.g., curing energy) as described herein is effected. In some embodiments, the curable materials are photocurable material, preferably UV-curable materials, and the curing condition is such that a radiation source emits UV radiation.

In some embodiments, where the building material comprises also support material formulation(s), the method proceeds to removing the hardened support material (e.g., thereby exposing the adjacent hardened modeling material). This can be performed by mechanical and/or chemical means, as would be recognized by any person skilled in the art. A portion of the support material may optionally remain upon removal, for example, within a hardened mixed layer, as described herein.

In some embodiments, removal of hardened support material reveals a hardened mixed layer, comprising a hardened mixture of support material and modeling material formulation. Such a hardened mixture at a surface of an object may optionally have a relatively non-reflective appearance, also referred to herein as "matte"; whereas surfaces lacking such a hardened mixture (e.g., wherein support material formulation was not applied thereon) are described as "glossy" in comparison.

In some of any of the embodiments described herein, the method further comprises exposing the cured modeling material, either before or after (preferably after) removal of a support material, if such has been included in the building material, to a post-treatment condition.

The post-treatment condition may be such that promotes further hardening of the cured modeling material(s). In some embodiments, the post-treatment hardens a partially-cured material to thereby obtain a completely cured material.

In some embodiments, the post-treatment is effected by exposure to heat and/or radiation, as described in any of the respective embodiments herein. In some embodiments, when the condition is or comprises heat (thermal post-treatment), the post-treatment can be effected for a time period that ranges from a few minutes (e.g., 10 minutes) to a few hours (e.g., 1-24 hours).

In some of any of the embodiments described herein, the post-treatment is or comprises (e.g., in addition to heating and/or irradiating) exposing the object to a condition that promotes decomposition of a residual amount of the photoinitiator (also referred to herein and in the art as photobleaching).

In some of these embodiments, the photobleaching comprises exposing the object to light having a color temperature of at least 5000K or of at least 6000K or of at least 6500K. In some of these embodiments, the photobleaching is by a light source operating at a power of at least 25 W, for example, of from 25 to 200 W, or from 25 to 150 W, or from 50 W to 200 W, or from 50 W to 150 W, including any intermediate values and subranges therebetween.

The photobleaching can be applied (the object is exposed to a photobleaching condition) for a predetermined time period, which can be 1 hour, 2 hours, and up to 48 hours or up to 24, hours.

The photobleaching can be effected while monitoring the optical properties (e.g., color) of the object during the photobleaching, such that the method further comprises measuring a color of the object during the photobleaching. Based on such measurement(s), termination of the photobleaching can be effected when desired optical properties are measured (e.g., the color reaches a predetermined level).

In some embodiments, the desired optical properties (e.g., predetermined color level) are as described herein in any of the respective embodiments of a transparent material in the object.

In some embodiments, the photobleaching post-treatment comprises exposing the object to irradiation by a LED lamp, for at least 2 hours, as described hereinafter for photobleaching.

In some embodiments, the photobleaching is as described in Example 5 hereinafter.

Formulations:

According to some of any of the embodiments described herein, each of the modeling material formulations described herein comprises one or more curable materials, and are also referred to herein as curable formulations. A curable formulation is characterized in that its viscosity (e.g., at room temperature) increases, upon exposure to a curing condition as described herein, by at least 2-folds, preferably by at least 5-folds, and more preferably by at least one order of magnitude.

Herein throughout, a "curable material", which is also referred to herein as a "solidifiable material" is a compound (e.g., monomeric or oligomeric or polymeric compound) which, when exposed to a curing condition (e.g., curing energy), as described herein, solidifies or hardens to form a cured modeling material as defined herein. Curable materials are typically polymerizable materials, which undergo polymerization and/or cross-linking when exposed to a suitable curing condition, typically a suitable energy source. A curable or solidifiable material is typically such that its viscosity increases by at least one order of magnitude when it is exposed to a curing condition.

In some of any of the embodiments described herein, a curable material can be a monomer, an oligomer or a short-chain polymer, each being polymerizable and/or cross-linkable as described herein.

In some of any of the embodiments described herein, when a curable material is exposed to a curing condition (e.g., curing energy such as, for example, radiation), it polymerizes by any one, or combination, of chain elongation and cross-linking.

In some of any of the embodiments described herein, a curable material is a monomer or a mixture of monomers which can form a polymeric modeling material upon a polymerization reaction, when exposed to a curing condition at which the polymerization reaction occurs. Such curable materials are also referred to herein as monomeric curable materials.

In some of any of the embodiments described herein, a curable material is an oligomer or a mixture of oligomers which can form a polymeric modeling material upon a polymerization reaction, when exposed to a curing condition at which the polymerization reaction occurs. Such curable materials are also referred to herein as oligomeric curable materials.

In some of any of the embodiments described herein, a curable material, whether monomeric or oligomeric, can be a mono-functional curable material or a multi-functional curable material.

Herein, a mono-functional curable material comprises one functional group that can undergo polymerization when exposed to a curing condition (e.g., curing energy).

A multi-functional curable material comprises two or more, e.g., 2, 3, 4 or more, functional groups that can undergo polymerization when exposed to a curing condition. Multi-functional curable materials can be, for example, di-functional, tri-functional or tetra-functional curable materials, which comprise 2, 3 or 4 groups that can undergo polymerization, respectively. The two or more functional groups in a multi-functional curable material are typically linked to one another by a linking moiety, as defined herein. When the linking moiety is an oligomeric moiety, the multi-functional group is an oligomeric multi-functional curable material.

Exemplary curable materials that are commonly used in additive manufacturing and in some of the present embodiments are acrylic materials.

Herein throughout, the term "acrylic materials" collectively encompasses materials bearing one or more acrylate, methacrylate, acrylamide and/or methacrylamide group(s).

The term "(meth)acrylate" and grammatical diversions thereof encompasses materials bearing one or more acrylate and/or methacrylate group(s).

The curable materials included in the formulations described herein may be defined by the properties of the materials before hardening, when appropriate. Such properties include, for example, molecular weight (MW), functionality (e.g., mono-functional or multi-functional), and viscosity The curable materials included in the formulations described herein are otherwise defined by the properties provided by each material, when hardened. That is, the materials may be defined, when appropriate, by properties of a material formed upon exposure to a curing condition, for example, upon polymerization. These properties (e.g., Tg, HDT), are of a polymeric material formed upon curing any of the described curable materials alone.

As used herein, the term "curing" or "hardening" describes a process in which a formulation is hardened. This term encompasses polymerization of monomer(s) and/or oligomer(s) and/or cross-linking of polymeric chains (either of a polymer present before curing or of a polymeric material formed in a polymerization of the monomers or oligomers). The product of a curing reaction or of a hardening is therefore typically a polymeric material and in some cases a cross-linked polymeric material.

Partial curing or hardening as used herein encompasses a curing or hardening process that does not reach completion, that is, for example, a process that is effected up to a hardening degree, as defined hereinafter, which is less than 100%, or less than 90%, or less than 80%, or less. Complete curing or hardening as used herein is curing or hardening to a degree of at least 80%, or at least 90%, or of about 100%, for example, a curing or hardening process that results in a solidified material.

A "degree of hardening" as used herein represents the extent at which curing is effected, that is, the extent at which curable materials underwent polymerization and/or cross-linking. When a curable material is a polymerizable material, this phrase encompasses both a mol % of the curable materials in a formulation that underwent polymerization and/or cross-linking, upon exposure to a curing condition; and/or the degree at which polymerization and/or cross-linking was effected, for example, the degree of chain elongation and/or cross-linking. Determining a degree of polymerization can be performed by methods known to those skilled in the art.

A "rate of hardening" as used herein represents the rate at which curing is effected, that is, the extent at which curable materials underwent polymerization and/or cross-linking in/within a given time period (for example, one minute). When a curable material is a polymerizable material, this phrase encompasses both a mol % of the curable materials in a formulation that underwent polymerization and/or cross-linking at the given time period, upon exposure to a curing condition; and/or the degree at which polymerization and/or cross-linking was effected, for example, the degree of chain elongation and/or cross-linking, at a given time period. Determining a rate of polymerization can be performed by methods known to those skilled in the art.

A "rate of hardening" can alternatively be represented by a degree at which a viscosity of a formulation charges at a given time period, that is, the rate at which the viscosity of a formulation increases upon exposure to curing condition.

A "green body object" as used herein is an object formed by an AM process that has at least a portion that has only been partially hardened or solidified and requires additional hardening to obtain a fully solidified object.

Herein, the phrase "a condition that affects curing" or "a condition for inducing curing", which is also referred to herein interchangeably as "curing condition" or "curing inducing condition" describes a condition which, when applied to a formulation that contains a curable material, induces at least partial polymerization of monomer(s) and/or oligomer(s) and/or cross-linking of polymeric chains. Such a condition can include, for example, application of a curing energy, as described hereinafter, to the curable material(s), and/or contacting the curable material(s) with chemically reactive components such as catalysts, co-catalysts, and activators.

When a condition that induces curing comprises application of a curing energy, the phrase "exposing to a curing condition" means that the dispensed layers, preferably each of the dispensed layers, is/are exposed to the curing energy and the exposure is typically performed by applying a curing energy to (e.g., each of) the dispensed layers.

A "curing energy" typically includes application of radiation or application of heat.

The radiation can be electromagnetic radiation (e.g., ultraviolet or visible light), or electron beam radiation, or ultrasound radiation or microwave radiation, depending on the materials to be cured. The application of radiation (or irradiation) is effected by a suitable radiation source. For example, an ultraviolet or visible or infrared or Xenon lamp can be employed, as described herein.

A curable material, formulation or system that undergoes curing upon exposure to radiation is referred to herein interchangeably as "photopolymerizable" or "photoactivatable" or "photocurable".

In some of any of the embodiments described herein, a curable material is a photopolymerizable material, which polymerizes or undergoes cross-linking upon exposure to radiation, as described herein, and in some embodiments the curable material is a UV-curable material, which polymerizes or undergoes cross-linking upon exposure to UV-vis radiation, as described herein.

In some embodiments, a curable material as described herein includes a polymerizable material that polymerizes via photo-induced radical polymerization.

When the curing energy comprises heat, the curing is also referred to herein and in the art as "thermal curing" and comprises application of thermal energy. Applying thermal energy can be effected, for example, by heating a receiving medium onto which the layers are dispensed or a chamber hosting the receiving medium, as described herein. In some embodiments, the heating is effected using a resistive heater.

In some embodiments, the heating is affected by irradiating the dispensed layers by heat-inducing radiation. Such irradiation can be effected, for example, by means of an IR lamp or Xenon lamp, operated to emit radiation onto the deposited layer.

A curable material or system that undergoes curing upon exposure to heat is referred to herein as "thermally-curable" or "thermally-activatable" or "thermally-polymerizable".

Some curable materials can harden via thermal and/or photo-induced curing.

According to an aspect of some embodiments of the present invention, there is provided a transparent curable formulation, which is also referred to herein as a first modeling material formulation or as a first transparent formulation or simply as a first formulation.

By "transparent curable formulation" it is meant a curable formulation, as defined herein, which provides, when hardened, a transparent material.

The term "transparent" describes a property of a material that reflects the transmittance of light therethrough. A transparent material is typically characterized as capable of transmitting at least 70% of a light that passes therethrough, or by transmittance of at least 70%. Transmittance of a material can be determined using methods well known in the art. An exemplary method is described in the Examples section that follows.

A transparent curable formulation as described herein can be transparent also before it is hardened.

A transparent curable formulation as described herein can be characterized as colorless and/or by color properties as determined by the L*a*b* scale, as described hereinafter for a hardened material.

According to some embodiments of the present invention, a curable formulation as described herein is a photocurable formulation, as defined herein.

According to some embodiments of the present invention, the transparent formulation comprises a mixture of curable materials and one or more photoinitiator(s) (PIs).

According to some embodiments of the present invention, a total amount of the one or more PIs in the formulation is no more than 2%, or no more than 1.5%, preferably no more than 1% by weight of the total weight of the formulation, and can range, for example, from 0.1 to 1, or from 0.2 to 1, or from 0.3 to 1, or from 0.4 to 1, or from 0.5 to 1, or from 0.1 to 0.5, or from 0.1 to 0.8, or from 0.2 to 0.8, or from 0.2 to 0.7, or from 0.2 to 0.6, or from 0.3 to 0.8, or from 0.3 to 0.7, or from 0.3 to 0.6, or from 0.4 to 0.6, or from 0.4 to 0.7, or from 0.4 to 0.8, or from 0.6 to 1, or from 0.6 to 0.9, or from 0.6 to 0.8, of from 0.1 to 0.9, or from 0.1 to 0.8, or from 0.5 to 0.9, or from 0.5 to 0.8, including any intermediate values and subranges between any of the above-indicated ranges.

By comprising a relatively low amount of PIs, the transparent formulation of these embodiments is also referred to herein as low PI-content formulation or as a partially reactive formulation, as is discussed in further detail hereinafter.

According to some of any of the embodiments described herein, the photoinitiator is a free-radical is a free-radical photoinitiator.

A free-radical photoinitiator may be any compound that produces a free radical on exposure to radiation such as ultraviolet or visible radiation and thereby initiates a polymerization reaction of the curable material as described herein.

Exemplary photoinitiators include benzophenones, aromatic α-hydroxy ketones, benzylketals, aromatic α-aminoketones, phenylglyoxalic acid esters, mono-acylphosphinoxides, bis-acylphosphinoxides, tris-acylphosphinoxides and/or oximesters derived from aromatic ketones.

Exemplary photoinitiators include, but are not limited, camphor quinone; benzophenone, benzophenone derivatives, such as 2,4,6-trimethylbenzophenone, 2-methylbenzophenone, 3-methylbenzo-phenone, 4-methylbenzophenone, 2-methoxycarbonylbenzophenone 4,4'-bis (chloromethyl)-benzophenone, 4-chlorobenzophenone, 4-phenylbenzophenone, 3,3'-dimethyl-4-methoxy-benzophenone, [4-(4-methylphenylthio)phenyl]-phenylmethanone, methyl-2-benzoyl-benzoate, 3-methyl-4'-phenylbenzophenone, 2,4,6-trimethyl-4'-phenylbenzophenone, 4,4'-bis (dimethylamino)benzophenone, 4,4'-bis(diethylamino) benzophenone; thioxanthones, thioxanthone derivatives, polymeric thio-xanthones as for example marketed as OMNIPOL TX; ketal compounds, as for example benzyldimethyl-ketal (e.g., marketed as IRGACURE® 651); acetophenone, acetophenone derivatives, for example α-hydroxycycloalkyl phenyl ketones or α-hydroxyalkyl phenyl ketones, such as for example 2-hydroxy-2-methyl-1-phenyl-propanone (marketed as DAROCUR® 1173), 1-hydroxy-cyclohexyl-phenyl-ketone (mareketed as IRGACURE® 184), 1-(4-dodecylbenzoyl)-1-hydroxy-1-methyl-ethane, 1-(4-isopropylbenzoyl)-1-hydroxy-1-methyl-ethane, 1-[4-(2-hydroxyethoxy)-phenyl]-2-hydroxy-2-methyl-1-propan-1-one (marketed as IRGACURE® 2959); 2-hydroxy-1-{4-[4-(2-hydroxy-2-methyl-propionyl)-benzyl]-phenyl}-2-methyl-propan-1-one (marketed as IRGACURE® 127); 2-hydroxy-1-{4-[4-(2-hydroxy-2-methyl-propion-yl)-phenoxy]-phenyl}-2-methyl-propan-1-one; dialkoxyacetophenones, α-hydroxy- or α-aminoacetophenones, e.g., (4-methylthiobenzoyl)-1-methyl-1-morpholinoethane (marketed as IRGACURE® 907), (4-morpholinobenzoyl)-1-benzyl-1-dimethylaminopropane (marketed as IRGACURE® 369), (4-morpholinobenzoyl)-1-(4-methylbenzyl)-1-dimethylaminopropane (marketed as IRGACURE® 379), (4-(2-hydroxyethyl)aminobenzoyl)-1-benzyl-1-dimethylaminopropane), (3,4-dimethoxybenzoyl)-1-benzyl-1-dimethyl aminopropane; 4-aroyl-1,3-dioxolanes, benzoin alkyl ethers and benzil ketals, e.g. dimethyl benzyl ketal, phenylglyoxalic esters and derivatives thereof, e.g., methyl α-oxo benzeneacetate, oxo-phenyl-acetic acid 2-(2-hydroxy-ethoxy)-ethyl ester, dimeric phenylglyoxalic esters, e.g. oxo-phenylacetic acid 1-methyl-2-[2-(2-oxo-2-phenyl-acetoxy)-propoxy]-ethyl ester (marketed as IRGACURE® 754); ketosulfones, e.g. marketed as ESACURE KIP 1001 M®; oxime-esters, e.g., 1,2-octanedione 1-[4-(phenylthio)phenyl]-2-(O-benzoyloxime) (marketed as IRGACURE® OXE01), ethanone 1-[9-ethyl-6-(2-methylbenzoyl)-9H-carbazol-3-yl]-1-(O-acetyloxime) (marketed as IRGACURE® OXE02), 9H-thioxanthene-2-carboxaldehyde 9-oxo-2-(O-acetyloxime), per-esters, benzophenone tetracarboxylic per-esters, monoacyl phosphine oxides, e.g. (2,4,6-trimethylbenzoyl)diphenylphosphine oxide (marketed as DAROCUR® TPO), ethyl(2,4,6 trimethylbenzoyl phenyl)phosphinic acid ester; bisacylphosphine oxides, e.g., bis(2,6-dimethoxy-benzoyl)-(2,4,4-trimethyl-pentyl)phosphine oxide, bis(2,4,6-trimethylbenzoyl)-phenylphosphine oxide (marketed as IRGACURE® 819), bis(2,4,6-trimethyl-benzoyl)-2,4-dipentoxyphenylphosphine oxide, trisacylphosphine oxides, halomethyltriazines, e.g., 2-[2-(4-methoxy-phenyl)-vinyl]-4,6-bis-trichloromethyl-[1,3,5]triazine, 2-(4-methoxy-phenyl)-4,6-bis-trichloromethyl-[1,3,5]triazine, 2-(3,4-dimethoxy-phenyl)-4,6-bis-trichloromethyl-[1,3,5]triazine, 2-methyl-4,6-bis-trichloromethyl-[1,3,5]triazine, hexaarylbisimidazole/coinitiators systems, e.g., ortho-chlorohexaphenyl-bisimidazole combined with 2-mercapto-benzthiazole, ferrocenium compounds, or titanocenes, e.g., bis(cyclopentadienyl)-bis(2,6-difluoro-3-pyrryl-phenyl) titanium (marketed as IRGACURE® 784).

According to some of any of the embodiments described herein, the at least one photoinitiator is devoid of, as defined herein, an alpha-substituted ketone-type photoinititator, for example of an alpha-amine ketone type and/or an alpha-hydroxy ketone type.

In exemplary embodiments, the alpha-substituted ketone-type photoinititator, is an aromatic alpha-substituted ketone, for example, aromatic alpha-amine ketone and/or aromatic alpha-hydroxy ketone. Any such photoiniators that are commonly practiced as PIs for UV-curable formulations are encompassed by these embodiments.

Exemplary alpha-hydroxy ketone PIs include, but are not limited to, 1-hydroxy-cyclohexyl-phenyl-ketone (marketed as IRGACURE® 184, I-184), 2-hydroxy-1-{1-[4-(2-hydroxy-2-methyl-propionyl)-phenyl]-1,3,3-trimethyl-indan-5-yl}-2-methyl-propan-1-one, (marketed as ESACURE ONE®), and 1-[4-(2-hydroxyethoxy)-phenyl]-2-hydroxy-2-methyl-1-propan-1-one (marketed as IRGACURE® 2959, 1-2959).

According to some of any of the embodiments described herein, the photoinitiator(s) comprises, or consists essentially of, a phosphine oxide-type (e.g., mono-acylated (MAPO) or bis-acylated phosphine oxide-type (BAPO) photoinitiator.

Exemplary monoacyl and bisacyl phosphine oxides include, but are not limited to, 2,4,6-trimethylbenzoyldiphenyl phosphine oxide, bis(2,4,6-trimethylbenzoyl)phenylphosphine oxide, dibenzoylphenylphosphine oxide, bis(2,6-dimethoxybenzoyl)phenyl phosphine oxide, tris(2,4-dimethylbenzoyl) phosphine oxide, tris(2-methoxybenzoyl) phosphine oxide, 2,6-dimethoxybenzoyldiphenyl phosphine oxide, 2,6-dichlorobenzoyldiphenyl phosphine oxide, 2,3,5,6-tetramethylbenzoyldiphenyl phosphine oxide, benzoyl-bis(2,6-dimethylphenyl)phosphonate, and 2,4,6-trimethylbenzoylethoxyphenyl phosphine oxide. Commercially available phosphine oxide photoinitiators capable of free-radical initiation when irradiated at wavelength ranges of greater than about 380 nm to about 450 nm include bis(2,4,6-trimethylbenzoyl)phenyl phosphine oxide (marketed as IRGACURE® 819), bis(2,6-dimethoxybenzoyl)-(2,4,4-trimethyl-pentyl)phosphine oxide (marketed as CGI 403), a 25:75 mixture, by weight, of bis(2,6-dimethoxybenzoyl)-2,4,4-trimethylpentyl phosphine oxide and 2-hydroxy-2-methyl-1-phenylpropan-1-one (marketed as IRGACURE® 1700), a 1:1 mixture, by weight, of bis(2,4,6-trimethylbenzoyl)phenyl phosphine oxide and 2-hydroxy-2-methyl-1-phenylpropane-1-one (marketed as DAROCUR® 4265), and ethyl 2,4,6-trimethylbenzylphenyl phosphinate (LUCIRIN LR8893X).

According to some of the present embodiments, the transparent curable formulation comprises one or more mono-functional (meth)acrylate material(s) featuring a molecular weight lower than 500 grams/mol, which are also referred to herein as monomeric mono-functional (meth) acrylate material(s); and one or more multi-functional (meth)acrylate material(s), which can be monomeric and/or oligomeric, as defined herein.

According to some of any of the embodiments described herein, the one or more multi-functional (meth)acrylate material(s) feature an average Tg, as defined herein, of at least 24, or at least 25, for example, of from 24 to 40, or of from 25 to 40, of from 24 to 35, or of from 23 to 30, or of from 24 to 30, or of from 25 to 30° C., or, alternatively, of from 30 to 70, or from 30 to 60, or from 40 to 60, ° C., including any intermediate values and subranges therebetween. According to some of any of the embodiments described herein, the one or more monomeric mono-functional (meth)acrylate material(s) can include one or more of non-aromatic (aliphatic and/or alicyclic) and/or aromatic mono-functional (meth)acrylate material(s), provided that an amount of the aromatic mono-functional (meth)acrylate material(s), if such is/are present, is no more than 5% or no more than 3% or no more than 1%, by weight, of a total amount of the monomeric mono-functional (meth)acrylate materials.

According to some of any of the embodiments described herein, the one or more monomeric mono-functional (meth) acrylate material(s) are devoid of, as defined herein, aromatic mono-functional (meth)acrylate material(s).

Herein, an aliphatic curable material describes a curable material in which the functional (e.g., polymerizable and/or cross-linkable) moiety or moieties, as defined herein, is/are covalently attached to an aliphatic moiety.

Herein, an alicylic curable material describes a curable material in which the functional (e.g., polymerizable and/or cross-linkable) moiety or moieties, as defined herein, is/are covalently attached to an alicyclic (cycloalkyl or heteroalicyclic) moiety.

Herein, an aromatic curable material describes a curable material in which the functional (e.g., polymerizable and/or cross-linkable) moiety or moieties, as defined herein, is/are covalently attached to an aromatic moiety, which comprises one or more aryl or heteroaryl moiety/moieties. By "devoid of" it is meant herein less than 1%, preferably less than 0.5%, more preferably less than 0.1%, or less than 0.05%, or less than 0.01%, or null, by weight, of the total weight of the respective material(s) or formulation.

Monomeric mono-functional (meth)acrylate materials according to the present embodiments can be collectively represented by Formula A:

Formula A wherein R₁ is a carboxylate, —C(=O)—O—Ra, R₂ is hydrogen (for acrylate) or methyl (methaceylate), and Ra is an aliphatic, alicylic or aromatic moiety, such that the MW of the compound is no more than 500 grams/mol.

When the material is an alicylic monomeric mono-functional (meth)acrylate material(s), Ra can be, for example, an alicylic moiety such as, but not limited to, isobornyl or any other substituted or unsubstituted cycloalkyl as described herein, or a heteroalicyclic moiety as described herein such as morpholine, tetrahydrofuran, oxalidine, or any other substituted or unsubstituted heteroalicylic as described herein, wherein the substituent(s), if present for a cycloalkyl or for a heteroalicyclic, do not comprise an aryl or heteroaryl, as defined herein. Exemplary alicyclic monomeric mono-functional acrylate include, but are not limited to isobornylacrylate (IBOA), acryloyl morpholine (ACMO), and a material marketed as SR218.

When the material is an aliphatic monomeric mono-functional (meth)acrylate material(s), Ra can be, for example, a substituted or unsubstituted alkyl or alkylene, or any other short hydrocarbon as defined herein, wherein the substituent(s), if present do not comprise an aryl or heteroaryl, as defined herein.

When the material is an aromatic monomeric mono-functional (meth)acrylate material(s), Ra can be, or comprise, for example, an aryl or a heteroaryl, as defined herein, for example a substituted or unsubstituted phenyl, a substituted or unsubstituted naphthalenyl, etc., wherein when substituted, there can be 1, 2, 3 or more substituents each being the same or different, or an alkyl or cycloalkyl substituted by one or more substituted or unsubstituted aryl(s) or substituted or unsubstituted heteroaryl(s), as described herein, for example, substituted or unsubstituted benzyl. Exemplary aromatic monomeric mono-functional (meth)acrylates include, for example, a material marketed as CN131B.

According to some of any of the embodiments described herein, the one or more monomeric mono-functional (meth) acrylate material(s) consist of one or more of non-aromatic mono-functional (meth)acrylate material(s).

According to some of any of the embodiments described herein, the one or more monomeric mono-functional (meth) acrylate material(s) consist of one or more of aliphatic and/or alicyclic mono-functional (meth)acrylate material(s).

According to some of any of the embodiments described herein, the one or more monomeric mono-functional (meth) acrylate material(s) comprise one or more alicylic mono-functional (meth)acrylate material(s) in an amount of at least 90%, or at least 95%, or 100%, by weight, of a total weight of the at least one mono-functional (meth)acrylate material.

According to some of any of the embodiments described herein, the one or more monomeric mono-functional (meth) acrylate material(s) consist essentially of one or more alicylic mono-functional (meth)acrylate material(s).

According to some of any of the embodiments described herein, a total amount of the one or more monomeric mono-functional (meth)acrylate material(s) ranges from 40 to 60%, or from 45 to 60%, or from 45 to 55%, by weight of the total weight of the formulation. According to some of these embodiments, the one or more monomeric mono-functional (meth)acrylate material(s) consist essentially of one or more non-aromatic (e.g., aliphatic and/or alicylic, preferably alicylic) mono-functional (meth)acrylate material(s).

According to some of any of the embodiments described herein, the formulation comprises one or more monomeric alicylic mono-functional (meth)acrylate material(s), in an amount of from 40 to 60% by weight of the total weight of the formulation.

According to some of any of the embodiments described herein, at least one, and preferably each, of the at one or more monomeric mono-functional (meth)acrylate materials is such that features, when hardened, Tg of from 20 to 100, or of from 50 to 100, or from 70 to 100, or from 80 to 100, ° C., including any intermediate values and subranges therebetween. In exemplary embodiments, at least one, and preferably each, of the at one or more mono-functional (meth)acrylate materials is such that features, when hardened, Tg of from 75 to 95, or from 85 to 95, ° C.

According to some of any of the embodiments described herein, the formulation comprises one or more monomeric alicylic mono-functional (meth)acrylate material(s) that feature Tg of from 20 to 100, or of from 50 to 100, ° C., as described herein, in a total amount of from 40 to 60% by weight of the total weight of the formulation, and is devoid of monomeric aromatic mono-functional (meth)acrylate material(s).

According to some of any of the embodiments described herein, at least one, or all, of the one or more monomeric mono-functional (meth)acrylate material(s) is/are alicylic mono-functional acrylate material(s).

Exemplary monomeric aliphatic mono-functional (meth) acrylate material(s) are presented in the Examples section that follows as Component A1.

Exemplary monomeric aromatic mono-functional (meth) acrylate material(s) are presented in the Examples section that follows as Component A2.

According to some of any of the embodiments described herein, the formulation further comprises, in addition to the one or more mono-functional monomeric (meth)acrylate materials as described herein in any of the respective embodiments, one or more multi-functional (meth)acrylate material(s).

According to some of these embodiments, a total amount of the one or more multi-functional (meth)acrylate material(s) ranges from 40 to 60% by weight of the total weight of the formulation, including any intermediate values and subranges therebetween.

According to some of any of the embodiments described herein, the one or more multi-functional (meth)acrylate material(s) are such that feature an average Tg, as defined herein, of at least 24, or at least 25, or that ranges from 24 to 40, or from 25 to 40, or from 24 to 30, or from 25 to 30, or from 30 to 40, ° C., including any intermediate values and subranges therebetween.

According to some of any of the embodiments described herein, the one or more multi-functional (meth)acrylate material(s) are such that feature an average Tg, as defined herein, of at least 24, or at least 25, or that ranges from 30 to 40, or from 30 to 70, or from 30 to 60, or from 40 to 60, or from 50 to 60, including any intermediate values and subranges therebetween.

In some embodiments, the formulation is such that the type (e.g., the Tg) and the relative amount of each multi-functional (meth)acrylate material(s) material is adjusted so that the formulation features an average Tg as described herein.

According to some of any of the embodiments described herein, each of the one or more multi-functional (meth) acrylate material(s) features, when hardened, a Tg lower than 100° C. or lower than 80° C., or lower than 70° C.

According to some of any of the embodiments described herein, the one or more multi-functional (meth)acrylate material(s) are such that feature an average Tg as defined herein, and each of the one or more multi-functional (meth) acrylate material(s) features, when hardened, a Tg lower than 100° C. or lower than 80° C., or lower than 70° C.

According to some of any of the embodiments described herein, the formulation is devoid of multi-functional (meth) acrylate material(s) features, when hardened, a Tg higher than a working temperature of an AM process, as described herein elsewhere, for example a Tg higher than 100° C., or higher than 90° C., or higher than 80° C., or higher than 70° C. Exemplary multi-functional (meth)acrylate material(s) that features, when hardened, a Tg higher than 70° C., or higher, as described herein, include, but are not limited to, materials marketed by Sartomer as SR834, SR833, SR833S, SR369, and chemical equivalents thereof. Such materials are also referred to in the Examples section that follows as Component B.

The one or more multi-functional (meth)acrylate material(s) can include monomeric and/or oligomeric, as defined herein, materials.

According to some of any of the embodiments described herein, the one or more multi-functional (meth)acrylate material(s) include at least one oligomeric material, and in some of these embodiments, the one or more multi-functional (meth)acrylate material(s) include at least one material that features MW higher than 500 grams/mol, or higher than 800 grams/mol, or higher than 1000 grams/mol.

According to some of any of the embodiments described herein, the one or more multi-functional (meth)acrylate material(s) include one or more multi-functional urethane (meth)acrylate, for example, urethane di(meth)acrylate and/or urethane tri(meth)acrylate. According to some of any of the embodiments described herein, the one or more multi-functional acrylate material(s) include one or more multi-functional urethane acrylate, for example, urethane diacrylate and/or urethane triacrylate. According to some of any one of these embodiments, each of the multi-functional urethane (meth)acrylate(s) features a molecular weight higher than 1000 grams/mol. Such materials are also referred to herein in the Examples section that follows as Component C.

According to some of the embodiments of the multi-functional urethane (meth)acrylate(s), a total amount of the multi-functional urethane (meth)acrylate(s) ranges from 15 to 40, or from 15 to 30, or from 15 to 25, % by weight of the total weight of the formulation.

According to some of any of the embodiments described herein for the multi-functional urethane (meth)acrylate(s), the multi-functional urethane (meth)acrylate(s) feature an average Tg, as described herein, of from 30 to 50, of from 35 to 50, or from 40 to 50, ° C., including any intermediate values and subranges therebetween. According to some embodiments, the type (in term of its Tg) and the relative amount of each of the multi-functional urethane (meth) acrylate(s) is adjusted so that the average Tg is as described herein.

According to some of any of the embodiments described herein for the multi-functional urethane (meth)acrylate(s), the multi-functional urethane (meth)acrylate(s) comprises one or more oligomeric multi-functional urethane (meth) acrylate(s) that features, when hardened, Tg not higher than 20° C., for example, of from −20 to 20° C., or from 0 to 20° C., or from 5 to 20° C. or from 10 to 20° C. or from 15 to 20° C. (for example Component C1 in the Examples section that follows); and one or more multi-functional urethane (meth)acrylate that features, when hardened, Tg higher than 20, for example, of from 20 to 70° C., or of from 20 to 60° C., or of from 30 to 60° C., or of from 40 to 60° C. (for example, Component C2 in the Examples section that follows).

According to some of any of these embodiments, the one or more oligomeric multi-functional urethane (meth) acrylate(s) that features, when hardened, Tg of 20° C. or lower comprise one or more di-functional urethane (meth) acrylate(s). Exemplary such materials include aliphatic polyester urethane diacrylate oligomers, such as, but not limited to, materials marketed under the tradenames CN991, CN9200, CN996, CN9002, and CN996H90, and similar materials.

According to some of any of these embodiments, the one or more oligomeric multi-functional urethane (meth) acrylate(s) that features, when hardened, Tg higher than 20° C. comprise one or more tri-functional urethane (meth) acrylate(s), or otherwise multi-functional urethane (meth) acrylates or mixtures thereof that provides the indicated Tg. Exemplary such materials include aliphatic urethane diacrylate and triacrylate oligomers, such as, but not limited to, those marketed as Photomer 6010, Photomer 6019, Photomer 6210, Photomer 6891, Photomer 6893-20R, Photomer 6008, Photomer 6184, and similar materials.

According to some of any of these embodiments, an amount of the one or more oligomeric multi-functional urethane (meth)acrylate(s) that features, when hardened, Tg of 20° C. or lower ranges from 3 to 10, or from 4 to 10, or from 4 to 8, or from 5 to 10, or from 4 to 7, % by weight, of the total weight of the formulation, including any intermediate values and subranges therebetween.

According to some of any of these embodiments, an amount of the one or more oligomeric multi-functional urethane (meth)acrylate(s) that features, when hardened, Tg higher than 20° C. ranges from 10 to 30, or from 15 to 30, or from 15 to 25, or from 20 to 25, % by weight, of the total weight of the formulation, including any intermediate values and subranges therebetween.

According to some of any of the embodiments described herein, the formulation comprises one or more oligomeric multi-functional urethane (meth)acrylate(s), at a total amount of from 15 to 40, or from 15 to 30, or from 15 to 25, % by weight of the total weight of the formulation, the average Tg of these materials ranges from 30 to 50, of from 35 to 50, or from 40 to 50, ° C., and these materials comprise one or more oligomeric (as defined herein with regard to MW) multi-functional urethane (meth)acrylate(s) that feature, when hardened, Tg of 20° C. or lower, in an amount that ranges from 3 to 10, or from 4 to 10, or from 4 to 8, or from 5 to 10, or from 4 to 7, % by weight, of the total weight of the formulation, and one or more oligomeric (as defined herein with regard to MW) multi-functional urethane (meth) acrylate(s) that feature, when hardened, Tg higher than 20° C. in an amount of from 10 to 30, or from 15 to 30, or from 15 to 25, or from 20 to 25, % by weight, of the total weight of the formulation.

According to some of any of the embodiments described herein for the one or more oligomeric multi-functional urethane (meth)acrylate(s), each of the oligomeric multi-functional urethane (meth)acrylates is an oligomeric (as defined herein with regard to MW) multi-functional urethane acrylate.

According to some of the embodiments described herein, the one or more multi-functional (meth)acrylate materials in the formulation comprise one or more multi-functional ethoxylated (meth)acrylate material(s), which are also referred to herein as Component D.

According to some of the embodiments described herein, the one or more multi-functional (meth)acrylate materials in the formulation comprise one or more oligomeric multi-functional urethane (meth)acrylate materials as described herein in any of the respective embodiments, and one or more multi-functional ethoxylated (meth)acrylate material(s).

According to some of any of the embodiments described herein, the one or more multi-functional ethoxylated (meth) acrylate material features, when hardened, Tg of from 50 to 80, or from 50 to 70, ° C.

According to some of any of the embodiments described herein, when the formulation comprises two or more multi-functional ethoxylated (meth)acrylate materials, an average Tg of these materials ranges from 50 to 80, or from 50 to 70, ° C.

According to some of any of the embodiments described herein, the one or more multi-functional ethoxylated (meth) acrylate material(s) as described herein comprise one or more multi-functional ethoxylated (meth)acrylate material(s) that feature a viscosity higher than 500 centipoises (for example, of from 500 to 2500, or from 500 to 2000, or from 800 to 2000, or from 800 to 1600 centipoises). Such materials are also referred to herein as Component D1 in the Examples section that follows.

According to some of any of the embodiments described herein, the one or more multi-functional ethoxylated (meth) acrylate material(s) as described herein comprise one or more multi-functional aromatic ethoxylated (meth)acrylate material(s), which comprises a branching unit, as described herein, that includes one or more aryl(s) or heteroaryl(s), as described herein. Such materials are exemplary Component D1 materials. Exemplary such materials include, but are not limited to, multi-functional (e.g., di- and/or tri-)bis-phenol ethoxylated (meth)acrylate(s).

In some of any of the embodiments described herein, a multi-functional ethoxylated (meth)acrylate material that features a viscosity higher than 500 centipoises has a molecular weight higher than 400 grams/mol or higher than 500 grams/mol, for example, of from 400 to 1000 or from 400 to 800, or from 400 to 700, or from 400 to 600, or from 500 to 1000, or from 500 to 800, or from 500 to 600, grams/mol.

According to some embodiments, an amount of the one or more multi-functional ethoxylated (meth)acrylate material(s) that feature a viscosity higher than 500 centipoises ranges from about 15 to about 25% by weight of the total weight of the formulation.

According to some of any of the embodiments described herein, the one or more multi-functional ethoxylated (meth) acrylate material(s) as described herein comprise one or more multi-functional ethoxylated (meth)acrylate material(s) that feature a viscosity of 50 or lower or of 20 or lower, centipoises, for example, of from 5 to 20, of from 10 to 20, centipoises. Such materials are also referred to herein as Component D2 in the Examples section that follows.

In some of any of the embodiments described herein, a multi-functional ethoxylated (meth)acrylate material that features a viscosity of 50 centipoises or lower, has a molecular weight lower than 500 grams/mol, or lower than 400 grams/mol, or lower.

According to some of any of the embodiments described herein, the one or more multi-functional ethoxylated (meth) acrylate material(s) as described herein comprise one or more multi-functional non-aromatic (e.g., aliphatic or alicyclic) ethoxylated (meth)acrylate material(s), which comprises a branching unit, as described herein, that is non-aromatic, that is an aliphatic or an alicylic branching unit that does not comprise an aryl or heteroaryl. Such materials are exemplary Component D2 materials.

According to some embodiments, an amount of the one or more multi-functional ethoxylated (meth)acrylate material(s) that feature a viscosity lower than 50 centipoises ranges from about 3 to about 10, or from about 3 to about 8, % by weight of the total weight of the formulation.

According to some of any of the embodiments described herein, the one or more multi-functional ethoxylated (meth) acrylate material(s) as described herein comprise one or more multi-functional ethoxylated (meth)acrylate material(s) that feature a viscosity higher than 500 centipoises, as described herein, and one or more multi-functional ethoxylated (meth)acrylate material(s) that feature a viscosity lower than 50 centipoises, as described herein.

According to some of any of the embodiments described herein, the one or more multi-functional ethoxylated (meth) acrylate material(s) as described herein comprise one or more multi-functional aromatic ethoxylated (meth)acrylate material(s), as described herein, and one or more multi-functional non-aromatic (meth)acrylate material(s), as described herein.

According to some of any of the embodiments described herein, the one or more multi-functional ethoxylated (meth) acrylate material(s) as described herein comprise one or more multi-functional aromatic ethoxylated (meth)acrylate material(s), as described herein, which features a viscosity higher than 500 centipoises and/or MW higher than 400 or higher than 500 grams/mol, as described herein, and one or more multi-functional non-aromatic (meth)acrylate material(s), as described herein, which features a viscosity pf 50 centipoises or lower and/or a molecular weight lower than 500 grams/mol or lower than 400 grams/mol, as described herein.

According to some of any of the embodiments described herein for multi-functional ethoxylated (meth)acrylate material(s), at least one, or each, of these materials is a multi-functional ethoxylated acrylate material.

According to some of any of the embodiments described herein for multi-functional ethoxylated (meth)acrylate material(s), at least one, or each, of these materials is a di-functional ethoxylated (meth)acrylate material.

According to some of any of the embodiments described herein for multi-functional ethoxylated (meth)acrylate material(s), at least one, or each, of these materials is a di-functional ethoxylated acrylate material.

According to some of any of the embodiments described herein, a total amount of the one or more multi-functional ethoxylated (meth)acrylate material that feature, when hardened, Tg of from 50 to 80, or from 50 to 70, ° C., as described herein in any of the respective embodiments, ranges from 15 to 30, or from 20 to 30, % by weight, of the total amount of the formulation.

According to some of any of the embodiments described herein, the formulation comprises no more than 5% by weight, or is devoid of, a multi-functional (e.g., di-functional) epoxy (meth)acrylate material, preferably an aromatic epoxy a(meth)crylate material such as a bis-phenol epoxy (meth)acrylate material. Such a material is also referred to herein as Component E in the Examples section that follows.

A formulation as described herein may comprise one or more non-curable materials, which are also referred to herein as additives.

Such materials include, for example, surface active agents (surfactants), inhibitors, antioxidants, fillers, pigments, dyes, and/or dispersants.

Surface-active agents may be used to reduce the surface tension of the formulation to the value required for jetting or for printing process, which is typically around 30 dyne/cm. Such agents include silicone materials, for example, organic polysiloxanes such as PDMS and derivatives therefore, such as those commercially available as BYK type surfactants.

According to some of any of the embodiments of the present invention, a formulation as described herein comprises one or more surface active agents, e.g., as described herein.

According to some embodiments, an amount of the surface active agent is lower than 0.05% by weight of the total weight of the formulation, and can range, for example, from 0.001 to 0.045%, by weight.

Suitable stabilizers (stabilizing agents) include, for example, thermal stabilizers, which stabilize the formulation at high temperatures.

The term "filler" describes an inert material that modifies the properties of a polymeric material and/or adjusts a quality of the end products. The filler may be an inorganic particle, for example calcium carbonate, silica, and clay.

Fillers may be added to the modeling formulation in order to reduce shrinkage during polymerization or during cooling, for example, to reduce the coefficient of thermal expansion, increase strength, increase thermal stability, reduce cost and/or adopt rheological properties. Nanoparticles fillers are typically useful in applications requiring low viscosity such as ink-jet applications.

In some embodiments, a concentration of each of a dispersant and/or a stabilizer and/or a filler, if present, ranges from 0.01 to 2%, or from 0.01 to 1%, by weight, of the total weight of the respective formulation. Dispersants are typically used at a concentration that ranges from 0.01 to 0.1%, or from 0.01 to 0.05%, by weight, of the total weight of the respective formulation.

In some embodiments, the formulation further comprises an inhibitor. The inhibitor is included for preventing or reducing curing before exposure to a curing condition. Suitable inhibitors include, for example, those commercially available as the Genorad type, or as MEHQ. Any other suitable inhibitors are contemplated.

The pigments can be organic and/or inorganic and/or metallic pigments, and in some embodiments the pigments are nanoscale pigments, which include nanoparticles.

Exemplary inorganic pigments include nanoparticles of titanium oxide, and/or of zinc oxide and/or of silica. Exemplary organic pigments include nanosized carbon black.

In some embodiments, combinations of white pigments and dyes are used to prepare colored cured materials.

The dye may be any of a broad class of solvent soluble dyes. Some non-limiting examples are azo dyes which are yellow, orange, brown and red; anthraquinone and triarylmethane dyes which are green and blue; and azine dye which is black.

According to some of any of the embodiments described herein, the formulation further comprises a blue dye or pigment, which is aimed at masking a possible yellow of the obtained hardened material.

According to some of these embodiments, an amount of the blue dye or pigment is lower than $5 \cdot 10^{-4}$%, or lower than $2 \cdot 10^{-4}$%, or lower $1 \cdot 10^{-4}$%, by weight, of the total weight of the formulation, and can range, for example, from $1 \cdot 10^{-6}$% to $1 \cdot 10^{-4}$%, from $1 \cdot 10^{-5}$% to $1 \cdot 10^{-4}$%, or from $1 \cdot 10^{-5}$% to $8 \cdot 10^{-5}$%, According to some of any of the embodiments described herein, the formulation further comprises, as one of the non-curable additives, a sulfur-containing compound.

According to other embodiments, the formulation is devoid of a sulfur-containing material.

The term "sulfur-containing material" as used in the context of any of the above embodiments encompasses compounds that include, or are terminated by, one or more —S— linking groups or —SH (thiol) end-groups, as defined herein. This term encompasses, for example, compounds that include one or more thiol, thioalkoxy, and/or thioaryloxy groups, as defined herein.

Exemplary sulfur-containing compounds include beta-mercaptopropionates, mercaptoacetates, and/or alkane thiols.

Some examples of beta-mercaptopropionate include, but are not limited to, glycol di-(3-mercaptopropionate), pentaerythritol tetra-(3-mercaptopropionate), and trimethylol propane tri-(3-mercaptopropionate).

According to some embodiments of the present invention, the sulfur-containing compound is glycol di-(3-mercaptopropionate), pentaerythritol tetra-(3-mercaptopropionate), and/or trimethylol propane tri-(3-mercaptopropionate).

According to some embodiments of the present invention, a transparent formulation as described herein (a first formulation) comprises:

One or more monomeric (as defined herein) mono-functional non-aromatic (e.g., alicyclic) (meth)acrylate material(s), preferably one or more mono-functional non-aromatic (e.g., alicyclic) acrylate material(s), in an amount of 40 to 60% by weight, as described herein in any of the respective embodiments (e.g., Component A1);

One or more multi-functional oligomeric urethane (meth)acrylate material(s), preferably one or more di-functional and/or tri-functional oligomeric urethane acrylate material(s), featuring an average Tg of from 30 to 50° C. (e.g., Components C1 and/or C2), in a total amount of from 15 to 30 by weight, as described herein in any of type respective embodiments; and One or more multi-functional ethoxylated (meth)acrylate material(s) featuring average Tg of from 50 to 80° C. (e.g., Components D1 and/or D2), in a total amount of from 15 to 35 by weight, as described herein in any of the respective embodiments.

According to some embodiments of the present invention, a transparent formulation as described herein (a first formulation) comprises:

One or more monomeric (as defined herein) mono-functional non-aromatic (e.g., alicyclic) (meth)acrylate material(s), preferably one or more mono-functional non-aromatic (e.g., alicyclic) acrylate material(s), in an amount of 40 to 60% by weight, as described herein in any of the respective embodiments (e.g., Component A1);

One or more multi-functional oligomeric urethane (meth)acrylate material(s), preferably one or more di-functional oligomeric urethane acrylate material(s), featuring an average Tg of 20° C. or lower (e.g., Component C1), in an amount of from 3 to 10, or 3 to 8, % by weight, as described herein in any of the respective embodiments;

One or more multi-functional oligomeric urethane (meth)acrylate material(s), preferably one or more di-functional and/or tri-functional oligomeric urethane acrylate material(s), more preferably one or more tri-functional oligomeric urethane acrylate material(s), featuring an average Tg of 30 to 60, or 40-60° C. (e.g., Component C2), in an amount of from 10 to 25, or from 12 to 22, % by weight, as described herein in any of the respective embodiments;

One or more multi-functional ethoxylated (meth)acrylate material(s), preferably one or more di-functional ethoxylated acrylate material(s), featuring average Tg of from 50 to 80° C. and a viscosity higher than 500 centipoises (e.g., Component D1), in an amount of from 15 to 25 by weight, as described herein in any of the respective embodiments; and One or more multi-functional ethoxylated (meth)acrylate material(s), preferably one or more di-functional ethoxylated acrylate material(s), featuring average Tg of from 50 to 80° C. and a viscosity lower than 500, or lower than 200, centipoises (e.g., Component D2), in an amount of from 5 to 10 by weight, as described herein in any of the respective embodiments.

Such a formulation is also referred to herein as Exemplary (Ex.) formulation I.

In some of any of the embodiments described herein for exemplary formulation I (Ex. Formulation I), the formulation is devoid of a sulfur-containing compound as described herein.

In some of any of the embodiments described herein for Ex. Formulation I, the formulation further comprises one or more of a surface active agent, an inhibitor and a blue dye, as described herein.

In some of any of the embodiments described herein for Ex. Formulation I, an average Tg of the one or more multi-functional (meth)acrylate material, when hardened, ranges from 30 to 70, or from 30 to 60, or from 40 to 60° C.

According to some embodiments of the present invention, a transparent formulation as described herein (a first formulation) comprises:

One or more monomeric (as defined herein) mono-functional non-aromatic (e.g., alicyclic) (meth)acrylate material(s), preferably one or more mono-functional non-aromatic (e.g., alicyclic) acrylate material(s), in an amount of 40 to 60% by weight, as described herein in any of the respective embodiments (e.g., Component A1);

One or more multi-functional oligomeric urethane (meth) acrylate material(s), preferably one or more di-functional oligomeric urethane acrylate material(s), featuring an average Tg of 20° C. or lower (e.g., Component C1), in an amount of from 20 to 30, % by weight, as described herein in any of the respective embodiments; and One or more multi-functional ethoxylated (meth)acrylate material(s), preferably one or more di-functional ethoxylated acrylate material(s), featuring average Tg of from 50 to 80° C. and a viscosity higher than 500 centipoises (e.g., Component D1), in an amount of from 15 to 25% by weight, as described herein in any of the respective embodiments.

Such a formulation is also referred to herein as Exemplary (Ex.) formulation II.

In some of any of the embodiments described herein for Ex. Formulation II, the formulation further comprises a sulfur-containing compound as described herein, ion an amount of, for example, 0.1 to 5, or 0.1 to 2, or 0.2 to 2, or 0.5 to 2, or 0.5 to 1.5, e.g., about 1-1.1, % by weight, of the total weight of the formulation.

In some of any of the embodiments described herein for Ex. Formulation II, the formulation further comprises a surface active agent, and optionally an inhibitor and/or a blue dye, as described herein.

A transparent formulation as described herein in any of the respective embodiments is usable in additive manufacturing of a three-dimensional object comprising, in at least a portion thereof, a transparent material.

According to some of any of the embodiments described herein the transparent formulation features properties such as viscosity, surface tension and/or jettability, which render it usable in additive manufacturing such as three-dimensional inkjet printing.

According to some of any of the embodiments described herein the transparent formulation provides, when hardened, a transparent material.

According to some embodiments, the transparent material is characterized by transmittance of 80% or higher, when measured using an X-rite device as described herein.

According to some embodiments, the transparent material is characterized by Yellowness Index lower than 3, or lower than 2.5, as determined by ASTM D-1925.

According to some embodiments, the transparent material is characterized by a CIE-LAB b* value (e.g., as determined by X-rite color measurements as described herein) of less than 2, or less than 1.5.

According to some embodiments, the transparent material is characterized by a CIE-LAB Lightness value L* (e.g., as determined by X-rite color measurements as described herein) of at least 90.

According to some embodiments, the transparent material is characterized by a CIE-LAB a* value (e.g., as determined by X-rite color measurements as described herein) of at least −0.35, or at least −0.2.

As described herein, some embodiments of the present invention relate to additive manufacturing of an object while using a multi-part formulations system, which comprises two or more modeling material formulations.

According to an aspect of some embodiments of the present invention there is provided a multi-part formulation which comprises two or more modeling material formulations, at least one of these formulations is a transparent formulation as described herein in any of the respective embodiments and is referred to as a first formulation, or as a partially-reactive formulation (due to the relatively low amount of PI therein).

According to some embodiments of this aspect of the present invention, a multi-part formulation which comprises two or more modeling material formulations, which differ from one another by their reactivity when exposed to a curing condition (e.g., the same curing condition).

According to some embodiments, the multi-part formulation system comprises two or more modeling material formulations and at least two of the modeling material formulations differ from one another by a degree and/or rate of hardening when exposed to the same curing condition.

In some of any of these embodiments, the multi-part formulation system comprises a first modeling material formulation which comprises one or more curable materials (also referred to herein as first curable materials), and the second modeling material formulation comprises one or more curable materials (also referred to herein as second curable materials) and the first and second curable materials can be the same or different, and the first and second formulation differ from one another by a degree and/or rate of hardening when exposed to the same curing condition.

For example, the first formulation is characterized by a rate of hardening X, when exposed to a curing condition, and the second formulation is characterized by a rate of hardening Y when exposed to the same curing condition, whereby Y is greater than X. In some embodiments, Y is greater than X by at least 10%, or by at least 20%, at least 30%, at least 40%, 50%, or by more, e.g., by 2-folds, 3-folds, or more. In some of these embodiments, the multi-part formulation system comprises a first modeling material formulation which comprises one or more curable materials (also referred to herein as first curable materials), and the second modeling material formulation comprises one or more curable materials (also referred to herein as second curable materials) and the first and second curable materials can be the same or different, and the first and second formulation differ from one another by an amount and/or type of the PI(s) therein.

For example, the first formulation comprises a PI in an amount of no more than 1% by weight, as described herein, and the second formulation comprises a PI in an amount of from 1 to 3% by weight, of the total weight of the second formulation.

According to some of any of the embodiments described herein, the first formulation is as described herein for providing a transparent formulation which provides, when hardened, a first transparent material, and the second formulation is also a transparent curable formulation, which provides, when hardened, a second transparent material. The first and second transparent materials can exhibit the same or different optical (e.g., transmittance) and/or color (e.g., YI) properties.

Any commercially available or customary prepared transparent formulation can be used as a second formulation.

According to some example embodiments, the AM method includes forming a core of the object with the first building (e.g., modeling) material formulation and a shell or surface of the object with the second building (e.g., modeling) material formulation.

In some of any of the embodiments described herein there is provided a kit comprising one or more of the modeling material formulation(s) composing the multi-part formulation system, as described herein in any of the respective embodiments and any combination thereof.

In some embodiments, the kit comprises two or more formulations, as described herein in any of the respective embodiments and any combination thereof, and in some of these embodiments each formulation is packaged individually in the kit.

In some embodiments, the kit further comprises a third formulation, for example, a support material formulation, as described herein, or instructions to use the formulation system in combination with the third formulation.

In some embodiments, the kit comprises the first formulations and instructions to use it with the second formulation.

In exemplary embodiments, the formulations are packaged within the kit in a suitable packaging material, preferably, an impermeable material (e.g., water- and gas-impermeable material), and further preferably an opaque material.

In some embodiments, the kit further comprises instructions to use the formulations in an additive manufacturing process, preferably a 3D inkjet printing process as described herein. The kit may further comprise instructions to use the formulations in the process in accordance with the method as described herein.

The Object:

The method of the present embodiments manufactures three-dimensional objects in a layerwise manner by forming a plurality of layers in a configured pattern corresponding to the shape of the objects, as described herein.

The final three-dimensional object, obtainable by a method as described herein, is made of the modeling material or a combination of modeling materials or a combination of modeling material/s and support material/s or modification thereof (e.g., following curing). All these operations are well-known to those skilled in the art of solid freeform fabrication.

In some embodiments, the object comprises a transparent material in one or more parts thereof.

In some embodiments, the object features, in at least a portion thereof, one or more of the following characteristics, when determined as described in the Examples section that follows:

Transmittance of at least 80%;
Yellowness Index lower than 3, or lower than 2.5;
a CIE-LAB Lightness value L*, as defined in X-rite measurements, of at least 90;
a CIE-LAB a* value as defined in X-rite measurements, of at least −0.35; and
a CIE-LAB b* value as defined in X-rite measurements, of less than 2, or less than 1.5.

In some embodiments, the object additionally features, in at least a portion thereof, one or more of the following characteristics:

Tensile strength higher than 30 MPa, or higher than 35 MPa, or higher than 50 MPa;
Flexural strength higher than 30 MPa;
Flexural Modulus higher than 1500 MPa, or higher than 1800 MPa or higher than 2000 MPa;
Izod Impact, or impact resistance, higher than 15 J/mol;
HDT higher than 40° C.; and
Elongation to break of at least 7% % (e.g., 7-30%, including any intermediate values and subranges therebetween).

In some embodiments, the object features, in at least a portion thereof, one or more of the characteristics presented in Table 6.

In some of any of the embodiments related to an object as described herein, the object comprises in at least a portion thereof that comprises a transparent material, an inner core made of the first transparent formulation as described herein and an outer shell at least partially enveloping the inner core, made of a second transparent formulation as described herein in any of the respective embodiments and any combination thereof.

As used herein, the phrase "impact resistance", which is also referred to interchangeably, herein and in the art, as "impact strength" or simply as "impact", describes the resistance of a material to fracture by a mechanical impact, and is expressed in terms of the amount of energy absorbed by the material before complete fracture. Impact resistance can be measured using, for example, the ASTM D256-06 standard Izod impact testing (also known as "Izod notched impact", or as "Izod impact"), and/or as described hereinunder, and is expressed as J/m.

As used herein, HDT refers to a temperature at which the respective formulation or combination of formulations deforms under a predetermined load at some certain temperature. Suitable test procedures for determining the HDT of a formulation or combination of formulations are the ASTM D-648 series, particularly the ASTM D-648-06 and ASTM D-648-07 methods. In various exemplary embodiments of the invention the core and shell of the structure differ in their HDT as measured by the ASTM D-648-06 method as well as their HDT as measured by the ASTM D-648-07 method. In some embodiments of the present invention the core and shell of the structure differ in their HDT as measured by any method of the ASTM D-648 series. In the majority of the examples herein, HDT at a pressure of 0.45 MPa was used.

Herein, "Tg" of a material refers to glass transition temperature defined as the location of the local maximum of the E" curve, where E" is the loss modulus of the material as a function of the temperature.

Broadly speaking, as the temperature is raised within a range of temperatures containing the Tg temperature, the state of a material, particularly a polymeric material, gradually changes from a glassy state into a rubbery state.

Herein, "Tg range" is a temperature range at which the E" value is at least half its value (e.g., can be up to its value) at the Tg temperature as defined above.

Without wishing to be bound to any particular theory, it is assumed that the state of a polymeric material gradually changes from the glassy state into the rubbery within the Tg range as defined above. The lowest temperature of the Tg range is referred to herein as Tg(low) and the highest temperature of the Tg range is referred to herein as Tg(high).

Herein throughout, whenever a curable material is defined by a property of a hardened material obtained therefrom, it is to be understood that this property is for a hardened material obtained from this curable material per se.

By "Tensile strength" it is meant the maximum stress that a material can withstand while being stretched or pulled before breaking. Tensile strength may be determined, for example, according to ASTM D-638-03.

By "Tensile modulus" it is meant the stiffness of a material, defined as the relationship between stress (force per unit area) and strain (proportional deformation) in a material in the linear elasticity regime of a uniaxial deformation. Tensile modulus may be determined, for example, according to ASTM D-638-04.

By "flexural strength" it is meant the stress in a material just before it yields in a flexure test. Flexural strength may be determined, for example, according to ASTM D-790-03.

By "flexural modulus" it is meant the ratio of stress to strain in flexural deformation, which is determined from the slope of a stress-strain curve produced by a flexural test such as the ASTM D790. Flexural modulus may be determined, for example, according to ASTM D-790-04.

Herein throughout, unless otherwise indicated, viscosity values are provided for a viscosity of a material or a formulation when measured at 25° C. on a Brookfield's viscometer.

It is expected that during the life of a patent maturing from this application many relevant curable materials and/or respective agents for promoting polymerization of curable materials will be developed and the scope of the terms first curable material, second curable material and agents promoting polymerization thereof is intended to include all such new technologies a priori.

As used herein the term "about" refers to ±10% or ±5%.

The terms "comprises", "comprising", "includes", "including", "having" and their conjugates mean "including but not limited to".

The term "consisting of" means "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

As used herein, the singular form "a", "an" and "the" include plural references unless the context clearly dictates otherwise. For example, the term "a compound" or "at least one compound" may include a plurality of compounds, including mixtures thereof.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

As used herein the term "method" refers to manners, means, techniques and procedures for accomplishing a given task including, but not limited to, those manners, means, techniques and procedures either known to, or readily developed from known manners, means, techniques and procedures by practitioners of the physical, mechanical, chemical, pharmacological, biological, biochemical and medical arts.

Herein throughout, whenever the phrase "weight percent", or "% by weight" or "% wt.", is indicated in the context of embodiments of a formulation (e.g., a modeling formulation), it is meant weight percent of the total weight of the respective uncured formulation.

Herein throughout, an acrylic material is used to collectively describe material featuring one or more acrylate, methacrylate, acrylamide and/or methacrylamide group(s).

Similarly, an acrylic group is used to collectively describe curable groups which are acrylate, methacrylate, acrylamide and/or methacrylamide group(s), preferably acrylate or methacrylate groups (referred to herein also as (meth)acrylate groups).

Herein throughout, the term "(meth)acrylic" encompasses acrylic and methacrylic materials.

Herein throughout, the phrase "linking moiety" or "linking group" describes a group that connects two or more moieties or groups in a compound. A linking moiety is typically derived from a bi- or tri-functional compound, and can be regarded as a bi- or tri-radical moiety, which is connected to two or three other moieties, via two or three atoms thereof, respectively.

Exemplary linking moieties include a hydrocarbon moiety or chain, optionally interrupted by one or more heteroatoms, as defined herein, and/or any of the chemical groups listed below, when defined as linking groups.

When a chemical group is referred to herein as "end group" it is to be interpreted as a substituent, which is connected to another group via one atom thereof.

Herein throughout, the term "hydrocarbon" collectively describes a chemical group composed mainly of carbon and hydrogen atoms. A hydrocarbon can be comprised of alkyl, alkene, alkyne, aryl, and/or cycloalkyl, each can be substituted or unsubstituted, and can be interrupted by one or more heteroatoms. The number of carbon atoms can range from 2 to 30, and is preferably lower, e.g., from 1 to 10, or from 1 to 6, or from 1 to 4. A hydrocarbon can be a linking group or an end group.

Bisphenol A is an example of a hydrocarbon comprised of 2 aryl groups and one alkyl group. Dimethylenecyclohexane is an example of a hydrocarbon comprised of 2 alkyl groups and one cycloalkyl group.

As used herein, the term "amine" describes both a —NR'R" group and a —NR'— group, wherein R' and R" are each independently hydrogen, alkyl, cycloalkyl, aryl, as these terms are defined hereinbelow.

The amine group can therefore be a primary amine, where both R' and R" are hydrogen, a secondary amine, where R' is hydrogen and R" is alkyl, cycloalkyl or aryl, or a tertiary amine, where each of R' and R" is independently alkyl, cycloalkyl or aryl.

Alternatively, R' and R" can each independently be hydroxyalkyl, trihaloalkyl, cycloalkyl, alkenyl, alkynyl, aryl, heteroaryl, heteroalicyclic, amine, halide, sulfonate, sulfoxide, phosphonate, hydroxy, alkoxy, aryloxy, thiohydroxy, thioalkoxy, thioaryloxy, cyano, nitro, azo, sulfonamide, carbonyl, C-carboxylate, O-carboxylate, N-thiocarbamate, O-thiocarbamate, urea, thiourea, N-carbamate, O-carbamate, C-amide, N-amide, guanyl, guanidine and hydrazine.

The term "amine" is used herein to describe a —NR'R" group in cases where the amine is an end group, as defined hereinunder, and is used herein to describe a —NR'— group in cases where the amine is a linking group or is or part of a linking moiety.

The term "alkyl" describes a saturated aliphatic hydrocarbon including straight chain and branched chain groups. Preferably, the alkyl group has 1 to 30, or 1 to 20 carbon atoms. Whenever a numerical range; e.g., "1-20", is stated herein, it implies that the group, in this case the alkyl group, may contain 1 carbon atom, 2 carbon atoms, 3 carbon atoms, etc., up to and including 20 carbon atoms. The alkyl group may be substituted or unsubstituted. Substituted alkyl may have one or more substituents, whereby each substituent group can independently be, for example, hydroxyalkyl, trihaloalkyl, cycloalkyl, alkenyl, alkynyl, aryl, heteroaryl, heteroalicyclic, amine, halide, sulfonate, sulfoxide, phosphonate, hydroxy, alkoxy, aryloxy, thiohydroxy, thioalkoxy, thioaryloxy, cyano, nitro, azo, sulfonamide, C-carboxylate, O-carboxylate, N-thiocarbamate, O-thiocarbamate, urea, thiourea, N-carbamate, O-carbamate, C-amide, N-amide, guanyl, guanidine and hydrazine.

The alkyl group can be an end group, as this phrase is defined hereinabove, wherein it is attached to a single adjacent atom, or a linking group, as this phrase is defined hereinabove, which connects two or more moieties via at least two carbons in its chain. When the alkyl is a linking group, it is also referred to herein as "alkylene" or "alkylene chain".

Alkene and Alkyne, as used herein, are an alkyl, as defined herein, which contains one or more double bond or triple bond, respectively.

The term "cycloalkyl" describes an all-carbon monocyclic ring or fused rings (i.e., rings which share an adjacent pair of carbon atoms) group where one or more of the rings does not have a completely conjugated pi-electron system. Examples include, without limitation, cyclohexane, adamantine, norbornyl, isobornyl, and the like. The cycloalkyl group may be substituted or unsubstituted. Substituted cycloalkyl may have one or more substituents, whereby each substituent group can independently be, for example, hydroxyalkyl, trihaloalkyl, cycloalkyl, alkenyl, alkynyl, aryl, heteroaryl, heteroalicyclic, amine, halide, sulfonate, sulfoxide, phosphonate, hydroxy, alkoxy, aryloxy, thiohydroxy, thioalkoxy, thioaryloxy, cyano, nitro, azo, sulfonamide, C-carboxylate, O-carboxylate, N-thiocarbamate, O-thiocarbamate, urea, thiourea, N-carbamate, O-carbamate, C-amide, N-amide, guanyl, guanidine and hydrazine. The cycloalkyl group can be an end group, as this phrase is defined hereinabove, wherein it is attached to a single adjacent atom, or a linking group, as this phrase is defined hereinabove, connecting two or more moieties at two or more positions thereof.

The term "heteroalicyclic" describes a monocyclic or fused ring group having in the ring(s) one or more atoms such as nitrogen, oxygen and sulfur. The rings may also have one or more double bonds. However, the rings do not have a completely conjugated pi-electron system. Representative examples are piperidine, piperazine, tetrahydrofurane, tetrahydropyrane, morpholino, oxalidine, and the like.

The heteroalicyclic may be substituted or unsubstituted. Substituted heteroalicyclic may have one or more substituents, whereby each substituent group can independently be, for example, hydroxyalkyl, trihaloalkyl, cycloalkyl, alkenyl, alkynyl, aryl, heteroaryl, heteroalicyclic, amine, halide, sulfonate, sulfoxide, phosphonate, hydroxy, alkoxy, aryloxy, thiohydroxy, thioalkoxy, thioaryloxy, cyano, nitro, azo, sulfonamide, C-carboxylate, O-carboxylate, N-thiocarbamate, O-thiocarbamate, urea, thiourea, O-carbamate, N-carbamate, C-amide, N-amide, guanyl, guanidine and hydrazine. The heteroalicyclic group can be an end group, as this phrase is defined hereinabove, where it is attached to a single adjacent atom, or a linking group, as this phrase is defined hereinabove, connecting two or more moieties at two or more positions thereof.

The term "aryl" describes an all-carbon monocyclic or fused-ring polycyclic (i.e., rings which share adjacent pairs of carbon atoms) groups having a completely conjugated pi-electron system. The aryl group may be substituted or unsubstituted. Substituted aryl may have one or more substituents, whereby each substituent group can independently be, for example, hydroxyalkyl, trihaloalkyl, cycloalkyl, alkenyl, alkynyl, aryl, heteroaryl, heteroalicyclic, amine, halide, sulfonate, sulfoxide, phosphonate, hydroxy, alkoxy, aryloxy, thiohydroxy, thioalkoxy, thioaryloxy, cyano, nitro, azo, sulfonamide, C-carboxylate, O-carboxylate, N-thiocarbamate, O-thiocarbamate, urea, thiourea, N-carbamate, O-carbamate, C-amide, N-amide, guanyl, guanidine and hydrazine. The aryl group can be an end group, as this term is defined hereinabove, wherein it is attached to a single adjacent atom, or a linking group, as this term is defined hereinabove, connecting two or more moieties at two or more positions thereof.

The term "heteroaryl" describes a monocyclic or fused ring (i.e., rings which share an adjacent pair of atoms) group having in the ring(s) one or more atoms, such as, for example, nitrogen, oxygen and sulfur and, in addition, having a completely conjugated pi-electron system. Examples, without limitation, of heteroaryl groups include pyrrole, furan, thiophene, imidazole, oxazole, thiazole, pyrazole, pyridine, pyrimidine, quinoline, isoquinoline and purine. The heteroaryl group may be substituted or unsubstituted. Substituted heteroaryl may have one or more substituents, whereby each substituent group can independently be, for example, hydroxyalkyl, trihaloalkyl, cycloalkyl, alkenyl, alkynyl, aryl, heteroaryl, heteroalicyclic, amine, halide, sulfonate, sulfoxide, phosphonate, hydroxy, alkoxy, aryloxy, thiohydroxy, thioalkoxy, thioaryloxy, cyano, nitro, azo, sulfonamide, C-carboxylate, O-carboxylate, N-thiocarbamate, O-thiocarbamate, urea, thiourea, O-carbamate, N-carbamate, C-amide, N-amide, guanyl, guanidine and hydrazine. The heteroaryl group can be an end group, as this phrase is defined hereinabove, where it is attached to a single adjacent atom, or a linking group, as this phrase is defined hereinabove, connecting two or more moieties at two or more positions thereof. Representative examples are pyridine, pyrrole, oxazole, indole, purine and the like.

The term "halide" and "halo" describes fluorine, chlorine, bromine or iodine.

The term "haloalkyl" describes an alkyl group as defined above, further substituted by one or more halide.

The term "sulfate" describes a —O—S(=O)$_2$—OR' end group, as this term is defined hereinabove, or an —O—S(=O)$_2$—O— linking group, as these phrases are defined hereinabove, where R' is defined hereinabove.

The term "thiosulfate" describes a —O—S(=S)(=O)—OR' end group or a —O—S(=S)(=O)—O— linking group, as these phrases are defined hereinabove, where R' is as defined hereinabove.

The term "sulfite" describes an —O—S(=O)—O—R' end group or a —O—S(=O)—O— group linking group, as these phrases are defined hereinabove, where R' is as defined hereinabove.

The term "thiosulfite" describes a —O—S(=S)—O—R' end group or an —O—S(=S)—O— group linking group, as these phrases are defined hereinabove, where R' is as defined hereinabove.

The term "sulfinate" describes a —S(=O)—OR' end group or an —S(=O)—O— group linking group, as these phrases are defined hereinabove, where R' is as defined hereinabove.

The term "sulfoxide" or "sulfinyl" describes a —S(=O)R' end group or an —S(=O)— linking group, as these phrases are defined hereinabove, where R' is as defined hereinabove.

The term "sulfonate" describes a —S(=O)$_2$—R' end group or an —S(=O)$_2$— linking group, as these phrases are defined hereinabove, where R' is as defined herein.

The term "S-sulfonamide" describes a —S(=O)$_2$—NR'R" end group or a —S(=O)$_2$—NR'— linking group, as these phrases are defined hereinabove, with R' and R" as defined herein.

The term "N-sulfonamide" describes an R'S(=O)$_2$—NR"— end group or a —S(=O)$_2$—NR'— linking group, as these phrases are defined hereinabove, where R' and R" are as defined herein.

The term "disulfide" refers to a —S—SR' end group or a —S—S— linking group, as these phrases are defined hereinabove, where R' is as defined herein.

The term "phosphonate" describes a —P(=O)(OR')(OR") end group or a —P(=O)(OR')(O)— linking group, as these phrases are defined hereinabove, with R' and R" as defined herein.

The term "thiophosphonate" describes a —P(=S)(OR')(OR") end group or a —P(=S)(OR')(O)— linking group, as these phrases are defined hereinabove, with R' and R" as defined herein.

The term "phosphinyl" describes a —PR'R" end group or a —PR'— linking group, as these phrases are defined hereinabove, with R' and R" as defined hereinabove.

The term "phosphine oxide" describes a —P(=O)(R')(R") end group or a —P(=O)(R')— linking group, as these phrases are defined hereinabove, with R' and R" as defined herein.

The term "phosphine sulfide" describes a —P(=S)(R')(R") end group or a —P(=S)(R')— linking group, as these phrases are defined hereinabove, with R' and R" as defined herein.

The term "phosphite" describes an —O—PR'(=O)(OR") end group or an —O—PH(=O)(O)— linking group, as these phrases are defined hereinabove, with R' and R" as defined herein.

The term "carbonyl" or "carbonate" as used herein, describes a —C(=O)—R' end group or a —C(=O)— linking group, as these phrases are defined hereinabove, with R' as defined herein.

The term "thiocarbonyl" as used herein, describes a —C(=S)—R' end group or a —C(=S)— linking group, as these phrases are defined hereinabove, with R' as defined herein.

The term "oxo" as used herein, describes a (=O) group, wherein an oxygen atom is linked by a double bond to the atom (e.g., carbon atom) at the indicated position.

The term "thiooxo" as used herein, describes a (=S) group, wherein a sulfur atom is linked by a double bond to the atom (e.g., carbon atom) at the indicated position.

The term "oxime" describes a =N—OH end group or a =N—O— linking group, as these phrases are defined hereinabove.

The term "hydroxyl" describes a —OH group.

The term "alkoxy" describes both an —O-alkyl and an —O-cycloalkyl group, as defined herein. The term alkoxide describes —R'O$^-$ group, with R' as defined herein.

The term "aryloxy" describes both an —O-aryl and an —O-heteroaryl group, as defined herein.

The term "thiohydroxy" or "thiol" describes a —SH group. The term "thiolate" describes a S$^-$ group.

The term "thioalkoxy" describes both a —S-alkyl group, and a —S-cycloalkyl group, as defined herein.

The term "thioaryloxy" describes both a —S-aryl and a —S-heteroaryl group, as defined herein.

The "hydroxyalkyl" is also referred to herein as "alcohol", and describes an alkyl, as defined herein, substituted by a hydroxy group.

The term "cyano" describes a —C≡N group.

The term "isocyanate" describes an —N=C=O group.

The term "isothiocyanate" describes an —N=C=S group.

The term "nitro" describes an —NO$_2$ group.

The term "acyl halide" describes a —(C=O)R"" group wherein R"" is halide, as defined hereinabove.

The term "azo" or "diazo" describes an —N=NR' end group or an —N=N— linking group, as these phrases are defined hereinabove, with R' as defined hereinabove.

The term "peroxo" describes an —O—OR' end group or an —O—O— linking group, as these phrases are defined hereinabove, with R' as defined hereinabove.

The term "carboxylate" as used herein encompasses C-carboxylate and O-carboxylate.

The term "C-carboxylate" describes a —C(=O)—OR' end group or a —C(=O)—O— linking group, as these phrases are defined hereinabove, where R' is as defined herein.

The term "O-carboxylate" describes a —OC(=O)R' end group or a —OC(=O)— linking group, as these phrases are defined hereinabove, where R' is as defined herein.

A carboxylate can be linear or cyclic. When cyclic, R' and the carbon atom are linked together to form a ring, in C-carboxylate, and this group is also referred to as lactone. Alternatively, R' and O are linked together to form a ring in O-carboxylate. Cyclic carboxylates can function as a linking group, for example, when an atom in the formed ring is linked to another group.

The term "thiocarboxylate" as used herein encompasses C-thiocarboxylate and O-thiocarboxylate.

The term "C-thiocarboxylate" describes a —C(=S)—OR' end group or a —C(=S)—O— linking group, as these phrases are defined hereinabove, where R' is as defined herein.

The term "O-thiocarboxylate" describes a —OC(=S)R' end group or a —OC(=S)— linking group, as these phrases are defined hereinabove, where R' is as defined herein.

A thiocarboxylate can be linear or cyclic. When cyclic, R' and the carbon atom are linked together to form a ring, in C-thiocarboxylate, and this group is also referred to as thiolactone. Alternatively, R' and O are linked together to form a ring in O-thiocarboxylate. Cyclic thiocarboxylates can function as a linking group, for example, when an atom in the formed ring is linked to another group.

The term "carbamate" as used herein encompasses N-carbamate and O-carbamate.

The term "N-carbamate" describes an R"OC(=O)—NR'— end group or a —OC(=O)—NR'— linking group, as these phrases are defined hereinabove, with R' and R" as defined herein.

The term "O-carbamate" describes an —OC(=O)—NR'R" end group or an —OC(=O)—NR'— linking group, as these phrases are defined hereinabove, with R' and R" as defined herein.

A carbamate can be linear or cyclic. When cyclic, R' and the carbon atom are linked together to form a ring, in O-carbamate. Alternatively, R' and O are linked together to form a ring in N-carbamate. Cyclic carbamates can function as a linking group, for example, when an atom in the formed ring is linked to another group.

The term "carbamate" as used herein encompasses N-carbamate and O-carbamate.

The term "thiocarbamate" as used herein encompasses N-thiocarbamate and O-thiocarbamate.

The term "O-thiocarbamate" describes a —OC(=S)—NR'R" end group or a —OC(=S)—NR'— linking group, as these phrases are defined hereinabove, with R' and R" as defined herein.

The term "N-thiocarbamate" describes an R"OC(=S)NR'— end group or a —OC(=S)NR'— linking group, as these phrases are defined hereinabove, with R' and R" as defined herein.

Thiocarbamates can be linear or cyclic, as described herein for carbamates.

The term "dithiocarbamate" as used herein encompasses S-dithiocarbamate and N-dithiocarbamate.

The term "S-dithiocarbamate" describes a —SC(=S)—NR' R" end group or a —SC(=S)NR'— linking group, as these phrases are defined hereinabove, with R' and R" as defined herein.

The term "N-dithiocarbamate" describes an R"SC(=S)NR'— end group or a —SC(=S)NR'— linking group, as these phrases are defined hereinabove, with R' and R" as defined herein.

The term "urea", which is also referred to herein as "ureido", describes a —NR'C(=O)—NR"R'" end group or a —NR'C(=O)—NR"— linking group, as these phrases are defined hereinabove, where R' and R" are as defined herein and R'" is as defined herein for R' and R".

The term "thiourea", which is also referred to herein as "thioureido", describes a —NR'—C(=S)—NR"R'" end group or a —NR'—C(=S)—NR"— linking group, with R', R" and R'" as defined herein.

The term "amide" as used herein encompasses C-amide and N-amide.

The term "C-amide" describes a —C(=O)—NR'R" end group or a —C(=O)—NR'— linking group, as these phrases are defined hereinabove, where R' and R" are as defined herein.

The term "N-amide" describes a R'C(=O)—NR"— end group or a R'C(=O)—N— linking group, as these phrases are defined hereinabove, where R' and R" are as defined herein.

An amide can be linear or cyclic. When cyclic, R' and the carbon atom are linked together to form a ring, in C-amide, and this group is also referred to as lactam. Cyclic amides can function as a linking group, for example, when an atom in the formed ring is linked to another group.

The term "guanyl" describes a R'R"NC(=N)— end group or a —R'NC(=N)— linking group, as these phrases are defined hereinabove, where R' and R" are as defined herein.

The term "guanidine" describes a —R'NC(=N)—NR"R'" end group or a —R'NC(=N)— NR"— linking group, as these phrases are defined hereinabove, where R', R" and R'" are as defined herein.

The term "hydrazine" describes a —NR'—NR"R'" end group or a —NR'—NR"— linking group, as these phrases are defined hereinabove, with R', R", and R'" as defined herein.

As used herein, the term "hydrazide" describes a —C(=O)—NR'—NR"R'" end group or a —C(=O)—NR'—NR"— linking group, as these phrases are defined hereinabove, where R', R" and R'" are as defined herein.

As used herein, the term "thiohydrazide" describes a —C(=S)—NR'—NR"R'" end group or a —C(=S)—NR'—NR"— linking group, as these phrases are defined hereinabove, where R', R" and R'" are as defined herein.

As used herein, the term "alkylene glycol" describes a —O—[(CR'R")$_z$—O]$_y$R'" end group or a —O—[(CR'R")$_z$—O]$_y$— linking group, with R', R" and R'" being as defined herein, and with z being an integer of from 1 to 10, preferably, from 2 to 6, more preferably 2 or 3, and y being an integer of 1 or more. Preferably R' and R" are both hydrogen. When z is 2 and y is 1, this group is ethylene glycol. When z is 3 and y is 1, this group is propylene glycol. When y is 2-4, the alkylene glycol is referred to herein as oligo(alkylene glycol).

Herein, an "ethoxylated" material describes an acrylic or methacrylic compound which comprises one or more alkylene glycol groups, or, preferably, one or more alkylene glycol chains, as defined herein. Ethoxylated (meth)acrylate materials can be monofunctional, or, preferably, multifunctional, namely, difunctional, trifunctional, tetrafunctional, etc.

In multifunctional materials, typically, each of the (meth)acrylate groups are linked to an alkylene glycol group or chain, and the alkylene glycol groups or chains are linked to one another through a branching unit, such as, for example, a branched alkyl, cycloalkyl, aryl (e.g., Bisphenol A), etc.

In some embodiments, the ethoxylated material comprises at least one, or at least two ethoxylated group(s)s, that is, at least one or at least two alkylene glycol moieties or groups. Some or all of the alkylene glycol groups can be linked to one another to form an alkylene glycol chain.

For example, an ethoxylated material that comprises 30 ethoxylated groups can comprise a chain of 30 alkylene glycol groups linked to one another, two chains, each, for example, of 15 alkylene glycol moieties linked to one another, the two chains linked to one another via a branching moiety, or three chains, each, for example, of 10 alkylene glycol groups linked to one another, the three chains linked to one another via a branching moiety. Shorter and longer chains are also contemplated.

The ethoxylated material can comprise one, two or more alkylene glycol chains, of any length.

The term "branching unit" as used herein describes a multi-radical, preferably aliphatic or alicyclic group. By "multi-radical" it is meant that the unit has two or more attachment points such that it links between two or more atoms and/or groups or moieties.

In some embodiments, the branching unit is derived from a chemical moiety that has two, three or more functional groups. In some embodiments, the branching unit is a branched alkyl or a cycloalkyl (alicyclic) or an aryl (e.g., phenyl) as defined herein.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Various embodiments and aspects of the present invention as delineated hereinabove and as claimed in the claims section below find experimental support in the following examples.

EXAMPLES

Reference is now made to the following examples, which together with the above descriptions illustrate some embodiments of the invention in a non-limiting fashion.

Example 1

Chemical Composition of Transparent Modeling Material Formulations

Exemplary chemical components composing the reference formulations I and II and exemplary formulations according to some of the present embodiments, which provide, when hardened, a transparent material (collectively referred to herein also as "transparent modeling material formulations", or "transparent modeling formulations" or "transparent formulations"), are presented in Table 1 below.

TABLE 1

| Component | Description | Exemplary materials |
|---|---|---|
| A | Low MW/low viscosity monofunctional (meth) acrylate | |
| A1 | Non-aromatic, low MW/low viscosity, monofunctional (meth)acrylate, optionally featuring Tg higher than 50°, e.g., of 50-100, or 70-100, or 80-100° C. | As described hereinabove |
| A2 | Aromatic, low MW/low viscosity, monofunctional (meth)acrylate, optionally featuring Tg lower than 50° C., or lower of 20° C., e.g., of 0-50, or of 0-30, or of 0-20° C. | As described hereinabove |
| B | multi-functional (e.g., difunctional) (meth) acrylate featuring Tg higher than 100, or higher than 150° C. | As described hereinabove |
| C | Aliphatic urethane (meth)acrylate multifunctional | |
| C1 | Aliphatic urethane (meth)acrylate difunctional, high viscosity/high MW, Tg lower than 50, or lower than 30, or lower than 20° C. (e.g., of 0-50, or of 0-30, or of 0-20° C.) | Aliphatic polyester urethane diacrylate oligomers |
| C2 | Aliphatic urethane (meth)acrylate multifunctional (e.g., trifunctional), high viscosity/high MW, preferably featuring Tg higher than 20° C. (e.g., of from 20 to 60, or from 40 to 60° C.) | Aliphatic urethane diacrylate and/or triacrylate oligomers |
| D | Ethoxylated (meth) acrylate multifunctional | |
| D1 | Ethoxylated difunctional (meth)acrylate monomer/oligomer, medium-high viscosity | Aromatic ethoxylated diacrylates featuring Tg higher than 50° C., e.g., of 50-100, preferably 50-80 or 50-70° C. |
| D2 | Ethoxylated, low viscosity, difunctional (meth) acrylate | Non-aromatic ethoxylated diacrylates featuring Tg higher than 50° C., e.g., of 50-100, preferably 50-80 or 50-70° C. |
| E | Epoxy (meth)acrylate multifunctional | Aromatic epoxy (meth)acrylate di-functional |
| F | Photoinitiator (PI) | |
| F1 | PI phosphine oxide-type | PIs of the BAPO or MAPO type |

TABLE 1-continued

| Component | Description | Exemplary materials |
|---|---|---|
| F2 | alpha-amine/hydroxy ketone -type | alpha-hydroxy ketone type |
| G | Inhibitor | As described hereinabove |
| H | Sulfur-containing additive | As described hereinabove |
| I | Surface Active Agent (e.g., Silicon-based) | Materials marketed within the BYK family |
| J | Blue pigment/dye | As described hereinabove |

Example 2

Exemplary Currently Practiced Transparent Modeling Material Formulations

Table 2A below presents the chemical composition of reference formulations, such as Reference (Ref.) formulation I, which provide, when hardened, a transparent material.

TABLE 2A

| Component | % Weight |
|---|---|
| A1 | 45-60 |
| A2 | 10-15 |
| B | 5-15 |
| C1 | 20-30 |
| E | 3-10 |
| F1 | 1-2 |
| F2 | 2-3 |
| G | 0.1-0.2 |
| I | 0.01-0.2 |
| J | $0\text{-}5 \cdot 10^{-4}$ |

An average Tg of an exemplary Reference Formulation I ranges from 60 to 70° C.

Table 2B below presents the chemical composition of other exemplary reference formulations, such as Reference (Ref.) formulation II, which provide, when hardened, a transparent material.

TABLE 2B

| Component | % weight |
|---|---|
| A1 | 45-60 |
| C1 | 20-30 |
| D1 | 15-25 |
| F1 | 0.5-1.5 |
| F2 | 2-3 |
| H | 0.5-2 |
| I | 0.05-0.2 |

An average Tg of an exemplary Reference Formulation II ranges from 60 to 70° C.

Hardened materials formed of Reference (Ref.) formulations I and II are typically characterized by the following properties:

Tensile strength (as defined herein) higher than 30 MPa;
Flexural strength (as defined herein) higher than 50 MPa;
Flexural Modulus (as defined herein) higher than 1800 MPa;
Izod Impact (as defined herein) higher than 15, typically higher than 20 J/mol;
HDT higher than 40° C.; and
Elongation at break of at least 7% (e.g., 7-30%).

FIG. 6 presents objects formed in 3D inkjet printing using J-750 system, and SUP 705 as a support material formulation. As modeling material formulations, exemplary reference formulations I and II, such as presented in Tables 2A (left object) and 2B (right object), respectively, were used.

As can be seen, when a formulation such as Ref. Formulation II (see, Table 2B) is used, the hardened material features a yellow hue. When a formulation such as Ref. Formulation I (see, Table 2A) is used, an agent that provides a blue tint is added so as to mask the yellow hue, and as a result the hardened material features a grey-blue hue.

Example 3

Newly Designed Transparent Modeling Material Formulations

The present inventors have sought for novel formulations that provide, when hardened, a transparent material with reduced or nullified yellow hue and/or improved transmittance as defined herein.

The present inventors have uncovered that by manipulating the total amount and the type of the photoinitiator(s) the yellow hue is substantially reduced. The present inventors have further uncovered that when the amount and type of the photoinitiator is manipulated, the masking by the addition of an agent that provides a blue tint can be circumvented or at least a lower amount of the agent that provides a blue tint is required.

More specifically, the present inventors have uncovered that using formulations with a total amount of photoinitiators (PIs) of no more than 1% by weight of the total amount of the formulation is beneficial in this regard, and that the PIs should include no more than 10% by weight of the total weight of the PIs in the formulation, PI(s) of the alpha-amine or alpha-hydroxy ketone type.

The present inventors have successfully practiced formulations that comprise up to 1% by weight of PIs of the mono-acylated phosphine oxide (MAPO) family, e.g., as described herein.

The present inventors have further uncovered that reducing or nullifying the yellow hue can be further effected by manipulating the chemical composition of the curable materials.

As shown in Tables 2A and 2B hereinabove, currently practiced transparent formulations comprise a mixture of mono-functional and multi-functional curable materials, and, more specifically, 45-60% by weight of low MW/low viscosity mono-functional (meth)acrylates (A1 and A2), which may include aromatic and/or aliphatic, hydrophobic and/or hydrophilic, low MW/low viscosity mono-functional (meth)acrylates, and which can feature Tg lower than 50° C. or lower than 20° C. (as defined for A2) or of 50-100° C. (as defined for A1); 0-20% by weight of low MW/low viscosity multi-functional (meth)acrylate featuring Tg higher than 100° C. (B); 20-30% by weight of medium-high MW/medium-high viscosity multi-functional aliphatic urethane (meth)acrylate oligomers, including those featuring Tg lower than 20° C. (as defined for C1) and/or those featuring Tg higher than 20° C. (as defined for C2); and 15-25% by weight of multi-functional ethoxylated (meth)acrylates featuring Tg of 50-100° C. (as defined for D1).

The present inventors have uncovered that when the amount of the aromatic low MW/low viscosity monofunctional (meth)acrylates is reduced or nullified, a substantial reduction of the yellow hue is obtained.

The present inventors have further uncovered that reducing or nullifying the amount of multi-functional (meth)acrylate(s) that feature Tg higher than the working temperatures during an inkjet printing process (e.g., higher than 70, 80 or 100° C.) results in a substantial reduction of the yellow hue.

The present inventors have therefore devised formulations which include no more than 5% by weight, and are preferably devoid of, each of the components defined as A2 and B. The present inventors have manipulated, when required, the type and amount of the other components in the formulation (e.g., C1, C2, D1 and D2) so as to maintain a viscosity and an average Tg of the formulation similar to the reference formulations.

For example, the present inventors have included in the formulation, as part of component C, component C2, for improving the reactivity of the formulation and adjusting the average Tg, and have added component D2, for adjusting the average Tg and the viscosity.

Currently practiced transparent formulations may further comprise non-curable materials such as 0-2% by weight sulfur-containing compounds (H), 0.05-0.2, or 0.05-0.15% by weight surface active agents and/or other additives (I), 0.1-0.2% by weight polymerization inhibitors (G) and optionally an agent that provides a blue tint (a blue dye or pigment (J) in an amount of about $1\text{-}5\cdot10^{-4}\%$ by weight.

The present inventors have further uncovered that lower amounts of a surface active agent can be used (e.g., for providing a surface tension that meets the process requirements). The present inventors have further uncovered that as a result of the reduced yellow hue, the amount of the agent the provides a blue tint, which, if present, is required for masking the yellow hue, can be substantially reduced, in about one order of magnitude.

The present inventors have designed novel transparent modeling material formulations that comprise:

One or more low MW/low viscosity aliphatic monofunctional (meth)acrylate(s), at a total amount of from about 40% or about 45% to about 60% weight; and One or more medium and/or high MW/medium and/or high viscosity multi-functional (meth)acrylate(s), at a total amount of from about 35% to about 60% by weight, wherein an average Tg of the multifunctional (meth)acrylates is higher than 24° C., or higher than 25° C., and can range, for example, from 30 to 70, or from 30 to 60, or from 40 to 60, ° C., and in which:

At least 95%, and preferably 100% of the monofunctional (meth)acrylate(s) (A) comprise a non-aromatic monofunctional (meth)acrylate(s), such as, for example, defined for A1; and/or No more than 5%, preferably no more than 3%, preferably no more than 1%, and more preferably null, of the monofunctional (meth)acrylate(s) (A) are an aromatic monofunctional (meth)acrylate(s) such as, for example, defined for A2; and/or No more than 5%, preferably no more than 3%, preferably no more than 1%, and more preferably null, of the multi-functional (meth)acrylates are such that feature Tg higher than 100° C., or higher than the highest process temperature (working temperature, that is, a temperature of the inkjet printing heads and/or nozzles, or a temperature of the receiving medium, or a temperature developed in a dispensed layer or a plurality of dispensed layers), for example, higher than 80, or higher than 70° C., such as, for example, defined for B.

The one or more multi-functional (meth)acrylates preferably include one or more multi-functional (meth)acrylate(s) which feature average Tg of 50° C. or lower, preferably of from 20 to 50° C., such as, for example, high MW/high viscosity multi-functional urethane (meth)acrylate(s), such as, for example, defined for C (preferably C2 or a mixture of C1 and C2), at a total amount of from about 15% to about 25% by weight; and One or more multi-functional (meth)acrylate(s) that feature Tg higher than 50° C., for example of from 50 to 100, or from 50 to 80, or from 50 to 70, ° C., such as, for example, defined for D1 and D2, at a total amount of from about 20% to about 30% by weight.

Herein throughout, the phrase "low viscosity" describes a material that features, before curing, a viscosity of no more than 500 centipoises, at 25° C.

Herein throughout, the phrase "medium viscosity" describes a material that features, before curing, a viscosity of from 500-2000 centipoises, at 25° C.

Herein throughout, the phrase "high viscosity" describes a material that features, before curing, a viscosity of higher than 2000 centipoises preferably in a range of from 2000 to 10000 centipoises, when measured at 25° C.

Herein throughout, the phrase "low MW" describes a material that features, before curing, a molecular weight of no more than 500 grams/mol, and even of no more than 400 grams/mol.

Herein throughout, the phrase "medium MW" describes a material that features, before curing, a molecular weight of from 500 grams/mol to about 1000 grams/mol.

Herein throughout, the phrase "high MW" describes a material that features, before curing, a molecular weight of higher than 1000 grams/mol.

Medium and high-MW materials are also referred to herein as oligomeric materials, or as oligomers.

Herein, whenever low (or high or medium) MW/low (or high or medium) viscosity is indicated it is meant the indicated MW feature and/or the indicated viscosity feature.

Herein throughout, an average Tg means a sum of the Tg of each component multiplied by its relative weight portion divided by the sum of the respective weight portions.

For example, if material A is included in an amount of X weight percent and features Tg1, and a material B is included in an amount of Y weight percent and features Tg2, then an average Tg of materials A and B is calculated herein as:

$$\text{Average Tg}=(X\times\text{Tg}1+Y\times\text{Tg}2)/(X+Y).$$

In case only one material is present for a certain group of materials as described herein, the average Tg of this material is its Tg.

The newly designed transparent formulations comprise one or more photoinitiator(s) (PIs), in a total amount of no more of 1% by weight. These formulations are considered as partially reactive or partially curable formulations, as defined herein.

The newly designed transparent formulations may further comprise one or more non-reactive (non-curable) materials (e.g., additives as described herein for components G and I) as described herein, for example, an inhibitor, a surface active agent, in an amount lower than 1%, preferably lower than 0.5%, by weight, and/or a coloring agent that provides a blue tint (e.g., component J), in an amount lower than $5\cdot10^{-4}$, preferably in a range of 0 to $1\cdot10^{-4}$.

Table 3A below presents the chemical composition of an exemplary transparent formulation according to some of the present embodiments, which is also referred to herein as Exemplary (Ex.) formulation I.

TABLE 3A

| Component | Wt. % |
|---|---|
| A1 | 40-60 |
| C1 | 3-8 |
| C2 | 12-22 |
| D1 | 15-25 |
| D2 | 5-10 |
| F1 | 0.1-1 |
| G | 0.1-0.2 |
| I | 0.01-0.05 |
| J | $0\text{-}1 \cdot 10^{-4}$ |

Table 3B below presents the chemical composition of an exemplary transparent formulation according to some of the present embodiments, which is also referred to herein as Exemplary (Ex.) formulation II.

TABLE 3B

| Component | % weight |
|---|---|
| A1 | 45-60 |
| C1 | 20-30 |
| D1 | 15-25 |
| F1 | 0.5-1.5 |
| F2 | 0 |
| H | 0.5-2 |
| I | 0.05-0.2 |
| J | $0\text{-}1 \cdot 10^{-4}$ |

The formulations described herein feature a viscosity in a range of 10-20 centipoises at 75° C.; a surface tension of 20-40 dynes/cm; are jettable; and therefore meet the process requirements of 3D inkjet printing.

The formulations described herein also exhibit acceptable storage stability (when tested for a change in viscosity and surface tension upon storage at 85° C. during 14 days), substantially similar to corresponding reactive formulations such as Ex. Formulations I and II.

The present inventors have utilized the low PI-content, partially reactive, formulations described herein in 3D inkjet printing, using, for example, the Stratsys J-750 system. No curling was observed for the printed objects.

The present inventors have uncovered that while objects can be manufactured by 3D inkjet printing using a transparent modeling formulation as described herein (e.g., Ex. Formulation I or II), improved objects are obtained when the low PI-content, partially reactive, transparent formulation (e.g., Ex. Formulation I or II) is used in a multi-material (e.g., digital material, DM) mode in combination with a full PI-content, reactive transparent formulation, such as, for example Ref Formulation I, as shown, for example, in FIGS. 5A and 5B, and is also exemplified in FIG. 7C.

FIGS. 7A and 7B present photographs of cube objects made of an exemplary formulation according to the present embodiments, Ex. Formulation I, per se (FIG. 7A) and of a core made of an exemplary partially reactive formulation according to the present embodiments, Ex. Formulation I (FIG. 7B), enveloped by an outer layer, 0.5 mm-thick, made of a full PI-content, reactive transparent formulation such as, for example, Ref. Formulation I, according to the printing mode shown in FIG. 7C.

FIG. 8 presents photographs of cube objects made of an inner core enveloped by a 0.5 mm-thick coat made of Ref. Formulation I, in which the inner core is made using an exemplary reactive formulation as presented in Table 2B above, Ref. Formulation II (left object), an inner core is made of the same formulation to which a coloring agent which provides a blue tint is added (middle object), and of the inner core is made of an exemplary formulation II as presented in Table 3B above, (right object), showing the advantageous transparency, with nearly nullified yellow hue, obtained when a formulation according to some of the present embodiments is used as the inner core.

FIG. 9 presents a cube object made of an exemplary reactive formulation as presented in Table 2A above, Ref. Formulation I (left object), a cube object made of the same formulation without a coloring agent which provides a blue tint is added (middle object), and a cube object made of an exemplary formulation I as presented in Table 3A above, as the inner core, enveloped by a 0.5 mm-thick outer layer made of Ref. Formulation I (right object), showing the advantageous transparency, with nearly nullified yellow hue, obtained by a formulation according to some of the present embodiments.

Objects requiring a support material formulations were also printed using formulations as described herein, while using commercially available support formulations such as, for example, those marketed as SUP705 and SUP706.

Example 4

Inkjet Printing Process Parameters

As stated above, it was unexpectedly found that the transmittance property of the final object significantly depends on the orientation of the fabricated layers. Experiments were conducted to investigate the effect of re-orientation of the fabricated layers on the transmittance through the faces of an object shaped as a cube. A first object was fabricated in a manner that each of its faces was parallel to one of the x-y, x-z, and y-z planes. Following fabrication, a post-fabrication photo-bleaching treatment was applied for 24 hours, as described hereinbelow, and each of the faces was polished as described hereinbelow (see, Example 5). The slice data used for fabricating the first object was then subjected to a 45° rotational transformation about all three axes x, y, and z, and second object of the same, size, and materials, was fabricated, so that each of the faces of the second object formed a 45° angle with each of the x-y, x-z, and y-z planes. Following fabrication, a post-fabrication photo-bleaching treatment was applied for 24 hours, and each of the faces was polished as described in Example 5 hereinbelow.

The transmittance through each of the faces of the first and second object was measured using Ci7860 from X-rite. The results are shown in FIG. 10. In FIG. 10, the faces of the objects are denoted as X, Y and Z. As shown, in the absence of the rotational transformation of coordinates, the transmittance values through the X, Y and Z faces were 58.33±7.53, 65.52±10.07, and 80.46±0.51, respectively. After the rotational transformation of coordinates, the transmittance values through the X, Y and Z faces are 79.62.33±1.92, 81.45±1.28, and 81.77±1.77, respectively.

This Example demonstrates that improvement in the optical transmittance can be achieved by applying rotational transformation of coordinates to the slice data.

Example 5

Post Printing Treatment

Objects made using the transparent formulations described herein were subjected to photobleaching, by exposing the printed object to LED irradiation, using a LED 100 Watts 6500 K lamp, and optionally further exposing to heat, e.g., at 35-55° C. Irradiation and heating, of performed, can be performed during a time period of, for example, 1 hour, 2 hours, or more, e.g., from 1 hour to 24 hours, or from 2 hours to 24 hours.

FIGS. 11A and 11B present photographs of exemplary objects made using the exemplary transparent formulation I, Ex. Formulation I, before and after exposure to 24-hours photobleaching as described herein.

The time required for exposing a printed object to photobleaching in order to achieve the desired optical properties of the final object depends on the size, shape and particularly the width or depth of the object or the transparent part thereof, and the desired optical property.

Monitoring parameters such as L*a*b*, transmittance and yellowness index can be performed during the photobleaching process in order to determine the time period of photobleaching for a certain object.

Table 4 below presents the data obtained in such measurements over time of exposure to photobleaching of an object of 40×40×10 mm (10 mm thickness).

TABLE 4

| Time | Reflection from white BG | | | Reflection from black BG | | | Transmission measuring | | | % transmittance |
|---|---|---|---|---|---|---|---|---|---|---|
| Before PB | 78.62 | −2.65 | 4.93 | 17.25 | −1.33 | −2.35 | 92.71 | −1.17 | 6.8 | 79.95 |
| 2 hours | 79.25 | −1.73 | 1.26 | 13.33 | −0.95 | −2.43 | 94.21 | −0.73 | 4.21 | 84.23 |
| 10 hours | 79.64 | −1.22 | −1.58 | 13.84 | −0.79 | −2.7 | 93.79 | −0.49 | 2.93 | 83.84 |
| 24 hours | 79.84 | −0.94 | −2.81 | 13.42 | −0.06 | −2.4 | 94.04 | −0.34 | 2.05 | 84.72 |

FIGS. 12A-D present images of cube objects of various depths, made of Ex. Formulation I as described herein (in a multi-material mode as described herein) before PB (FIG. 12A) and after 2 hours (FIG. 12B), 10 hours (FIG. 12C) and 24 hours (FIG. 12D) of photobleaching.

Photobleaching can be performed immediately after the printing process or at any time after the object is printed.

Without being bound by any particular theory, it is assumed that exposure to photobleaching accelerates the decomposition of residual amounts of PI(s), and may also promote additional hardening (e.g., curing, polymerization) of partially cured materials in the printed object, that is, it increases the overall degree of hardening of the curable materials in the printed object.

Objects made using the transparent formulations described herein can optionally be further subjected to polishing.

In exemplary embodiments, polishing is made using a sandpaper, and in some embodiments, polishing is made using two or more sandpapers of different grades, going from a lower grade to higher one or more grades. In exemplary embodiments, polishing is made using first a P240 grade sand paper, followed by a P1000 grade sandpaper, followed by a P2000 grade sand paper. Optionally, further polishing is made using a sander for smoothing and a polishing machine. Further optionally, an anti-scratch paste is applied to the final object.

Example 6

Mechanical, Physical and Optical Properties of Printed Objects

Optical Properties:

Transmittance, Yellowness Index (YI) and L*a*b* values of objects made using the transparent formulations as described herein were measured.

Cube objects, 40×40×6 mm were printed as described herein, using Ex. Formulation I and Ex. Formulation II (in a DM mode as described herein), compared to Ref. Formulation I and to Perspex (PMMA).

Transmittance, as % of light that passes through the object, was measured using X-Rite Ci7860 device.

Yellowness Index was determined according to ASTM D1925.

For quantitative color measurements, the X-Rite measurement technique using the CIE Color Systems (based on the CIE L*a*b* color scale, wherein L* defines lightness, a* denotes the red/green value and b* the yellow/blue value), shown in FIG. 13, was used. The standard illuminant applied for color measurements was daylight.

The data obtained in these measurements, for a 40×40×6 mm cube objects, after post-treatment as described in Example 5 hereinabove, is presented in Table 5. Values are provided for the 6 mm-face.

TABLE 5

| Material | PMMA (Ref.) | Ref. Formulation I | Ex. Formulation I | Ex. Formulation II |
|---|---|---|---|---|
| Transmission (%) | 90-91% | 75-76% | 86-87% | 84-85% |
| Yellow index (YI-D1925) | 0.6-0.7 | 5.8-5.9 | 1.2-1.3 | 2.4-2.5 |

TABLE 5-continued

| Material | PMMA (Ref.) | Ref. Formulation I | Ex. Formulation I | Ex. Formulation II |
|---|---|---|---|---|
| L* | 96-97 | 89-90 | 94-95 | 93-94 |
| a* | 0.05-0.07 | −0.5-(−1) | −0.13-(−0.3) | −0.13-(−0.19) |
| b* | 0.3 | 3-4 | 0.5-1.2 | 1.3-1.5 |

As can be seen, objects made of the transparent formulations of the present embodiments exhibit optical features which are the closer to Perspex (PMMA), and particularly exhibit a substantially low YI, and substantially high transmittance and lightness values.

FIG. 14 presents photographs of exemplary objects made using Ref. Formulation I formulation (upper objects) and the same exemplary objects made using Ex. Formulation I as described herein, further demonstrating the advantageous transparency and nullified hue obtained using a transparent formulation according to the present embodiments.

Surface Properties:

As shown in FIG. 15, objects made of the exemplary transparent formulation Ex. Formulation I exhibit, in addition to the improved color properties, surface properties which are substantially the same as those made of the reactive Ref. Formulation I only.

Physical and Mechanical Properties:

Table 6 below presents the properties of objects made of the exemplary formulations shown in Tables 3A and 3B, compared to Reference formulation I, all after subjecting the printed objects to photobleaching as described herein.

As shown in Table 6, the objects made using the transparent formulations as described herein do not exhibit a substantial change in their properties compared to the reference formulation, with the maximal change being of less than 20% (for tensile strength).

TABLE 6

| Property | Method | Ex. Formulation I | Ex. Formulation II | Ref. Formulation I |
|---|---|---|---|---|
| Izod impact (J/m) | ASTM D256 | 20-35 | 20-30 | 20-30 |
| HDT (° C.) | ASTM D648 | 50-60 | 50-60 | 50-60 |
| Tensile Strength (MPa) | ASTM D638 | 45-50 | 40-50 | 60-70 |
| Elongation at break (%) | ASTM D638 | 8-15 | 8-11 | 6-8 |
| Tensile modulus (MPa) | ASTM D638 | 1600-1800 | 1600-1700 | 1700-2000 |
| Flexural strength (MPa) | ASTM D790 | 65-85 | 70-75 | 90-95 |
| Flexural Modulus (MPa) | ASTM D790 | 2300-2500 | 2300-2500 | 2400-2600 |

Overall these data show that while a substantial change in optical properties is achieved using the transparent formulations of the present embodiments, no substantial change (a change of no more than 20%, typically no more than 10%) in other properties is observed.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

It is the intent of the applicant(s) that all publications, patents and patent applications referred to in this specification are to be incorporated in their entirety by reference into the specification, as if each individual publication, patent or patent application was specifically and individually noted when referenced that it is to be incorporated herein by reference. In addition, citation or identification of any reference in this application shall not be construed as an admission that such reference is available as prior art to the present invention. To the extent that section headings are used, they should not be construed as necessarily limiting. In addition, any priority document(s) of this application is/are hereby incorporated herein by reference in its/their entirety.

What is claimed is:

1. A photocurable formulation comprising:
   at least one photoinitiator in a total amount of no more than 1% by weight of the total weight of the formulation;
   at least one mono-functional (meth)acrylate material featuring a molecular weight lower than 500 grams/mol, in a total amount of from 40 to 60% by weight of the total weight of the formulation, said at least one mono-functional (meth)acrylate material being selected d from non-aromatic and aromatic mono-functional (meth)acrylate material, wherein an amount of an aromatic mono-functional (meth)acrylate material is no more than 5% by weight, of a total amount of said at least one mono-functional (meth)acrylate material; and
   at least one multi-functional (meth)acrylate material, in a total amount of from 40 to 60% by weight of the total weight of the formulation, wherein an average glass transition temperature Tg of said at least one multi-functional (meth)acrylate material, when hardened, is at least 24° C., and wherein each of said at least one multi-functional (meth)acrylate material features, when hardened, a glass transition temperature Tg lower than 100° C.,
   wherein said at least one multi-functional (meth)acrylate material comprises:
   at least one multi-functional urethane acrylate that features a molecular weight higher than 1000 grams/mol and features, when hardened, an average glass transition temperature Tg of from 30 to 60° C., in a total amount of from 15 to 40% by weight of the total weight of the formulation; and
   at least one multi-functional ethoxylated (meth)acrylate material that features, when hardened, glass transition temperature Tg of from 50 to 80° C., in a total amount of from 15 to 30% by weight of the total amount of the formulation.

2. The photocurable formulation of claim 1, comprising at least one non-aromatic mono-functional (meth)acrylate material, in an amount of from 40 to 60% by weight of the total weight of the formulation.

3. The photocurable formulation of claim 1, wherein each of said at least one mono-functional (meth)acrylate materials features glass transition temperature Tg of from 20 to 100° C.

4. The photocurable formulation of claim 1, wherein said at least one multi-functional urethane acrylate that features said molecular weight higher than 1000 grams/mol and features, when hardened, said average glass transition temperature Tg of from 30 to 60° C. comprises at least one multi-functional urethane acrylate that features, when hardened, glass transition temperature Tg lower than 20° C., and at least one multi-functional urethane acrylate that features, when hardened, glass transition temperature Tg higher than 20° C.

5. The photocurable formulation of claim 1, wherein said at least one multi-functional ethoxylated (meth)acrylate material that features, when hardened, glass transition temperature Tg of from 50 to 80, ° C., comprises at least one multi-functional ethoxylated (meth)acrylate material that features a viscosity of at least 500 centipoises, and at least one multi-functional ethoxylated (meth)acrylate material that features a viscosity lower than 50 centipoises.

6. The photocurable formulation of claim 1, wherein said at least one photoinitiator is devoid of an alpha-substituted ketone-type photoinitiator.

7. The photocurable formulation of claim 1, wherein said at least one photoinitiator comprises, or consists of, a phosphine oxide-type photoinitiator.

8. The photocurable formulation of claim 1, usable in additive manufacturing of a three-dimensional object comprising, in at least a portion thereof, a transparent material, wherein said transparent material is characterized by at least one of:
Transmittance of at least 80%;
Yellowness Index lower than 3, or lower than 2.5;
a CIE-LAB Lightness value L* of at least 90;
a CIE-LAB a* value of at least −0.35; and
a CIE-LAB b* value of less than 2, or less than 1.5.

9. A method of additive manufacturing a three-dimensional object that comprises in at least a portion thereof a transparent material, the method comprising sequentially forming a plurality of layers in a configured pattern corresponding to the shape of the object, thereby forming the object,
wherein the formation of each of at least a few of said layers comprises dispensing at least one formulation, and exposing the dispensed formulation to a curing condition to thereby form a cured modeling material,
wherein said at least one formulation is the photocurable formulation of claim 1.

10. The method of claim 9, wherein the formation of each of at least a few of said layers comprises dispensing at least two formulations, and exposing the dispensed formulations to a curing condition to thereby form a cured material,
wherein at least one of said formulations is a first formulation which is said photocurable formulation of claim 1 and at least one another of said formulations is a second modeling material formulation which provides, when hardened, a transparent material, and which upon exposure to said curing condition exhibits a hardening degree that is higher than a hardening degree of said first formulation.

11. The method of claim 10, wherein the formation of each of at least a few of said layers comprises dispensing at least said first and said second formulations to form a core region using the first formulation and at least one envelope region at least partially surrounding said core region using said second formulation.

12. The method of claim 9, further comprising, prior to said formation of said layers, applying a rotational transformation of coordinates to slice data describing to the shape of the object, so as to ensure that at least one face of the object is not perpendicular to said layers.

13. The method of claim 9, further comprising, subsequent to exposing to said curing condition, exposing the object to a condition that promotes decomposition of a residual amount of said photoinitiator (photobleaching).

14. An object comprising in at least a portion thereof a transparent material, obtainable by the method of claim 9, wherein said transparent material is characterized by at least one of:
Transmittance of at least 80%;
Yellowness Index lower than 3, or lower than 2.5;
a CIE-LAB Lightness value L* of at least 90;
a CIE-LAB a* value of at least −0.35; and
a CIE-LAB b* value of less than 2, or less than 1.5.

15. A kit comprising a first formulation being the formulation of claim 1 and a second formulation that provides, when hardened, a transparent material, said second formulation featuring, when exposed to irradiation, a hardening rate higher than a hardening rate of said first formulation.

\* \* \* \* \*